United States Patent [19]

Itoh

[11] Patent Number: 5,280,521
[45] Date of Patent: Jan. 18, 1994

[54] PORTABLE TELEPHONE SYSTEM

[75] Inventor: Sadao Itoh, Yokohama, Japan

[73] Assignee: Iwatsu Electric Co., Ltd., Tokyo, Japan

[21] Appl. No.: 841,263

[22] Filed: Feb. 24, 1992

Related U.S. Application Data

[63] Continuation of Ser. No. 547,386, Jul. 2, 1990, abandoned, which is a continuation of Ser. No. 396,442, Aug. 21, 1989, abandoned, which is a continuation of Ser. No. 107,418, Nov. 25, 1987, abandoned.

[51] Int. Cl.$^5$ .............................................. H04Q 7/04
[52] U.S. Cl. ......................................... 379/58; 379/59; 379/56; 455/12.1; 455/56.1
[58] Field of Search ................................. 379/56-63; 455/12, 13, 56

[56] References Cited

U.S. PATENT DOCUMENTS

| | | | |
|---|---|---|---|
| 4,313,035 | 1/1982 | Jordan et al. | 379/61 |
| 4,549,308 | 10/1985 | LoPinto | 379/59 |
| 4,562,572 | 12/1985 | Goldman et al. | 379/60 |
| 4,658,416 | 4/1987 | Tanaka | 379/57 |
| 4,672,656 | 6/1987 | Pfeiffer et al. | 379/57 |
| 4,677,653 | 6/1987 | Weiner et al. | 379/59 |
| 4,698,839 | 10/1987 | DeVaney et al. | 379/60 |
| 4,700,374 | 10/1987 | Bini | 379/60 |
| 4,726,014 | 2/1988 | Goldman et al. | 379/56 |
| 4,731,812 | 3/1988 | Åkerberg | 379/61 |
| 4,748,655 | 5/1988 | Thrower et al. | 379/58 |

FOREIGN PATENT DOCUMENTS

| | | | |
|---|---|---|---|
| 0081352 | 5/1983 | Japan | 379/61 |
| 0143034 | 7/1985 | Japan | 379/58 |
| 0158737 | 8/1985 | Japan | 379/58 |
| 0154232 | 7/1986 | Japan | 379/59 |
| 0177038 | 8/1986 | Japan | 379/59 |
| 0184936 | 8/1986 | Japan | 379/58 |

OTHER PUBLICATIONS

Bob Dargent, "Aurora System Lights The Way In Cellular Mobile Radio Market", Telephony, Aug. 16, 1982, vol. 203, No. 7, pp. 28–34.

Bjorn Tyoli, "Radio Technology Is Making Waves For Mobile Communication Systems", Telephony, Aug. 16, 1982, pp. 24–27.

Billström et al., "Mobile Telephone Functions In AXE", 1980 International Conference on Communications, Jun. 1980, pp. 19, 3, 1–5.

Primary Examiner—James L. Dwyer
Assistant Examiner—M. Shehata
Attorney, Agent, or Firm—Emmanuel J. Lobato; Robert E. Burns

[57] ABSTRACT

A portable telephone system is disclosed in which a plurality of i-th class exchanges, which accommodate key service units of a plurality of portable telephone sets present in each service area, and at least one (i+1)th class exchange which accommodates the plurality of i-th class exchanges through junction lines, are stratified to form an exchange system so that i=1, 2, 3, ..., and so that the (i+1)th class exchange covers all service areas. The exchange system has a function whereby information which specifies the home area of each portable telephone set and the portable telephone set in distinction from each other is registered in the i-th class exchange and the (i+1)th class exchange, which administer the home area.

6 Claims, 48 Drawing Sheets

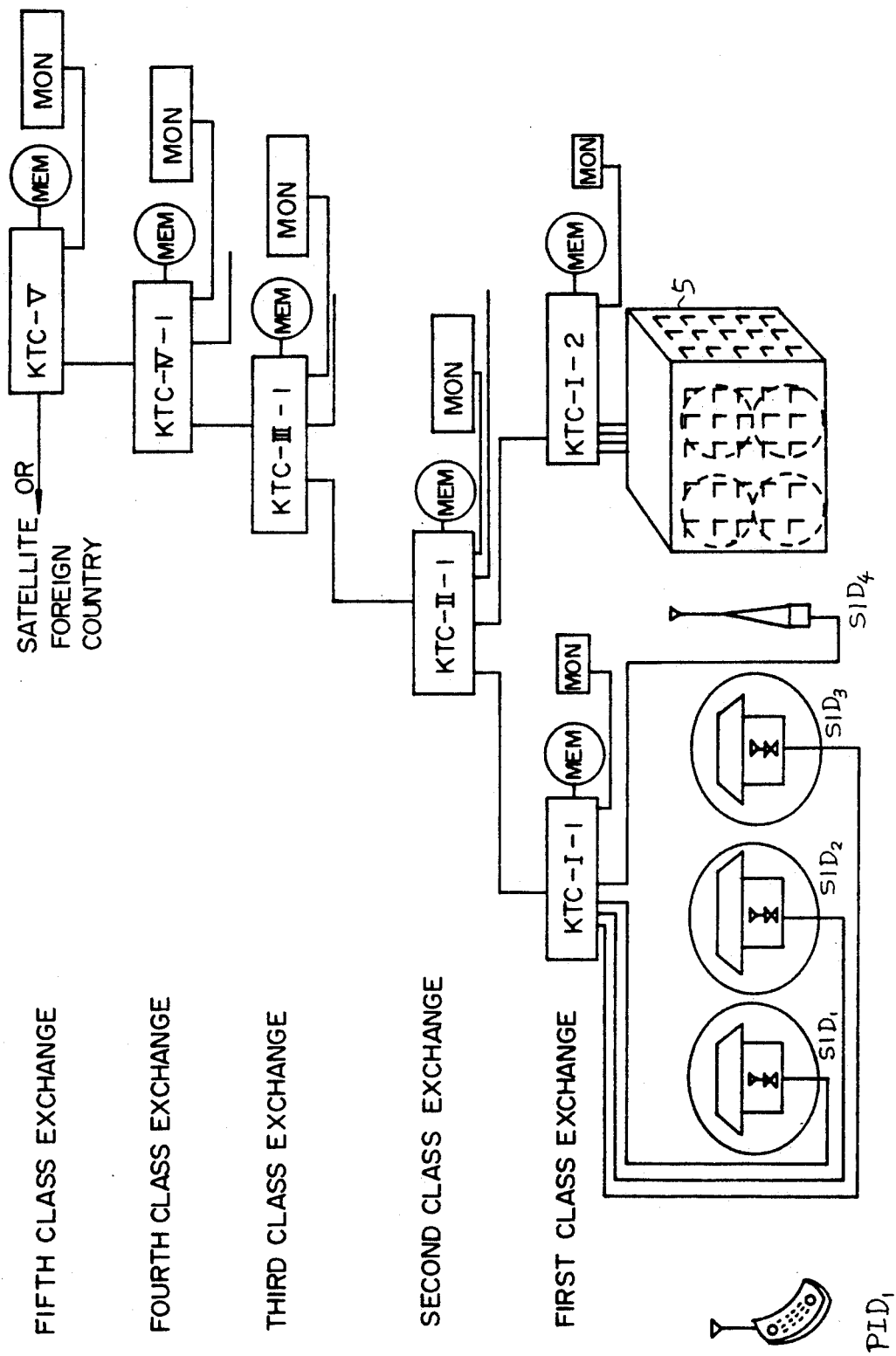

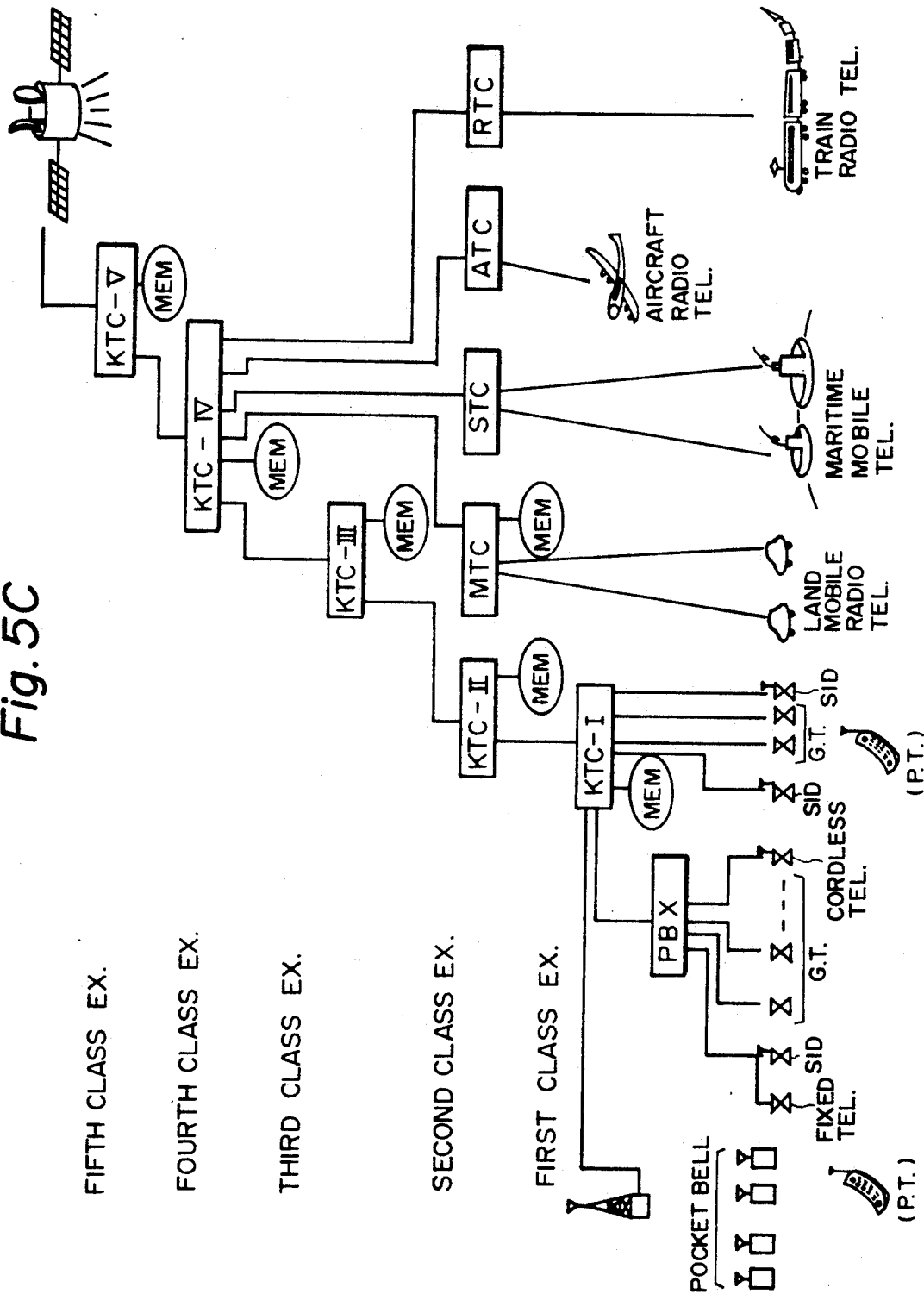

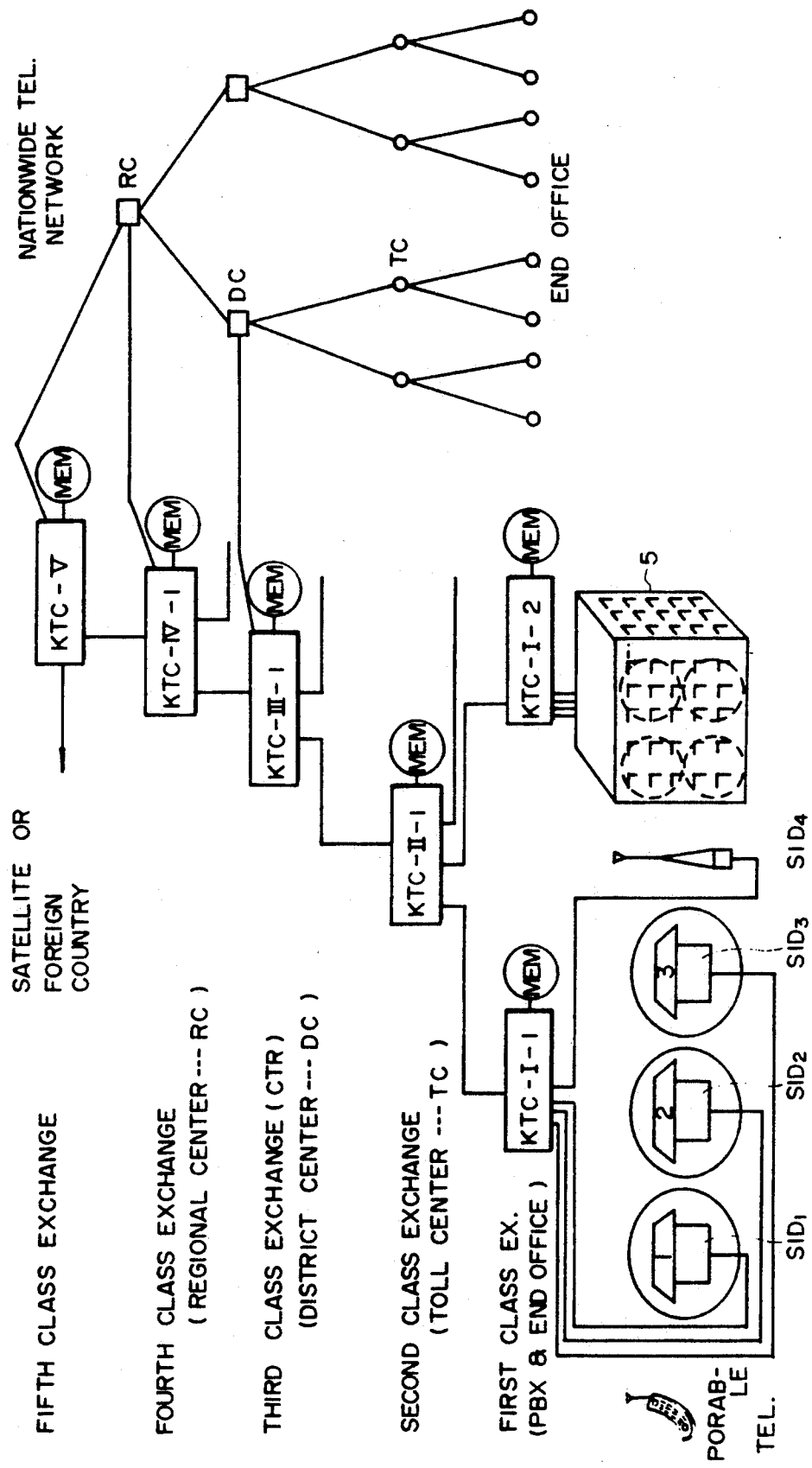

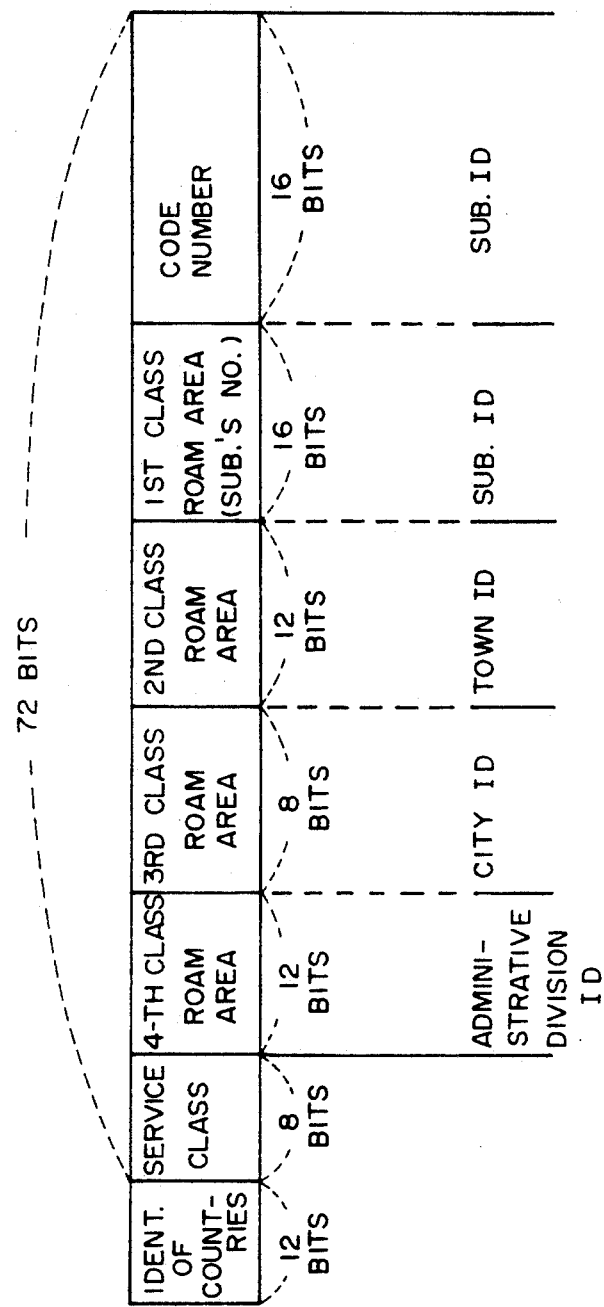

Fig. 7B (1)
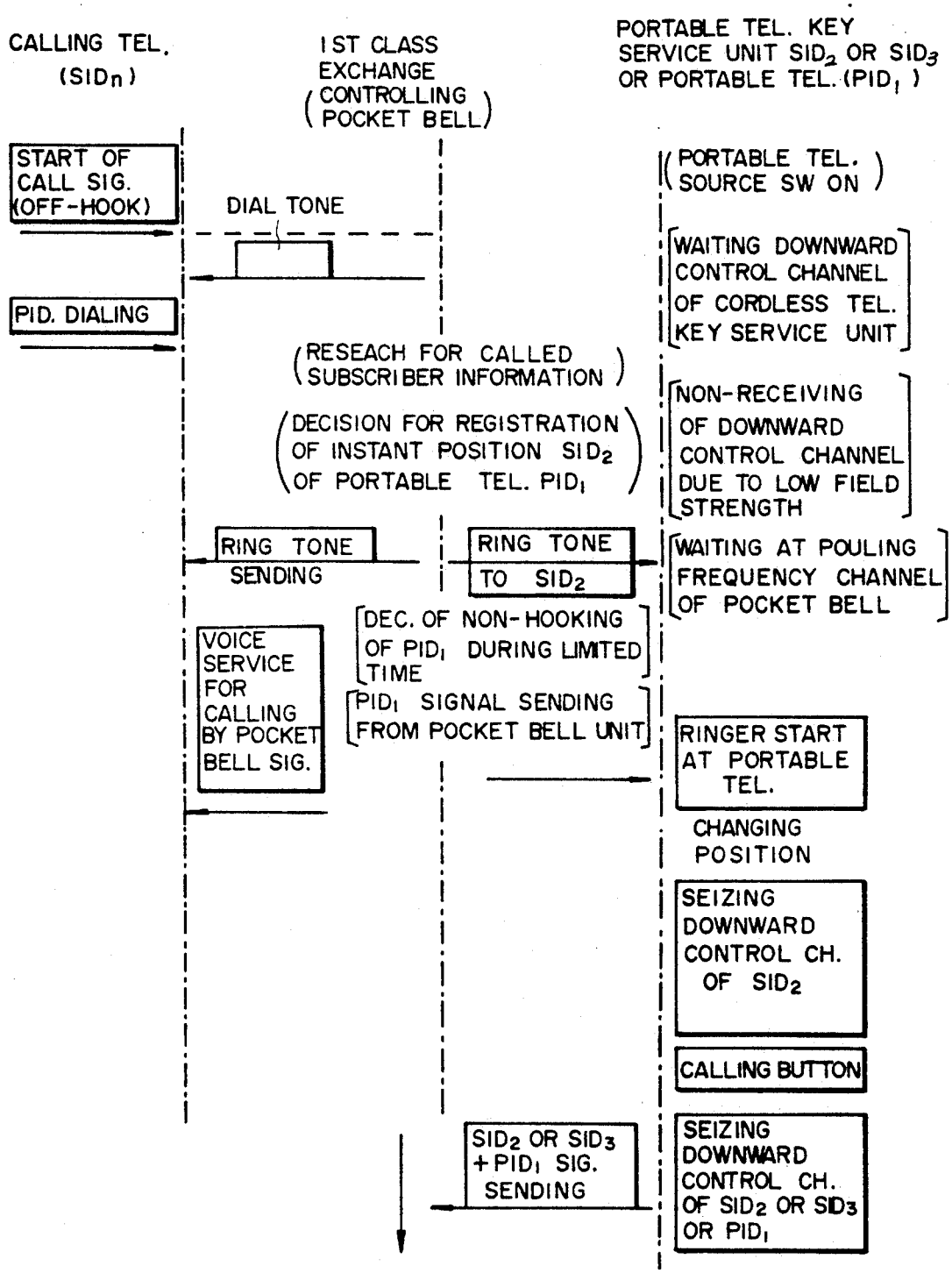

Fig. 7B (2)
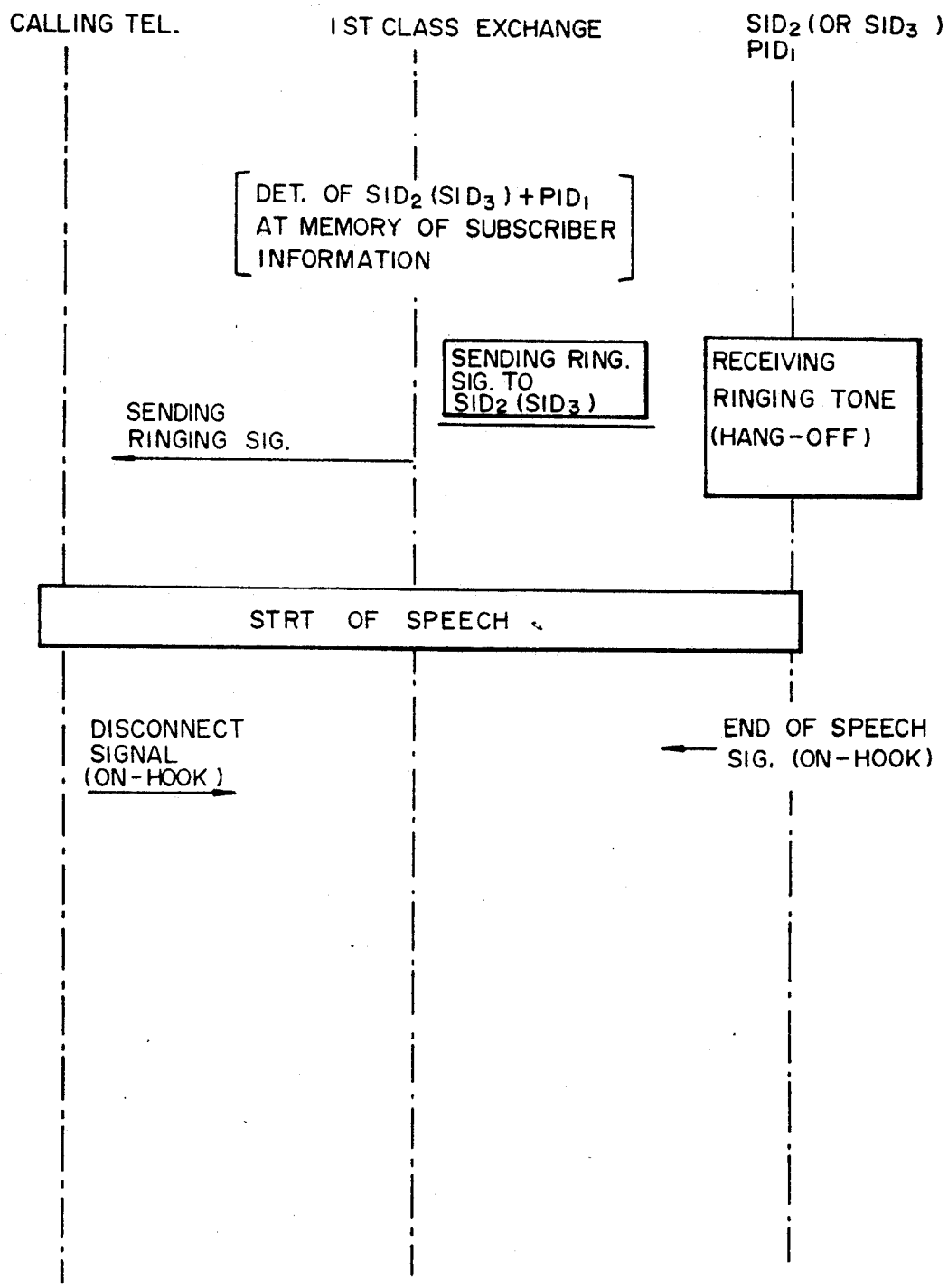

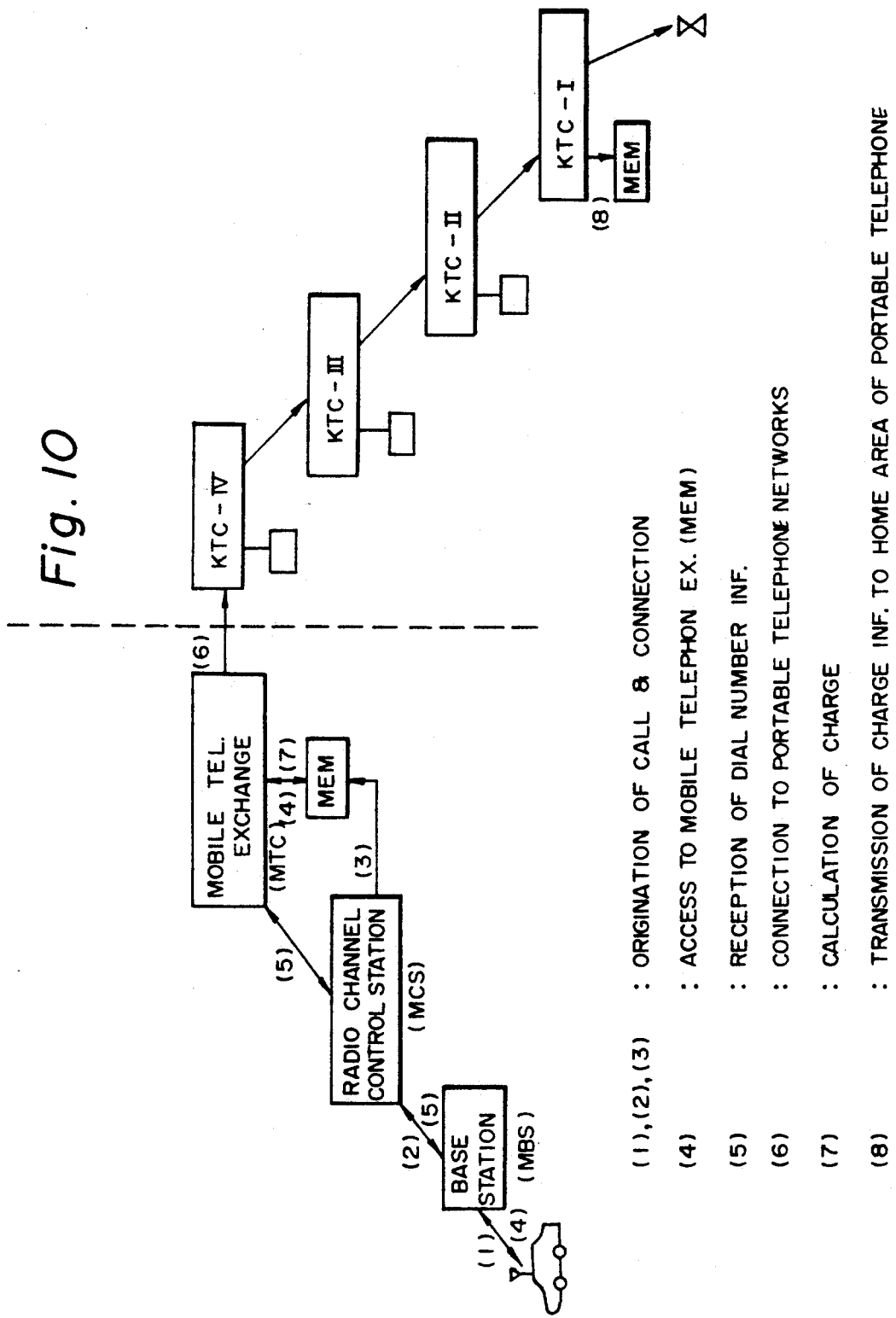

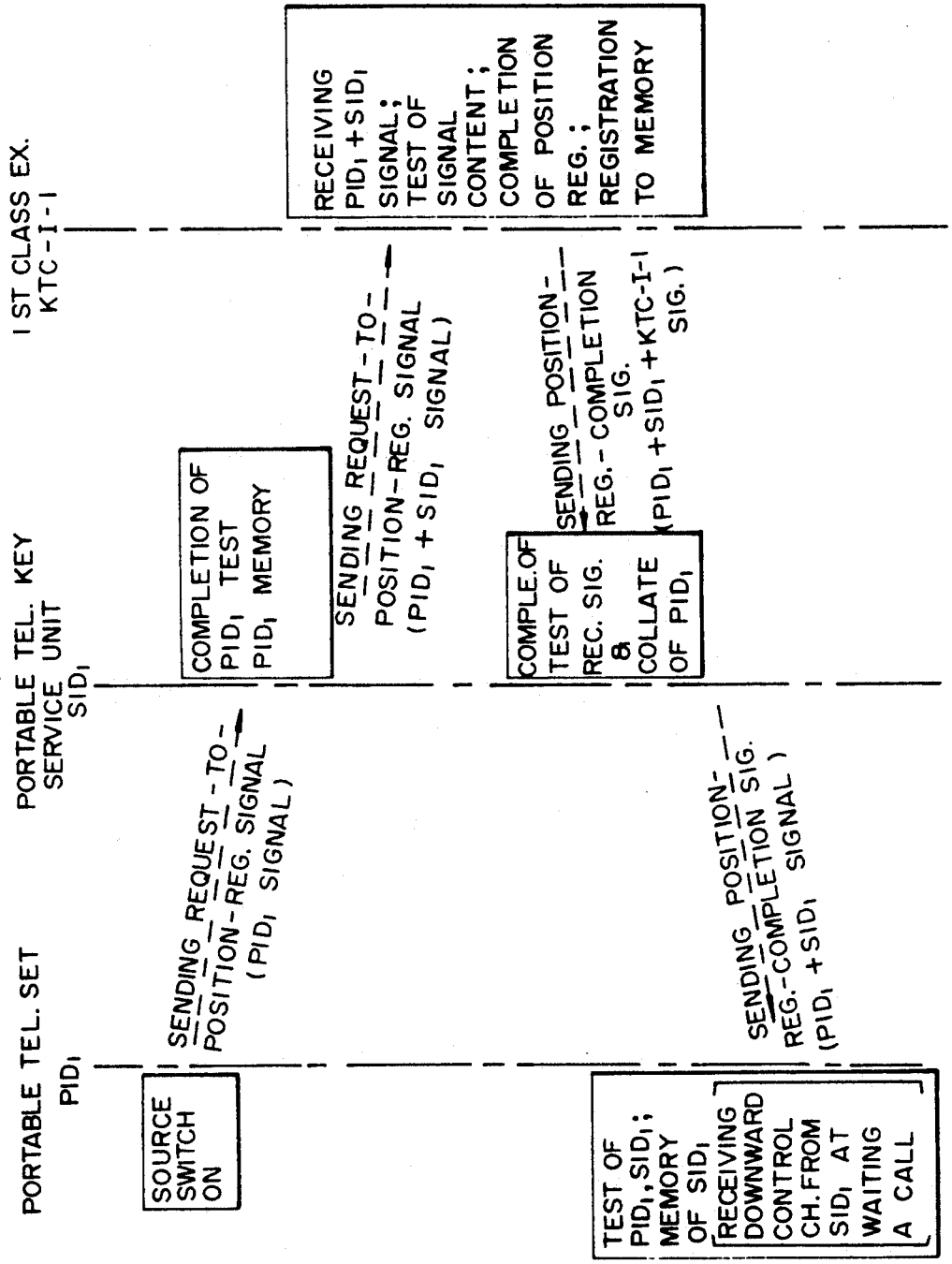

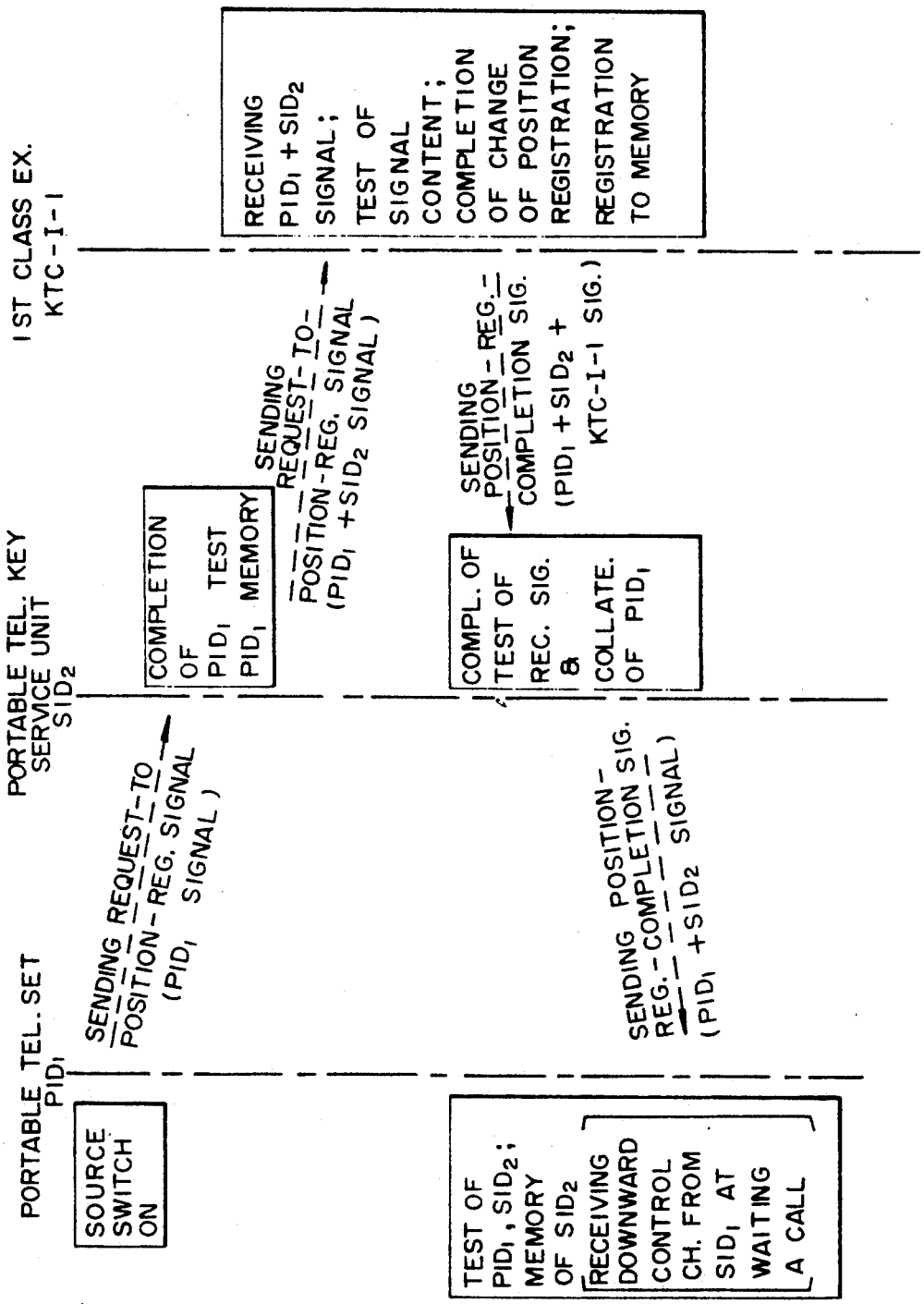

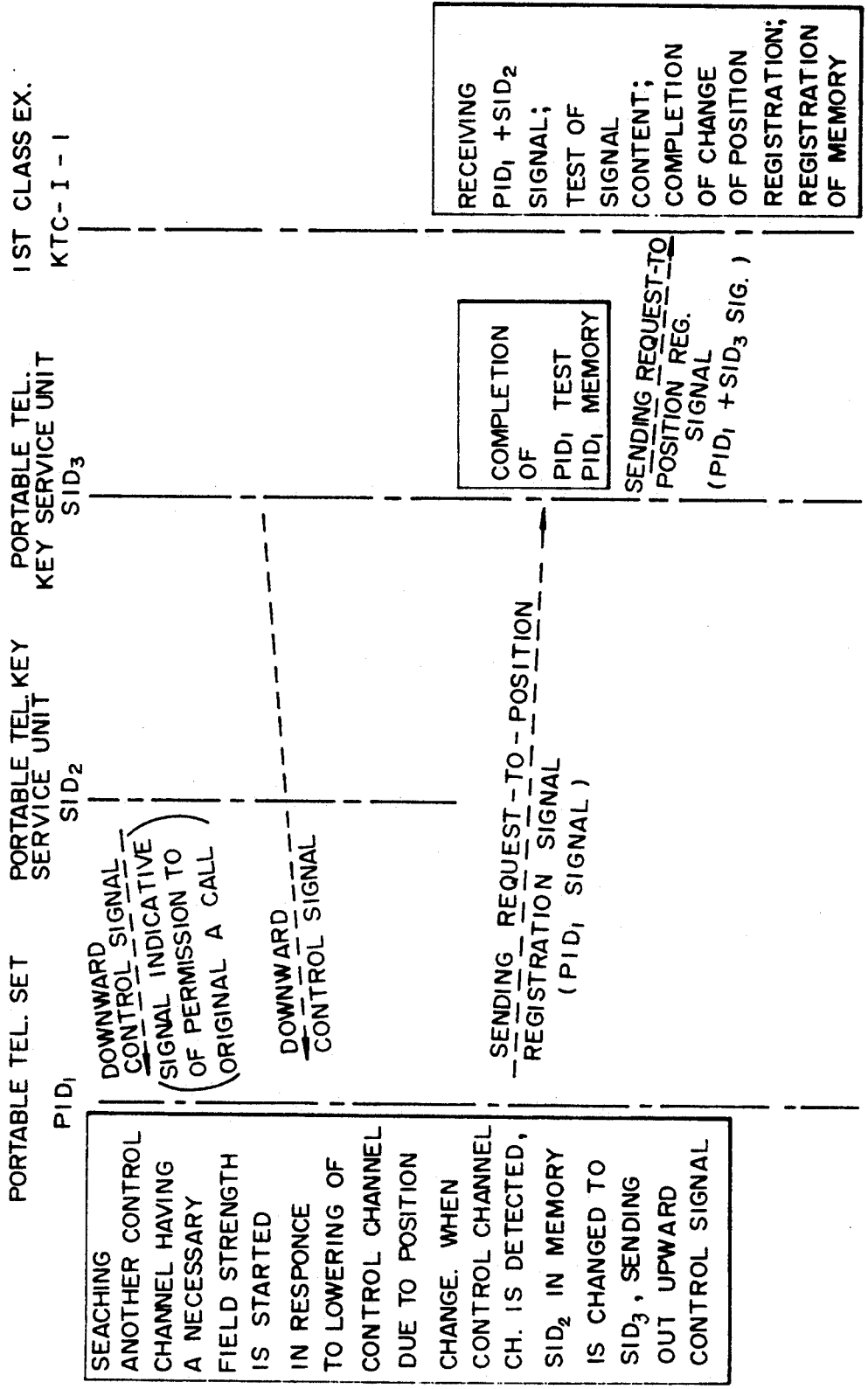

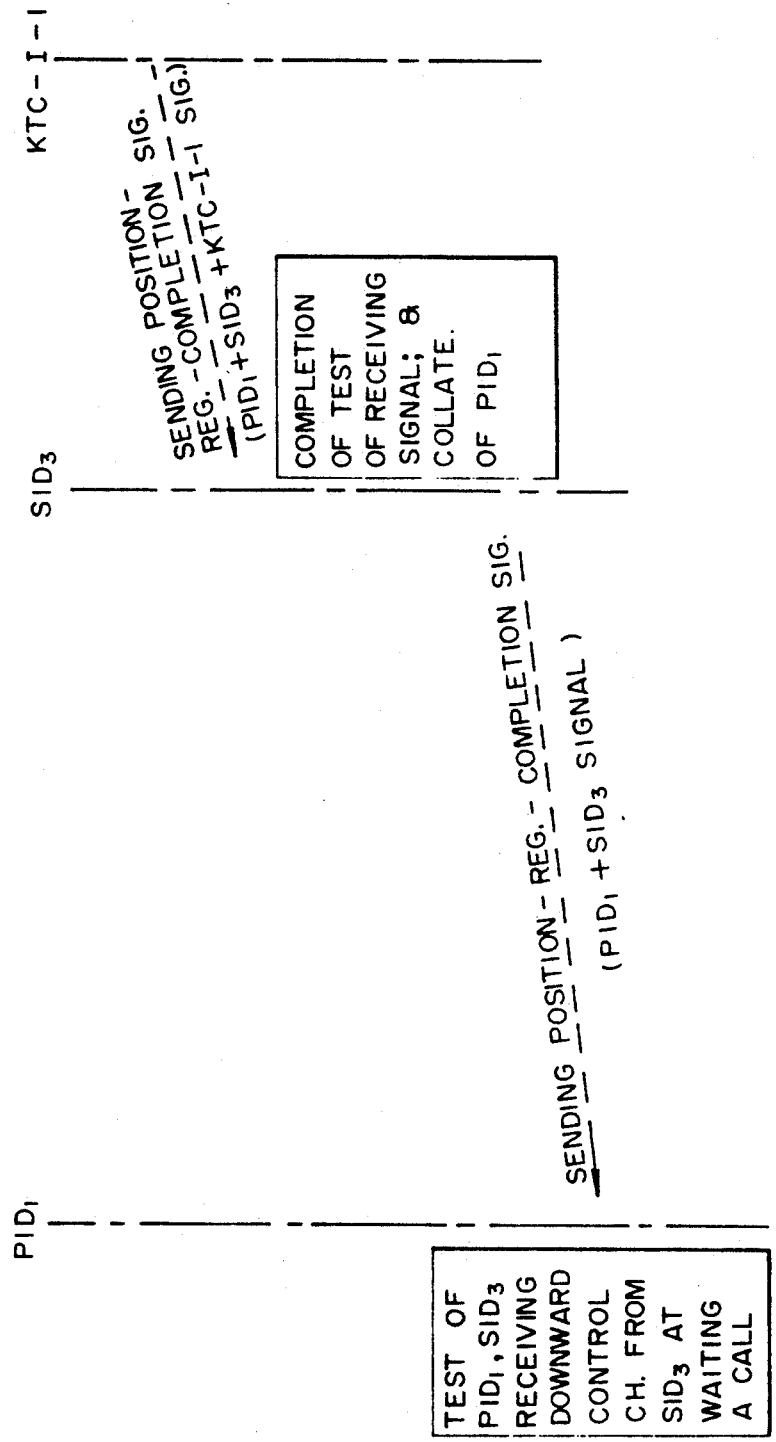
Fig.11C (2)

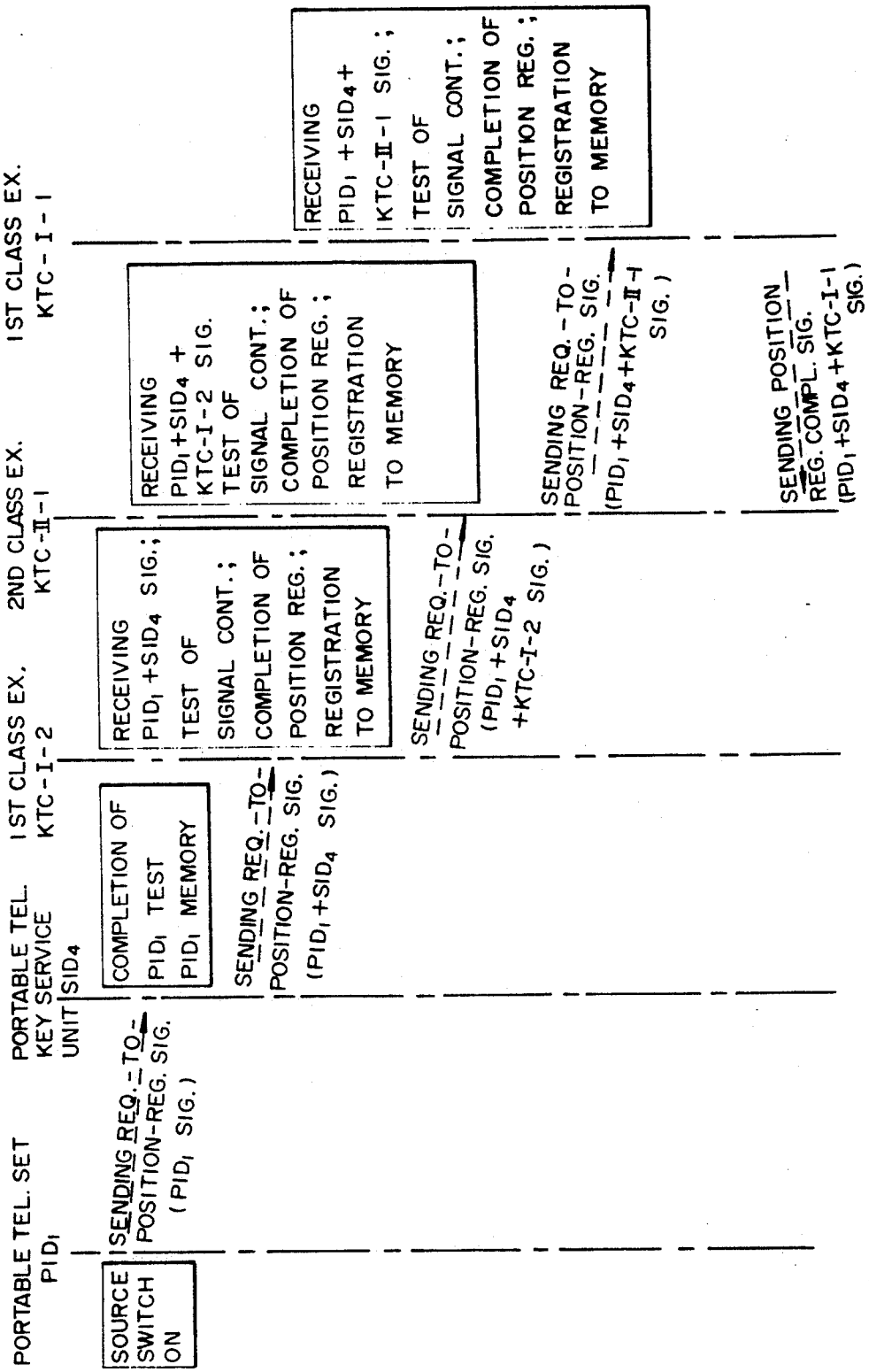

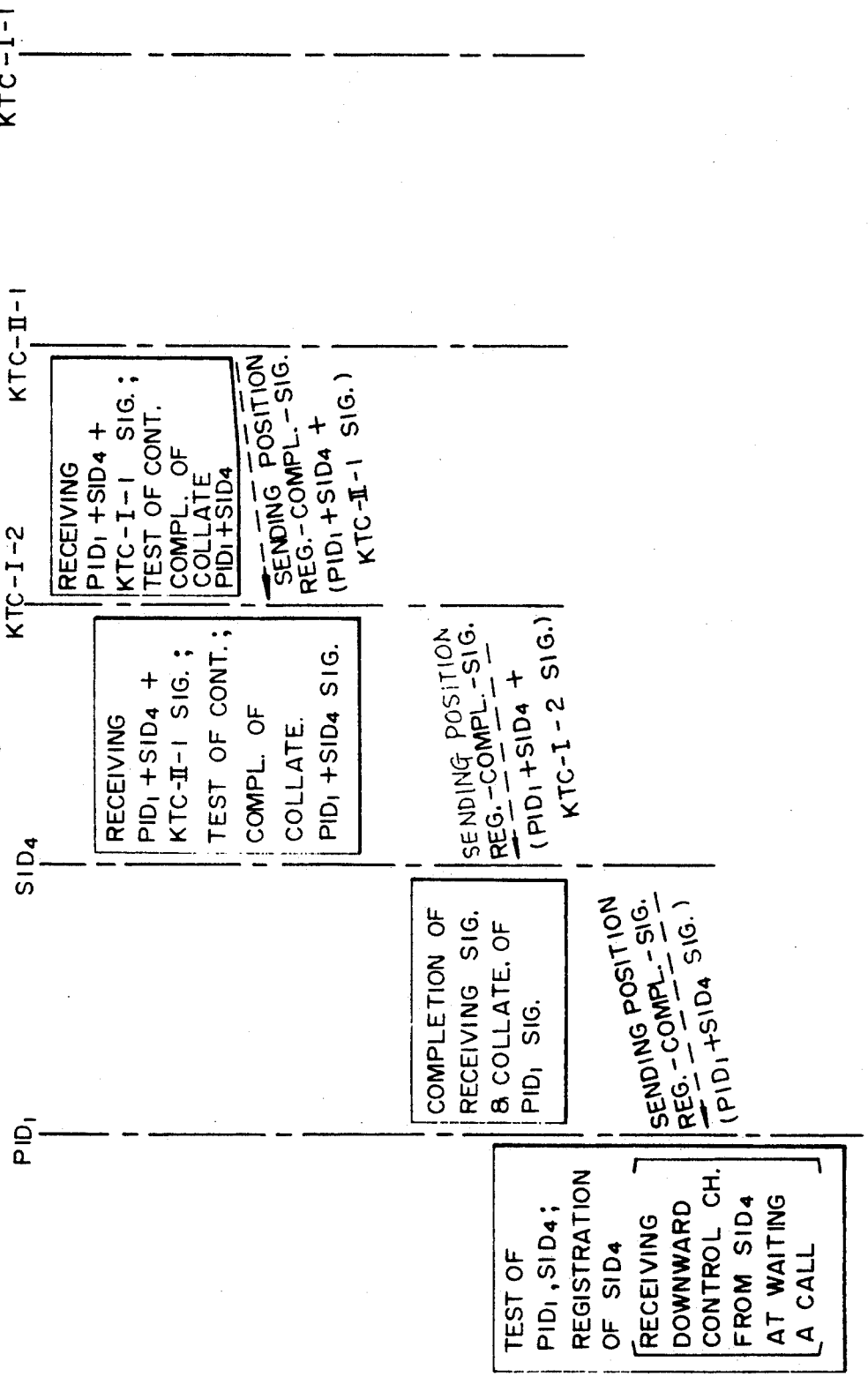

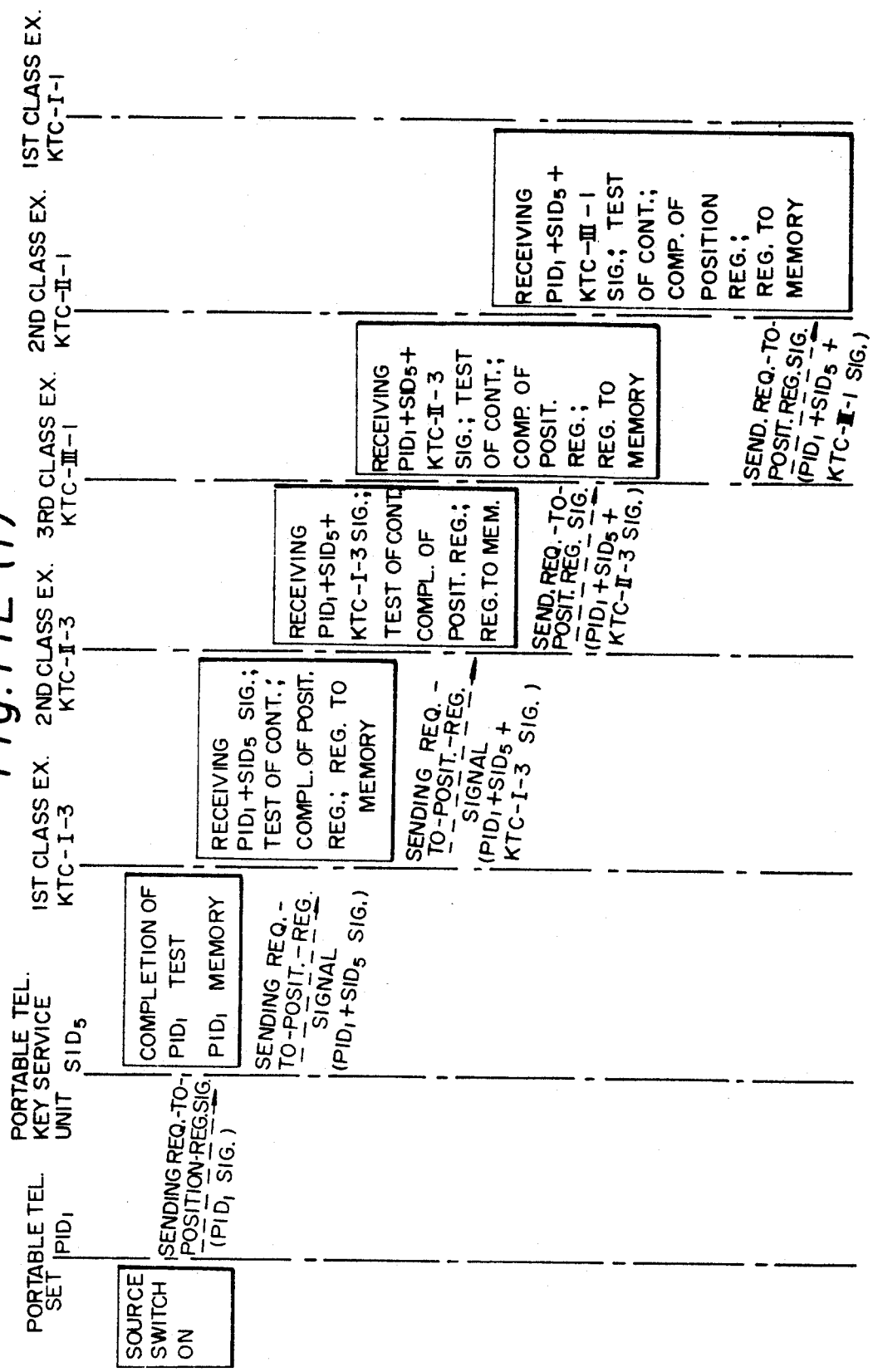

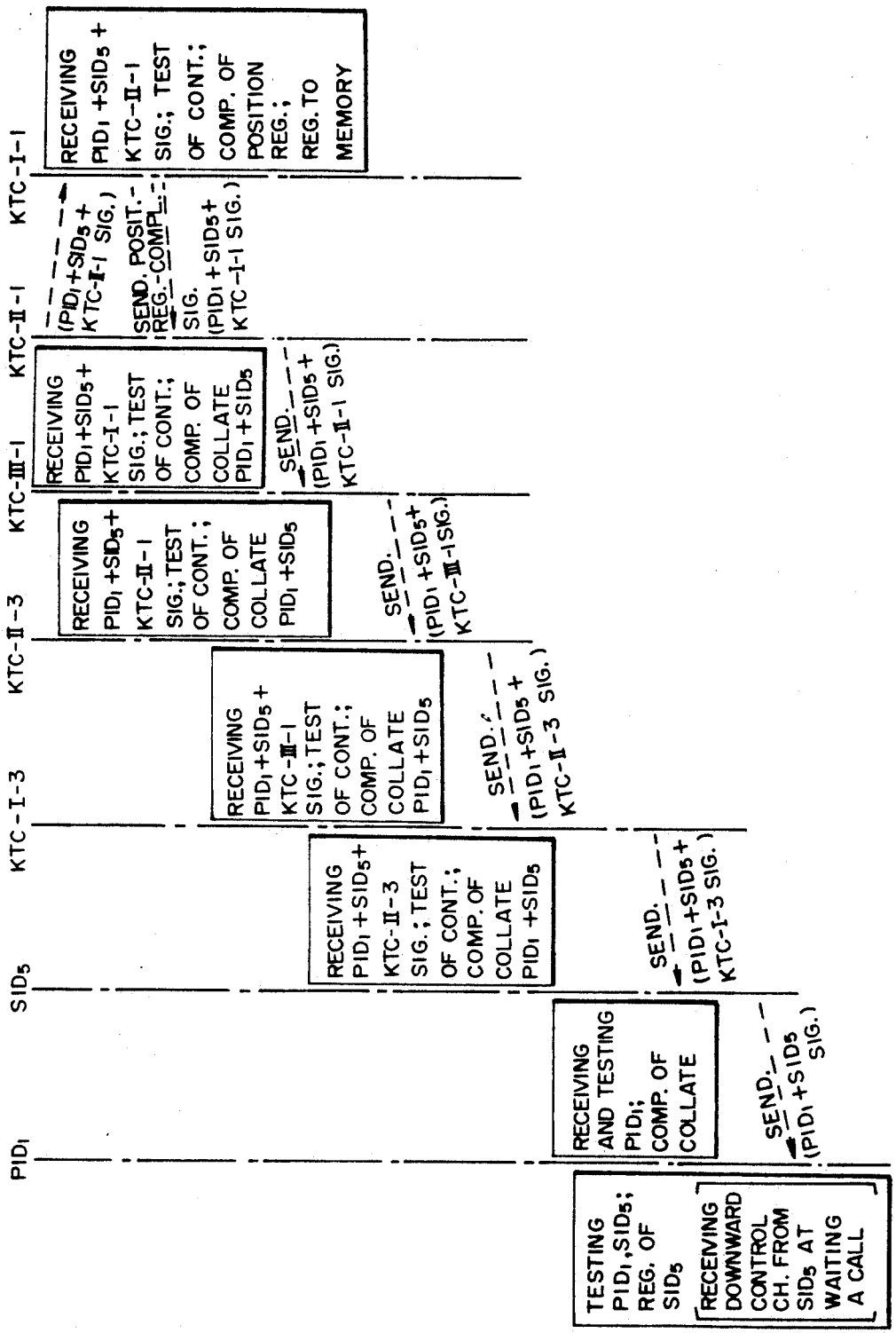

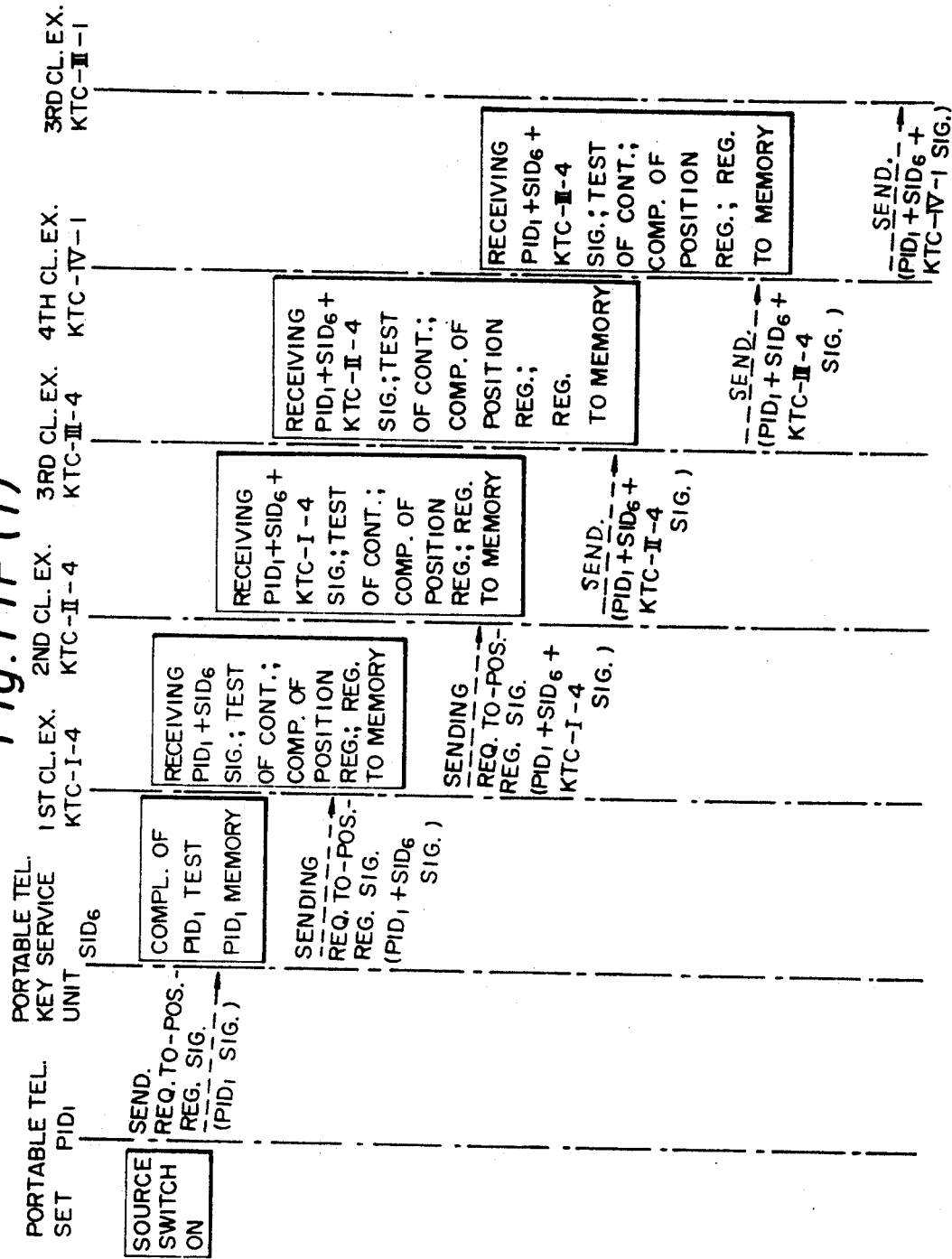

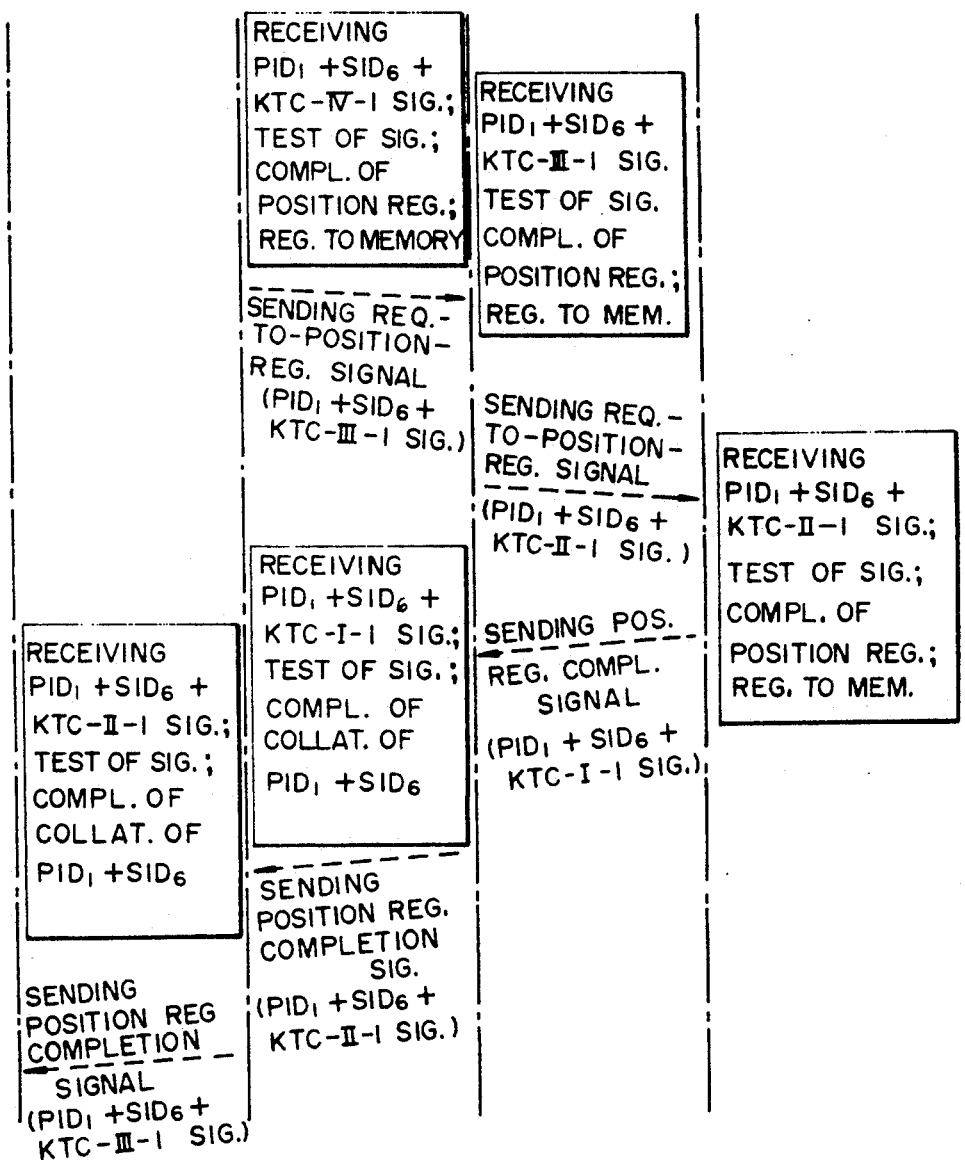
Fig. 11F (2)

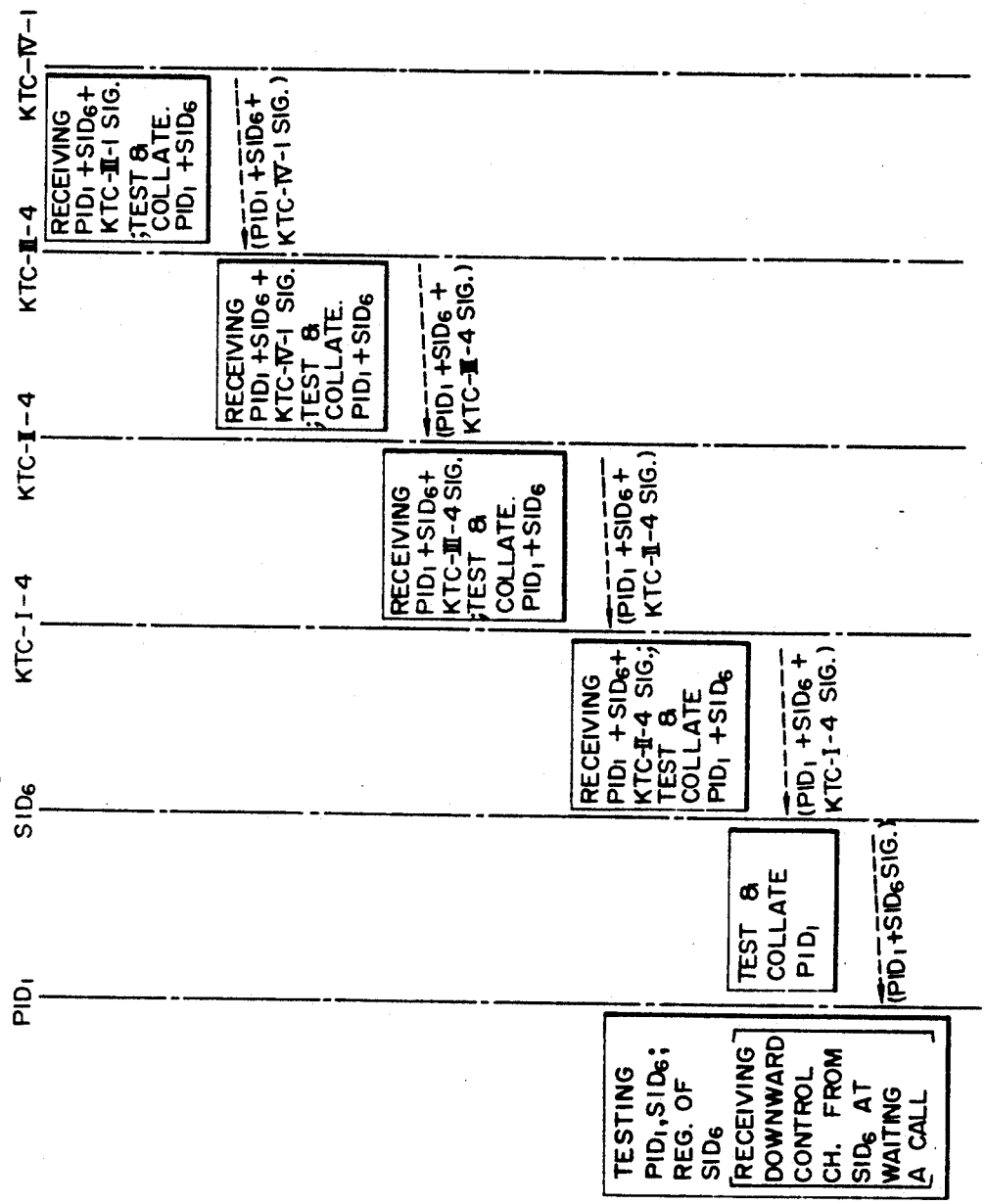

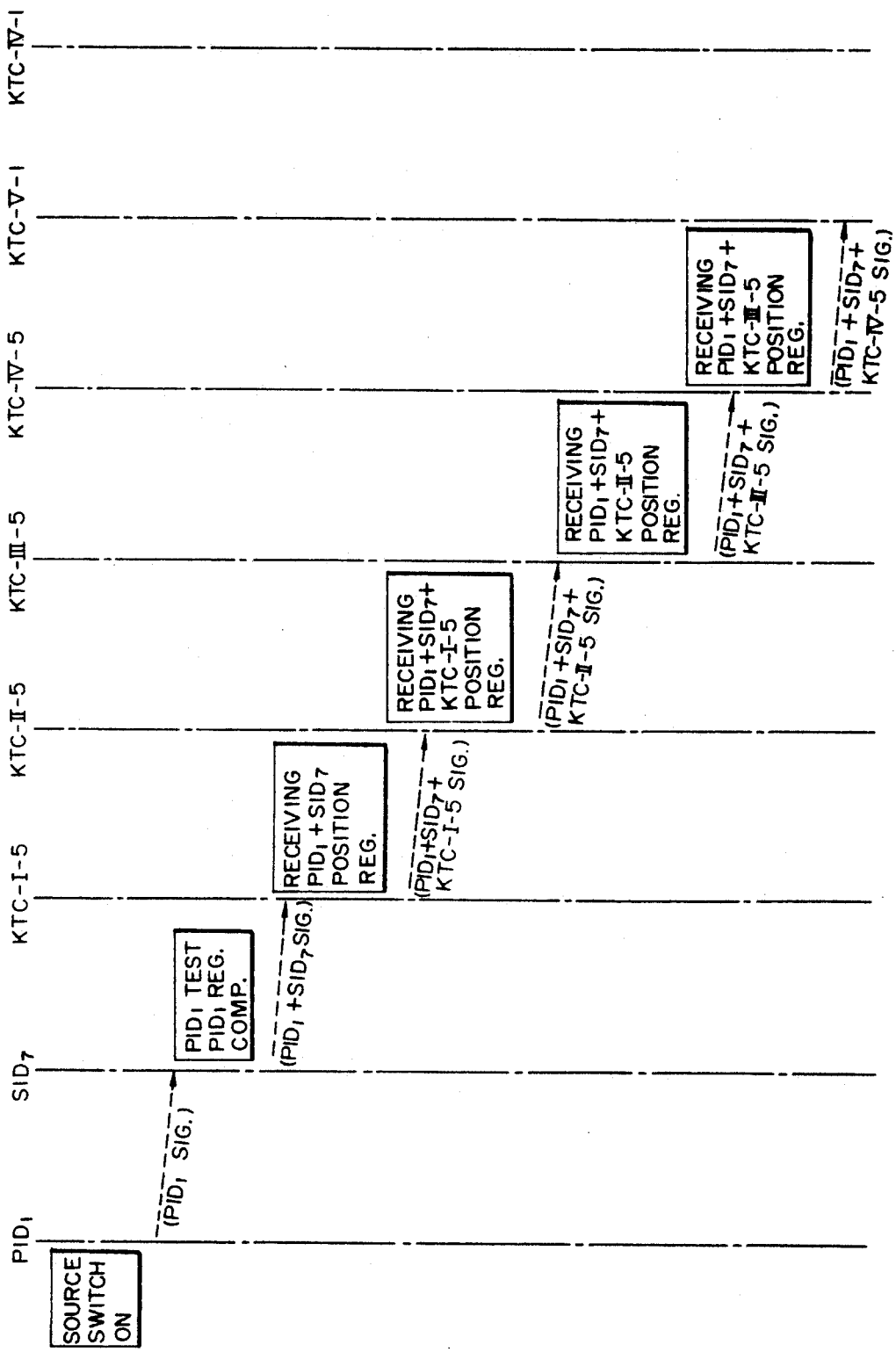

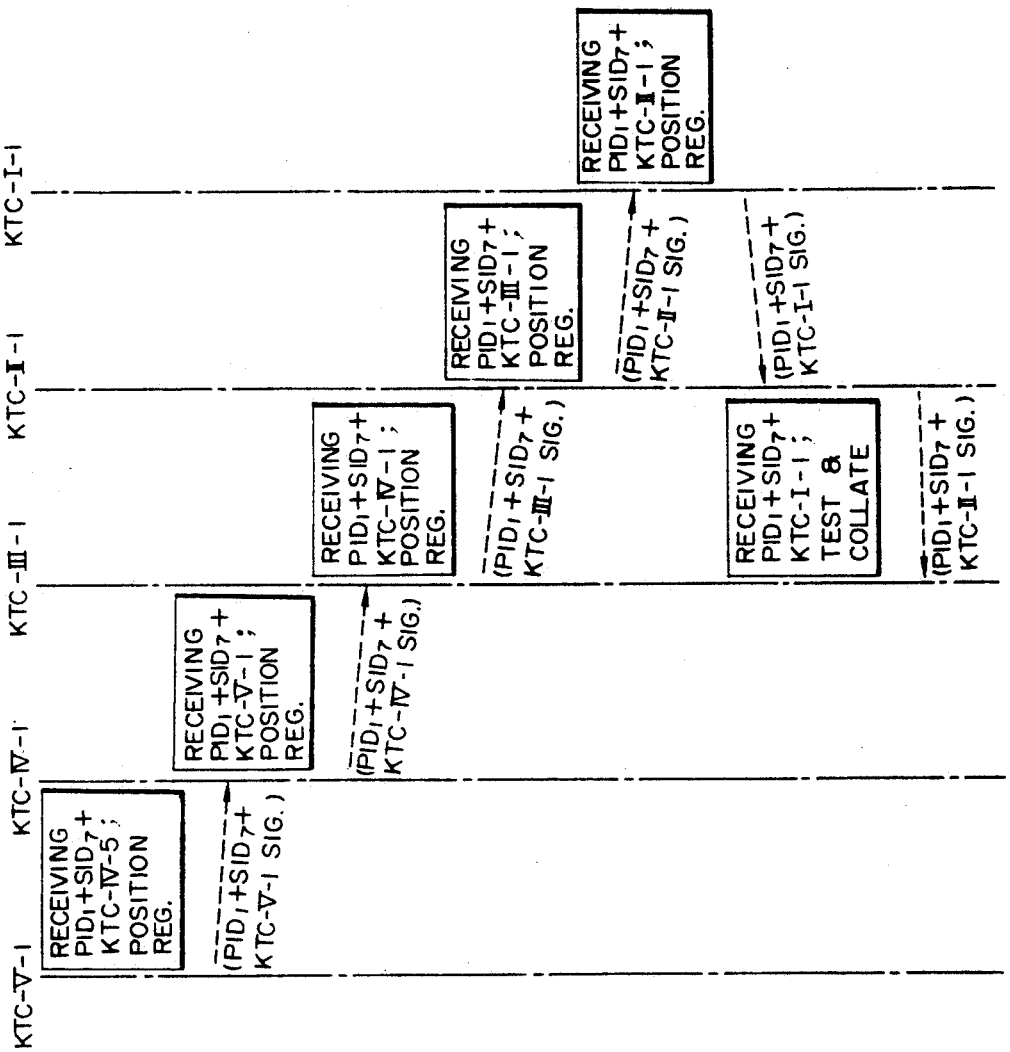
Fig. 11G (2)

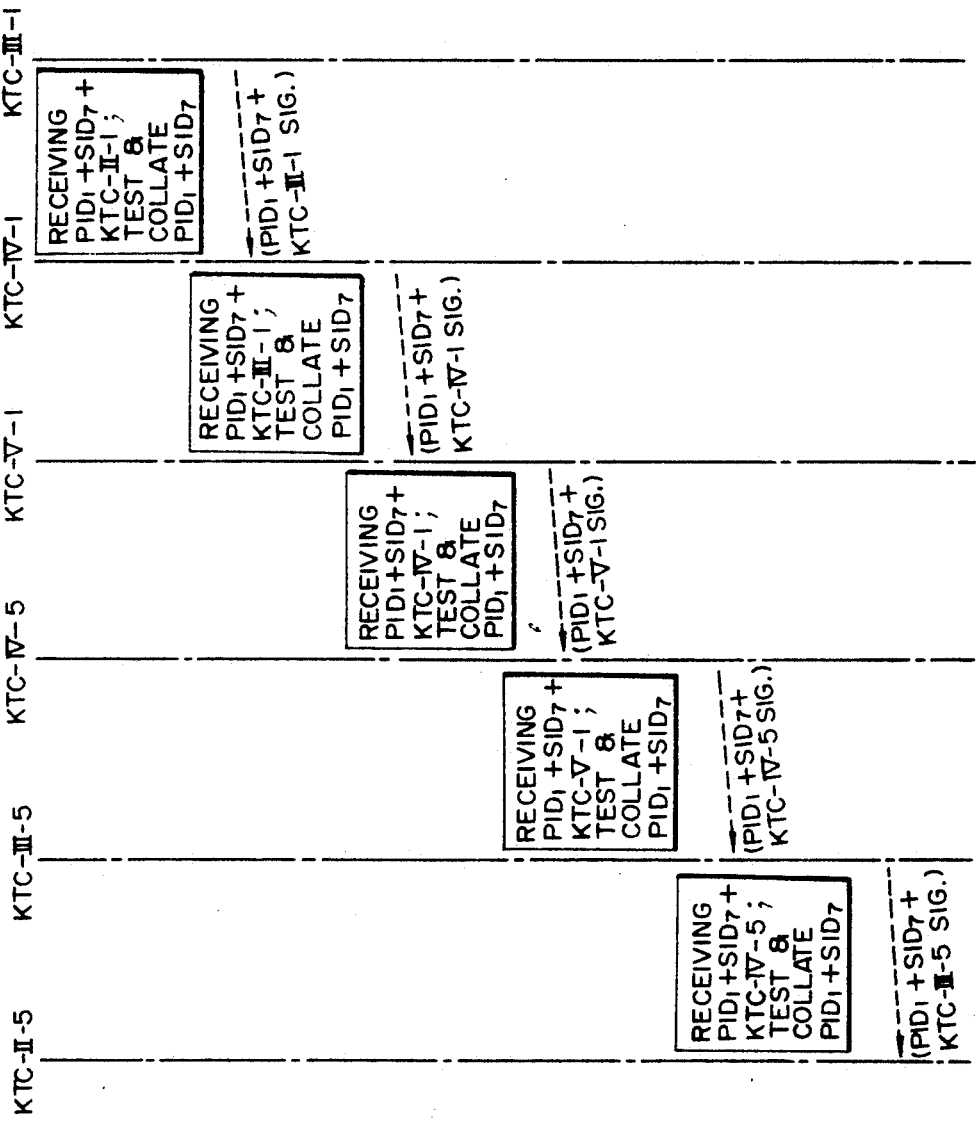

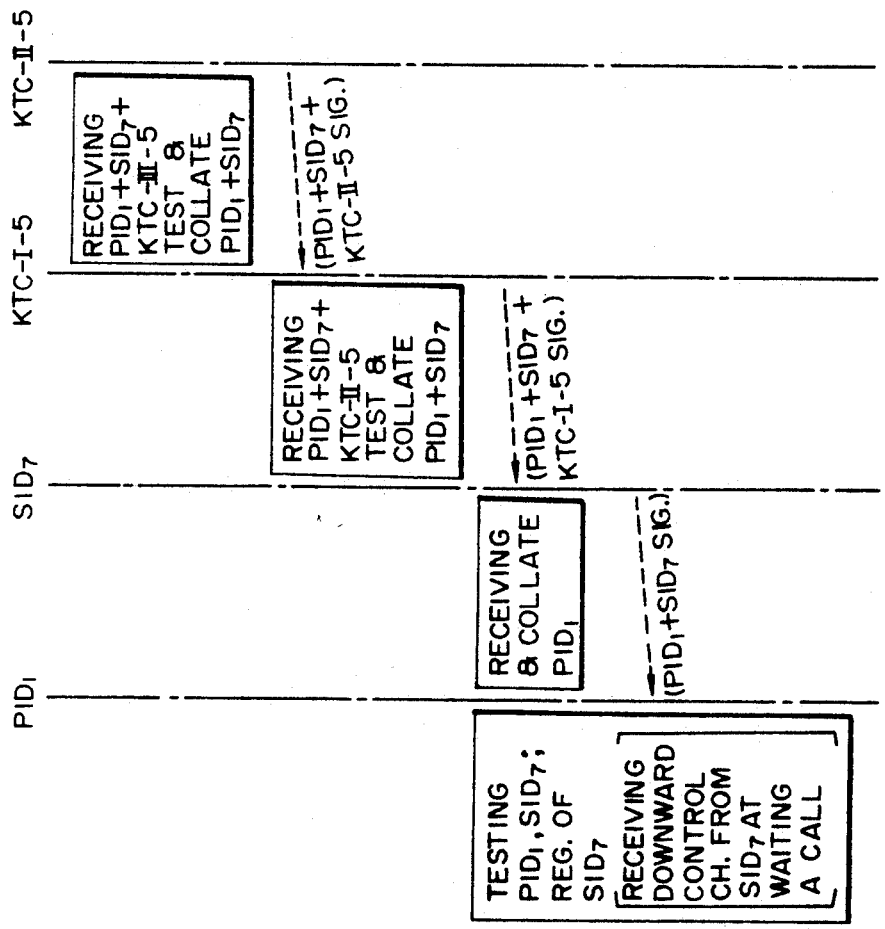

PORTABLE TELEPHONE SYSTEM

This is a continuation of application Ser. No. 07/547,386, filed Jul. 2, 1990, which is a continuation of application Ser. No. 07/396,442, filed Aug. 21, 1989, which is a continuation of application Ser. No. 07/107,418, filed Nov. 25, 1987, all now abandoned.

BACKGROUND OF THE INVENTION present invention relates to a system for setting up a channel in a portable telephone system using portable telephone sets, which are connected to a general public telephone network, a private branch exchange network, etc. and which can be carried to any place and are capable of originating and receiving a call.

At present a variety of mobile communications are in practical use in many countries. Of them, telephones primarily for voice transmission are a domestic maritime mobile radio telephone, a land mobile radio telephone, a cordless telephone, and a section party telephone within a station yard. These various mobile communications are respectively operated as independent systems; for instance, a cordless telephone could not start a call when it is brought in a car. This is evident from the fact that the cordless telephone and the land mobile radio telephone differ from each other in many points; for example, they use different working frequencies and different control methods for their control channels, and in addition, the input radio wave field strength necessary for the receiver of the called land mobile radio telephone would not be satisfied with the transmitting power of the cordless telephone.

Further, the cordless telephone generally comprises a portable telephone set and a key service unit which are connected thereto by way of a radio communication circuit and to an exchange by way of a wire communication circuit. In addition to this, the telephone set and the key service unit usually form a specific relationship to each other. The telephone set cannot communicate with a key service unit other than the specified one even if they happen to lie at a short distance over which radio communication could be established between them. Similarly, the key service unit is not permitted to communication with other telephone sets than the specified one.

This is a matter of course in some sense. It is undesirable if a portable telephone set and a key service unit which have no particular relationship to each other are connected without any conditions, because this will incur the possibility of mischarging or intentional shifting of a charge due on the connected telephone set to an unconnected one.

People have long been waiting eagerly for the appearance of a portable telephone system which technically overcomes the above-noted difficulties and enables a person carrying the portable telephone set to make a call from any place to any place at any time and to receive a call wherever he may go.

Even in a society like our country where the number of telephone terminals for public communication use is now as large as more than forty millions and where public telephone sets are accessible everywhere on the streets, not to speak of land mobile radio telephones on cars, train public telephones on Shinkansen trains, and domestic maritime radio telephones on ships, there still exists a strong demand for such a portable telephone system for the reason given below.

This is because everyone wishes to have a portable telephone for his exclusive use. That is to say, it would be extremely convenient if a person carrying the portable telephone could freely use it just like a telephone installed at his home, for there are cases where he feels askward, for some reason, to ask for permission to use a telephone at other people's office or home, where no public telephone can be found on the streets, where anyone does not happen to have small money or a telephone card with him, where no public telephones installed in front of stores or the like can be used late at night, and where it is troublesome to look for a public telephone at a crowded place like a ballpark or area for special events.

The same applies to receiving a call. It would be far more convenient than in the above cases if anyone carrying the portable telephone could receive a call from any place at any time wherever he may go. This is because although anyone can make a call from a nearby public telephone at any time it is unpredictable when he will be called while he is away from his home or office. Moreover, it is impossible, with the conventional telephone system, that two persons communicate with each other if they are moving in different places.

In addition, the portable telephone will enable an emergency or urgent call to be made more simply and more quickly than the systems now employed. Besides, it would be more convenient if the portable telephone set could be used for opening a credit (a credit function) or as a substitute for an identification card.

As described above, there is eager demand for the realization of such an ultimate portable telephone even at present.

To meet this demand, various systems have been proposed which are, however, unsatisfactory in many respects.

SUMMARY OF THE INVENTION

An object of the present invention is to provide a system for establishing a channel in a novel concrete portable telephone system which can be realized in a relatively near future, without the disadvantages of the afore-mentioned conventional portable telephone systems, and can essentially be called an ultimate portable telephone system.

A portable telephone system in which a plurality of i-th class exchanges accommodate at least one key service unit of a plurality of portable telephone sets present in each service area, and at least one (i+1)th class exchange, which accommodates the plurality of i-th class exchanges through junction lines, are stratified to form an exchange system so that i=1, 2, 3 . . . , and so that the (i+1)th class exchange covers all of the service areas. The exchange system has the function whereby information which specifies a home area predetermined from the service areas for each portable telephone set and the portable telephone set in distinction from each other is registered in the i-th class exchange and the (i+1)th class exchange which administer the home area.

BRIEF DESCRIPTION OF THE DRAWINGS

The present invention will be described in detail below in comparison with prior art with reference to the accompanying drawings, in which:

FIGS. 5A, 5B and 5C are block diagrams illustrating embodiments of the present invention applied to the whole area of the country;

FIG. 5F is a block diagram illustrating a connection system between the system of the present invention and another network;

FIG. 6 is a diagram illustrating a signal format employed in the system of the present invention;

FIGS. 7B and 7C are flow charts illustrating signal flows at different states in the system of the present invention;

FIGS. 11A, 11B, 11C, 11D, 11E, 11F and 11G are flow charts emplanatory of operations in the present invention.

DETAILED DESCRIPTION

To make differences the present invention and prior art, examples of prior art will first be described.

Figure 1:
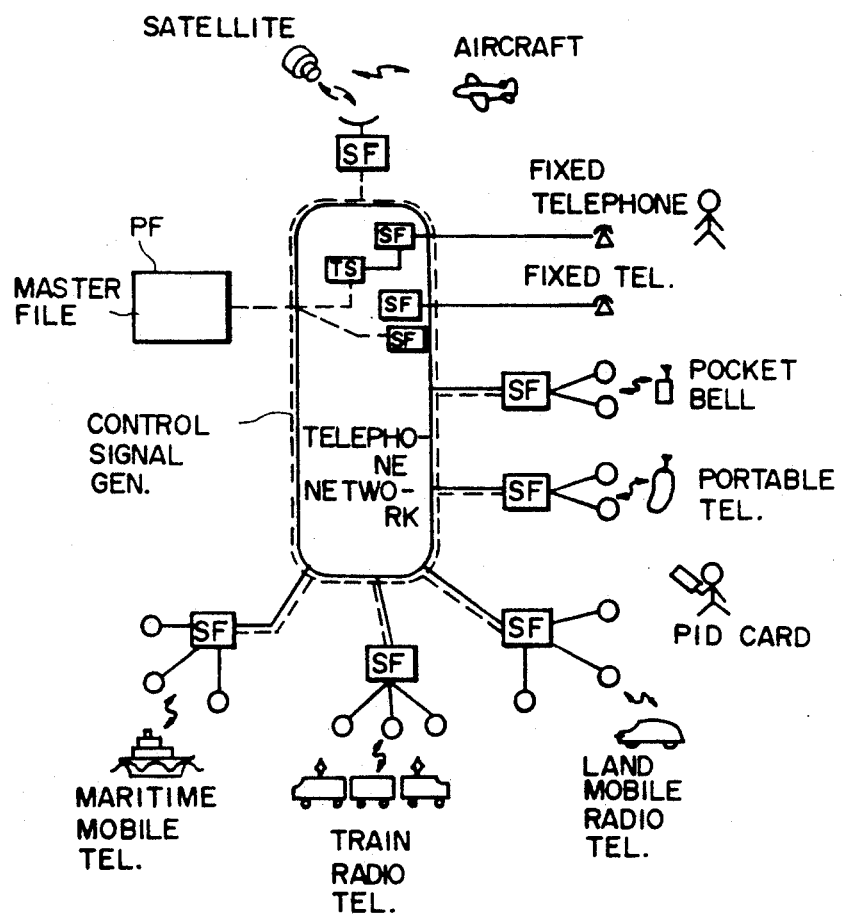
FIGS. 1 and 2A are block diagrams illustrating examples of conventional systems.

A first one of them is to offer a "personal telephone service" (Institute of Electronics and Communication Engineers of Japan, Society for the Study of Circuits and Information, Material IN82-21). The system of this plan (which is called the PID plan) is as follows:

FIG. 1 shows a conceptual drawing of a communication network based on the PID plan.

Each subscriber is given, for instance, a magnetic card with his personal identification number (PID) written therein. The PID written in the PID card can be used in common to terminals of a fixed telephone, a land mobile radio telephone, a train radio telephone, and so forth. Each terminal number will hereinafter be referred to as SID. The PID is announced publicly on a telephone directory, for instance.

The fixed telephone, the land mobile radio telephone, and a terminal which will be developed in the future are all equipped with a function of reading out the PID of the PID card and sending the readout information to the communication network.

The communication network has a master file PF for storing subscriber information (the SID, charging information, etc. of each subscriber) corresponding to the PID and is equipped with a connection control function of setting up a communication circuit between calling and called terminals on the basis of the call receiving SID which each terminal has read out of the master file PF.

When arriving at a place where the above-mentioned terminal is provided, each subscriber registers the call receiving SID, using his PID card. When a person who wants to communicate with this subscriber dials the PID in the same manner as is the case with the conventional telephone, an exchange on the side of the calling terminal accesses the PID file, reads out therefrom the SID corresponding to the PID of the called subscriber, and connects the calling terminal to the called one in the same way as in the case of conventional switching connection. As is evident from the connecting sequence, the calling subscriber is able to communicate with the called subscriber directly and instantaneously even if the former does not know where the latter is.

Further, whenever the subscriber uses his PID card for making a call, charging information is recorded in detail on his PID file irrespective of which terminal he used. Accordingly, this will preclude the necessity of distinguishing between public telephones and the subscriber's station.

When the above-described system has been put to practical use, the subscriber can make a call from a nearby fixed telephone to a desired place and receive a call. However, he cannot originate or receive a call while walking the streets, for example.

Moreover, since the centralized PID file (PF) is disposed at only one place in one country as shown in FIG. 1, the traffic of an access to the PID file will pose a problem. Now let it be assumed that the file of a PID subscriber living in Sapporo where is located north of Tokyo is accommodated in the PID file provided in Tokyo. This will be an appropriate assumption since the PID file is placed at only one place throughout in Japan. Consider that the PID subscriber enters his PID information into a telephone terminal of his next-door neighbor. Then the information must be transmitted to the centralized file at Tokyo and rewritten. That is, although the PID subscriber moves only several tens of meters, the data must be transmitted from Sapporo to Tokyo and then from Tokyo to Sapporo (a confirmation signal).

Since such a data transmission takes place on a nation-wide scale, the above system is seriously disadvatageous in terms of traffic and transmission cost.

Recently another system has been proposed for solving these problems ("Proposal of Mobile Message Communication System", Society of Electronics and Communication Engineers of Japan, Society for the Study of Communication System, Material CS85-139 (Jan. 23, 1986)).

Figure 2A:
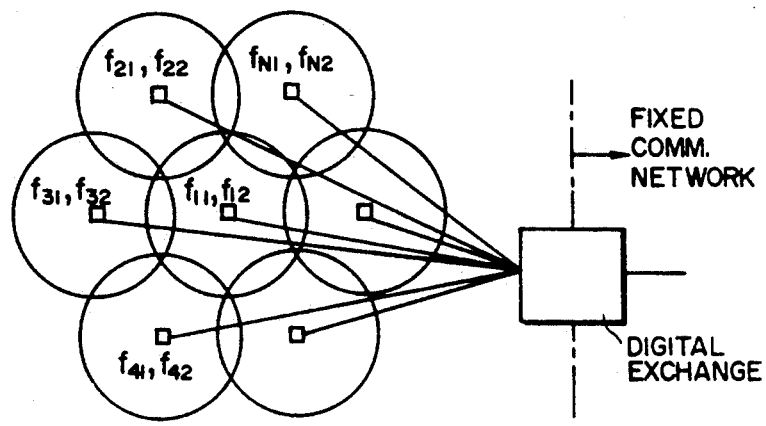

The above literature states that it is difficult to realize the portable telephone which is an ultimate means for communication, and proposes such a specific operative example of the mobile message communication as follows:

FIG. 2A shows the basic structure of a simple ALOHA system, in which frequencies of one up channel and one down channel are allotted to each radio service zone. A message to a mobile station is sent to a base station via a digital exchange of a fixed communication network and is transmitted as a packet from the base station. The called mobile station verifies that it has received the message correctly, and then sends an answer signal to the calling party via the base station, and the calling party verifies that the message has reached the called mobile station. The mobile station stores the message and indicates its reception to the calling party. The called party reads out the stored message.

Calls occur at random from mobile stations. Since the mobile stations use the same frequency in the same service zone, a contention will occur with some probability. In the absence of an answer signal from the called party, the calling party re-sends the message. Where the message cannot correctly be received owing to bad conditions for propagation, the base station detects an error and requests the calling party to re-send the message.

As will be seen from the above, this system is a non-real time, stored communication which uses a message (a sort of telegram) instead of a voice and hence does not fulfill the requirement of instantaneous communication. Further, the above-mentioned literature does not clearly state the actual system configuration and other details on the ground that they are problems to be solved in the future. Accordingly, the realization of this system will take much time for solving the technical problems.

The following is a cordless telephone system the service zone of which is made somehat wider through utilization of the prior art (Japanese Pat. Appln. No. 74143/82).

This is a cordless telephone system using cordless telephone stations, which are each connected by radio media to a key-station radio unit provided at the terminal of each subscriber line of a wire communication switching network and then connected via the key-station radio unit to the wire communication switching network. The cordless telephone stations are each provided with means for automatically transmitting in an encoded form a subscriber's number different from that of the subscriber line. Each exchange is equipped with means for decoding the encoded subscriber's number to detect the exchange to which the cordless telephone belongs and for sending to the exchange positional information and charge totaling information of the cordless telephone. The exchange has means for transferring an incoming call or totaling charges on the basis of the above-mentioned information.

However, this system is based on the assumption that its service area covers a single limited district or city. Accordingly, in the case of employing this system over a wider area such as the Kanto district in Japan, the central districts of Japan, or the nationwide area, the amount of transmission for signal transfers will increase, which will lessen the technical and economical effects of the system, as is the case with the aforementioned "Personal Telephone Service". In addition, this system achieves at least wide coverage but has the shortcoming that a subscriver's number different from that of the subscriber's line must be given as the cordless telephone number.

Moreover, study is being given a mobile communication system which combines subscriber telephone systems of respective mobile radio communication systems so that each subscriber needs only to have one kind of equipment for connection to the communication network from any place (Japanese Pat. Appln. No. 151136/83). This is a mobile communication system which is intended to permit economization of subscriber's equipment and economic removal of a dead zone in a service area. This mobile communication system has a land mobile radio telephone base station, a portable telephone radio base station connected to one wire communication switching network, and a cordless telephone host device connected to one terminal of the switching network, and each mobile subscriber's device is arranged so that it can be connected to either of the base stations and the host device by way of a radio communication circuit.

With this system, however, when a cordless telephone subscriber uses the cordless telephone, for example, in a car, radio waved from the land mobile radio telephone base station can be received but radio waves emitted from the cordless telephone cannot be received by the base station. The reason for this is that the transmitting power of the transmitter of the land mobile radio telephone is 5 watts at present, whereas the transmitting power of the cordless telephone is 6 milli-watts, which is 1/800 the transmitting power of the land mobile radio telephone.

If the transmitting power of the cordless telephone were increased to 5 watts or so, the base station could receive the radio waves from the cordless telephone, enabling communication. However, this inevitably increases power consumption, which results in a substantial reduction of time for which the subscriber can carry the cordless telephone with him, and when a battery of large capacity is employed, the cordless telephone will become bulky and hence inconvenient to carry. Accordingly, such a cordless telephone will be defined as a modification of the land mobile radio telephone rather than the portable telephone.

Therefore, the above system is an inconvenient system appreciably different from the portable telephone system which enables communication between any places at any time.

The four proposed systems mentioned above can be considered as approaches to the portable telephone system; they fulfill-some of the requirements for the ultimate portable telephone system but are still inconvenient to users and there is yet much to be done for further technical development.

Figure 2B:
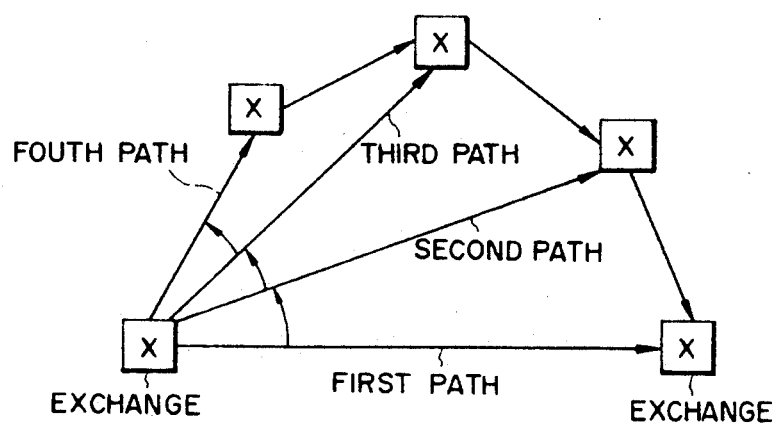
FIGS. 2B and 2C are block diagrams illustrating examples of routings in conventional systems.

When a subscriber originates a call, a communication circuit is connected from a station (the calling station) in which the subscriber is accommodated, via some relay exchanges, to a station (the called station) in which the called subscriber is accommodated. Generally there are a plurality of connection paths in a composite network, and the selection of one of them is referred to as routing. In the telephone network, when communication circuits of a first selected route (In the connection path, communication circuits from a certain station to the next station are called a route.) are all busy, communication circuits of a second route are selected. Where the communication circuits of the second route are all busy, a third route is selected. In this way, routes are selected one after another. Such a routing method is referred to as multi-stage alternate routing, and a system which sequentially switches trunks through use of this method is called an alternate trunking system as shown in FIG. 2B.

Figure 2C:
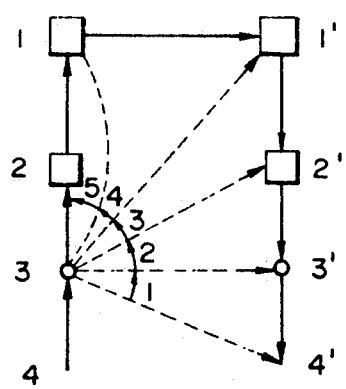

To satisfy the above conditions, the telephone network now employs a far-to-near-rotation method which is a king of multi-stage alternate routing. According to this method, routes from the calling station to exchanges on a multi-stage star network from the calling station to the called station are selected in order of their distances from the calling station, beginning with the longest as shown in FIG. 2C.

This method is advantageous in that extra equipment can be dispensed with by preferentially using transversal trunks of shorter distances, that the transversal trunks can be used with high efficiency, and that calls overflowing the transversal trunks can be processed together with calls in other sections by a group of alternate communication circuits. With this method, however, since the routing must be performed only by the station (the calling station) in which the calling subscriber is accommodated, no optimum route can be set fully taking into account the traffic densities in other exchanges.

Before starting the detailed description of the present invention, Definition of Technical Terms will be described.

Definition of Terms

Portable Telephone Set

Figure 4A:
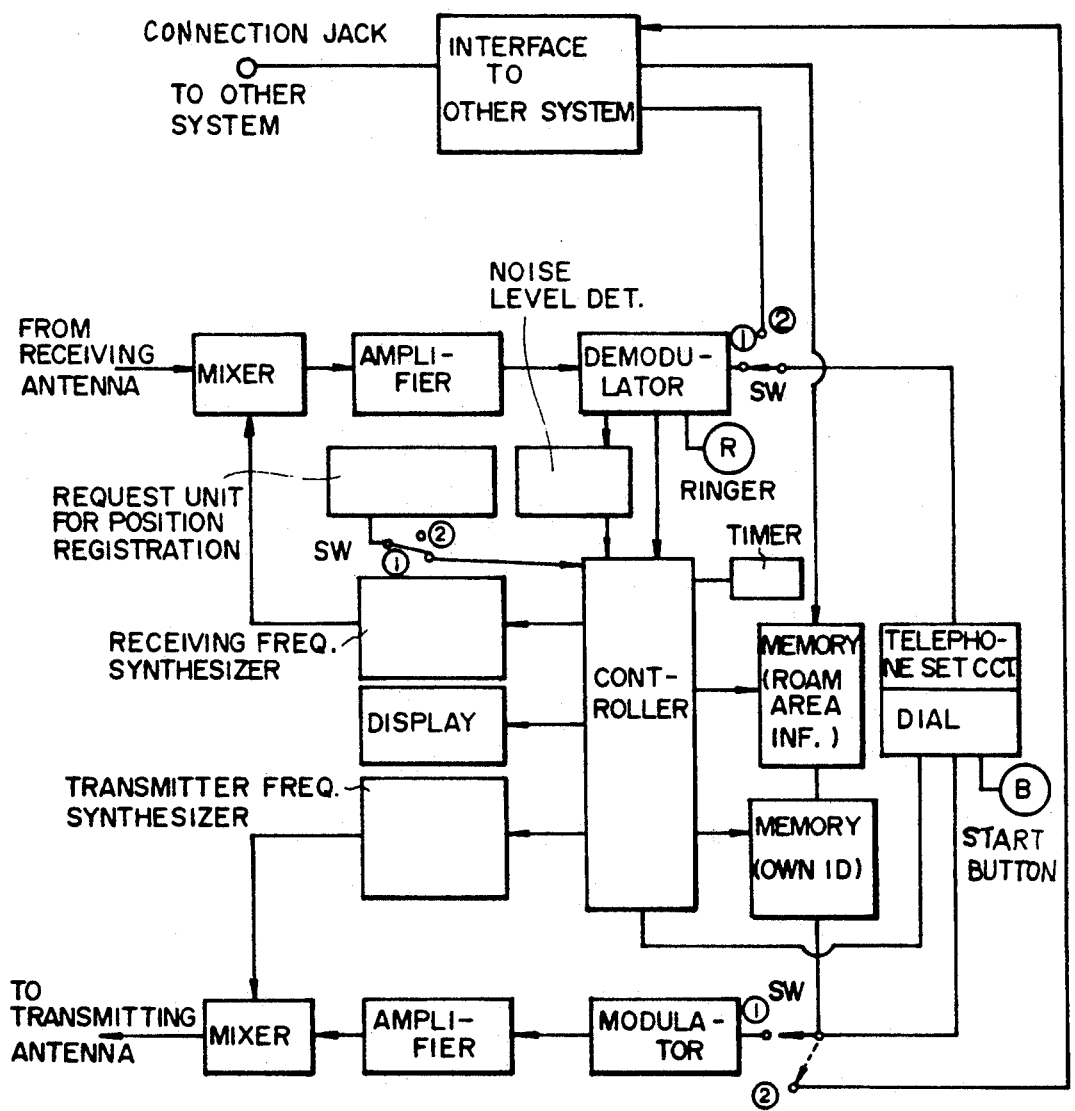

This is one of main constituents of the present invention, which the user always carries with him for originating and receiving calls by radio through a portable telephone key service unit described later. FIG. 4A illustrates an example of the arrangement of the portable telephone set. Its radio section is equipped with a multichannel access function, an interference detecting function, and various other functions for ensuring high-quality communications with a high efficiency of the utilization of frequency. A communication signal is subjected to an analog or digital modulation in a modulating section and is transmitted, by a modulated wave with a high degree of privacy, to the associated portable telephone key service unit. A demodulating section demodulates the modulated wave into a voice signal by a process reverse from that in the modulating section, and the demodulated voice signal is transmitted to a receiving section. The transmitting power of the portable telephone set is about 6 milli-watts, substantially equal to the transmitting power of the cordless telephone set now employed. However, the transmitting power level of the portable telephone set may be decided by system design objects, considering the size of service area of each portable telephone key service unit, user's call traffic density of the portable telephone using a frequency band, etc. Therefore, the level may usually change from 1 milli-watt to 100 milli-watts. The portable telephone set is also equipped with a function of displaying the PID of the calling subscriber during the reception of a call and storing the PID. The portable telephone set is given, as an identification number PID of its own, a number different from those of other portable telephone sets or terminals of other systems. The PID number may sometimes be referred to simply as PID.

In some cases a plurality of portable telephone sets are provided in association with one fixed telephone set described later. For example, in a case where each member of a family of five uses portable telephone sets of different PID numbers, five portable telephone sets are provided. Of course, these portable telephone sets can each be used independently of the others while being carried with the individual members of the family. The portable telephone set may given a code number to have a key function for preventing it from being used without leave or by a third person when it is stolen.

Fixed Telephone Set

The fixed telephone set pairs with each portable telephone set and has substantially the same functions as those of a fixed telephone set of the cordless telephone now employed by NTT (NIPPON Telegraph and Telephone Corporation) of Japan except in the following points. That is, the fixed telephone set transmits and receives communication signals between it and the portable telephone sets, by radio, and besides, it is capable of accessing a desired one of portable telephone sets and has a function of registering, changing and cancelling their positions.

Figure 3A:
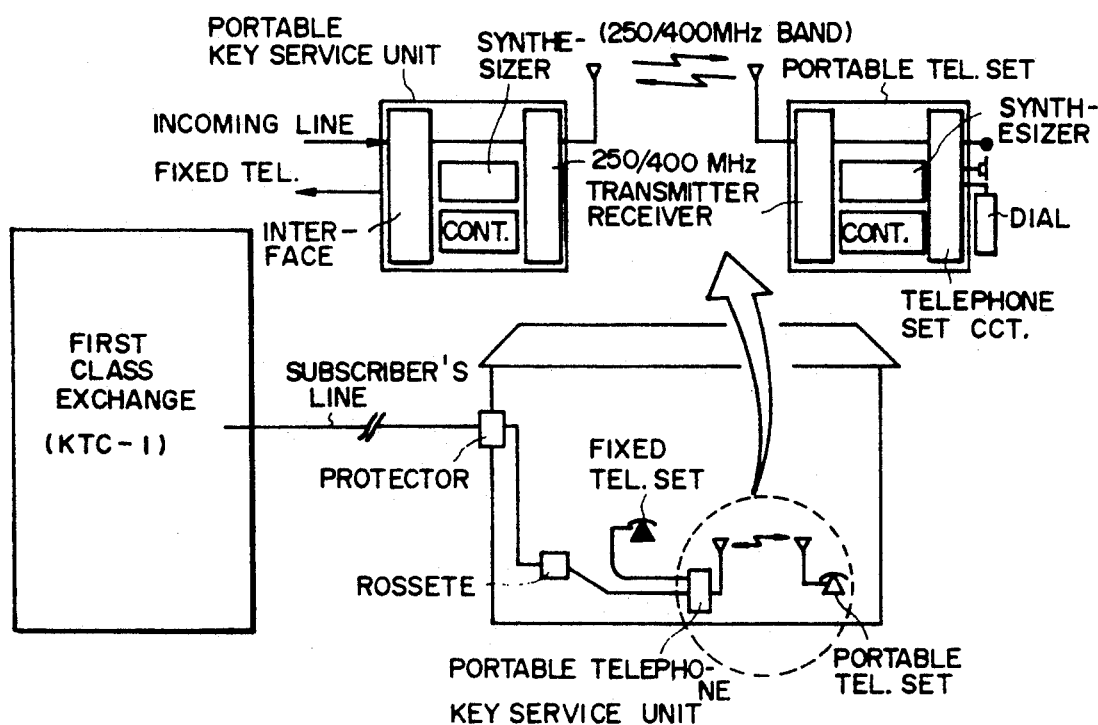
FIG. 3A is a block diagram illustrating an embodiment of the portable telephone system of the present invention applied in a subscriber's station.
Figure 3B:
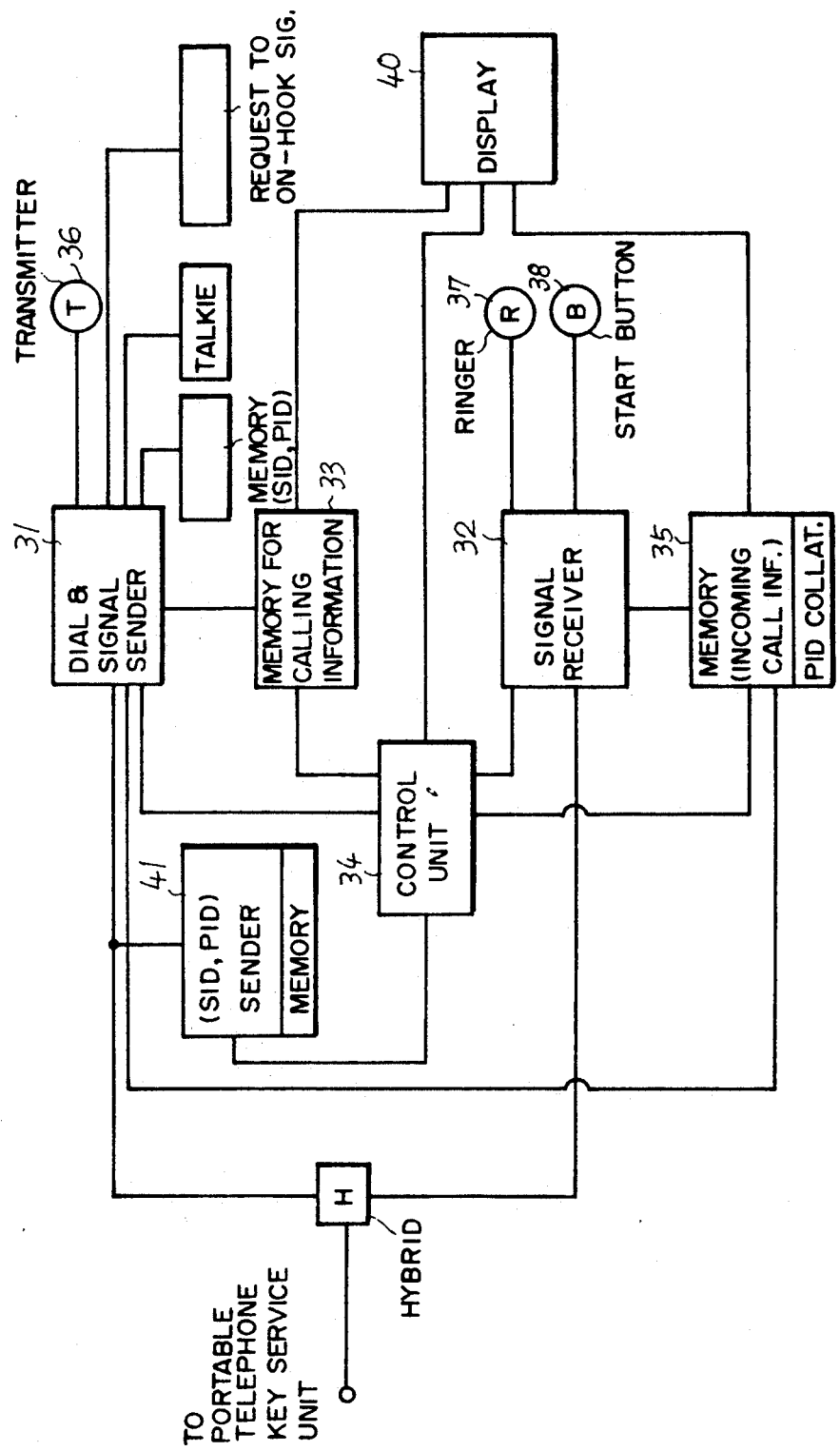
FIGS. 3B, 4A, 4B and 4C are block diagrams illustrating element circuits constucting the system of the present invention.

FIG. 3B illustrates in block form the arrangement of the fixed telephone set. In the present invention, since a third party may use the subscriber line, it is desirable that the subscriber line be a multichannel path which enables simultaneous communication in two or more communication circuits. This can easily be implemented when an optical fiber cable has come into use as the subscriber line. The fixed telephone set may sometimes be housed in the same unit together with the portable telephone key service unit described later. The fixed telephone set has self-identification information SID different from those of other fixed telephone sets, as is the case with the PID. This self-identification information is referred to simply as SID in some cases. In this specification the fixed telephone set in the home area of the portable telephone set $PID_1$ is sometimes referred to simply as $SID_1$. The fixed telephone set has the following additional functions besides the function of a telephone set which is usually employed at a telephone terminal connected by a wire line to PBX or a local switch (hereinafter referred to as a first class exchange).

(1) Function of displaying the current position (the registerd position) of the portable telephone set;

(2) Function of receiving a call on behalf of the portable telephone set when the latter cannot receive the call;

(3) Function of transfer a call to the portable telephone.

Portable Telephone Key Service Unit

This is associated with the afore-mentioned portable telephone set, for originating and receiving telephone calls by radio. This key service unit is sometimes housed in the same unit together with the afore-said fixed telephone set in the case where the latter is provided.

Figure 4B:
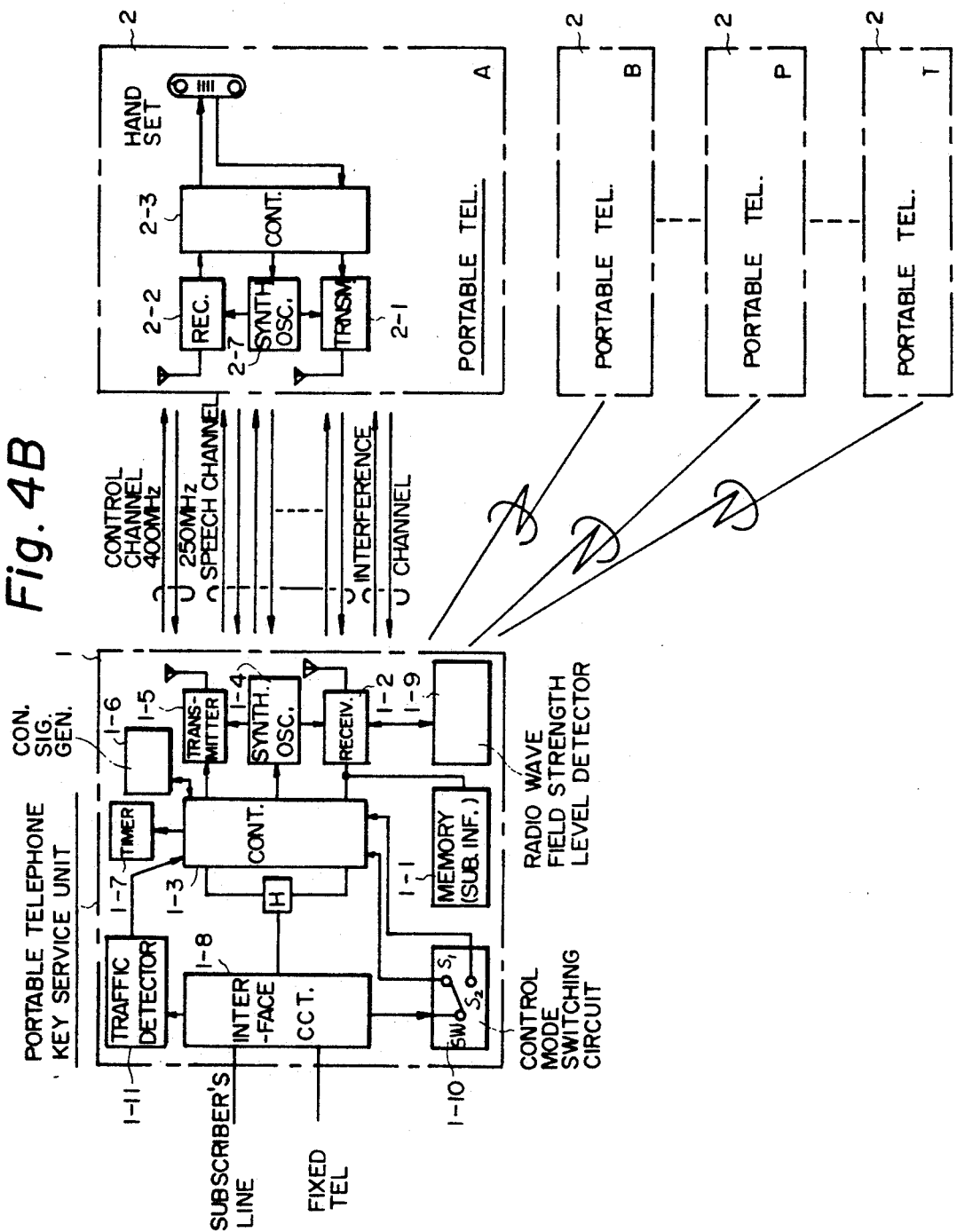
Figure 4C:
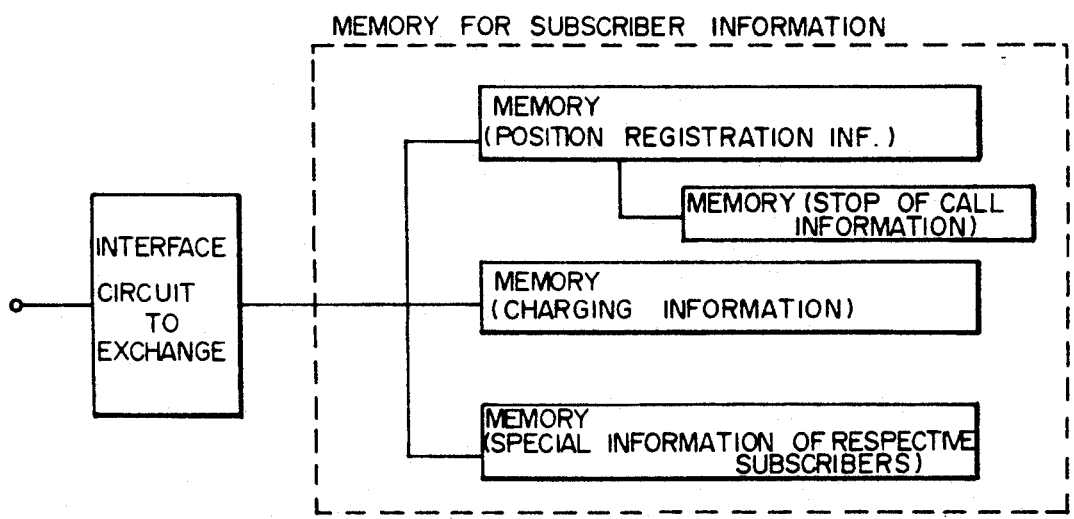

The portable telephone key service unit can be obtained by equipping a cordless telephone key service unit now in use, described later, with some additional functions. FIG. 4B shows the arrangement of the portable telephone key service unit. The portable telephone key service unit will hereinafter referred to simply as SID in some cases. The portable telephone key service unit in the home area will also hereinafter be referred to simply as $SID_1$.

The portable telephone key service unit may be installed on a pole in a public garden or on the side of the street for public usage. In this case, there is no fixed telephone set afore-mentioned.

General Telephone Set

This is not the portable telephone set but is a telephone set which an ordinary telephone subscriber uses.

PBX

This accommodates ordinary general telephone sets and has a telephone exchange function in an office or the like and, besides, a function of accepting, changing and cancelling the position registration of the portable telephone set. The term PBX is also used for expressing an area having a spatial expanse placed under control of the PBX or hardware itself which implements the telephone exchange function. In this specification the term PBX is sometimes used to be included in the first class exchange.

First Class Exchange

Usually this accommodates telephone sets in an exchange area, such as residence telephones in general, and handless calls from and to the exchange area. This exchange has, in addition to the telephone exchange function, a function of processing subscriber information (functions of accepting, changing and cancelling the position registration of the portable telephone set and a charging function) and a telephone transmitting and receiving function. Further, the exchange has an AI (Artificial Intelligence) function of discriminating voice dial signals (voice signals "one, two, three, ... in place of dial signals 1, 2, 3, ... 9, 0)from the portable telephone set, converting the voice signals to corresponding numerals, and returning them to the portable telephone set. This exchange usually means an exchange which is accommodated in a local telephone exchange, but it is also used to mean an area having a spatial expanse in which are included telephone sets and subscriber lines placed under control of the local telephone exchange and hardware itself which implements the telephone exchange function. This is what is called an end office in the NTT telephone network as shown in FIG. 5A, and this will hereinafter be referred to simply as KTC-I in some cases.

Reference to telephone sets and portable telephone sets which the first class exchange administers means the fixed telephone set and the portable telephone key service unit connected via subscriber lines to the first class exchange, the portable telephone sets provided in association with the key service unit, and general telephone stations. A subordinate fixed telephone set is also used as synonymous with the administered fixed telephone set. This exchange has an interface with a first class radio base station for calling portable telephone sets over a wide area.

A higher-ranking exchange means a second class or higher class exchange described later.

Second Class Exchange (KTC-II)

This exchange ranks above a plurality of first class exchanges and has functions of relaying and switching calls between the first class exchanges placed under its control and ordinary outgoing and incoming calls of other exchanges, and besides, functions of processing subscriber information (functions of accepting, changing and cancelling position registration) for portable telephone sets. Further, this exchange means an exchange housed in a telephone exchange which covers a district usually including a plurality of local service areas, and this term is also used to indicate an area having a spatial expanse which the telephone exchange dominates, and hardware itself which implements the telephone exchange function. In the NTT telephone network this term means an exchange which is housed in a toll center provided for each local city, and will hereinafter be referred to simply as KTC-II in some cases.

When reference is made in this specification, to an exchange and telephone sets administered by (or subordinate to) the second class exchange, it implies all terminals such as the first class exchange connected via a trunk line to the second class exchange and portable telephone sets administered by the first class exchange.

Moreover, an exchange of a rank higher than the second class exchange is a third class exchange connected via a trunk line to the second exchange or a fourth or fifth class one which is further connected to the third class exchange via a trunk line.

Third Class Exchange (KTC-III)

This exchange ranks above a plurality of second class exchanges and has functions of relaying and switching calls between the second class exchanges placed under its control and ordinary outgoing and incoming telephone calls other exchanges, and besides, functions of processing subscriber information (functions of accepting, changing and cancelling position registration) for portable telephone sets. This exchange controls a district including a plurality of service areas each placed under control of the second class exchange, and is also used to for an area having a spatial expanse administered by the third class exchange or hardware itself which implements the telephone exchange function. In the NTT telephone network the third class exchange means an exchange which is housed in a distric center provided in each of cities (70 cities) of the prefectural capital class, and this exchange will sometimes be abbreviated as KTC-III in this specification.

Fourth Class Exchange (KTC-IV)

This exchange ranks above a plurality of third class exchanges, covers a district including several district areas, and has functions of relaying and switching calls between the third class exchanges placed under its control and ordinary outgoing and incoming telephone calls of other exchanges, and besides, functions of processing subscriber information (functions accepting, changing and cancelling position registration) for portable telephone sets. The term "fourth class exchange" is also used to for an area having a spatial expanse which this exchange controls, or hardware itself which implements the telephone exchange function. This exchange has an interface with a fourth class radio base station for calling portable telephone sets over a wide area or a land mobile radio telephone exchange of the land mobile radio telephone system now employed. In the NTT telephone network the "forth class exchange" means an exchange which is accommodated in a regional center. The exchange will sometimes be referred to simply as KTC-IV.

In the NTT network this exchange is installed in eight major cities such as Tokyo, Nagoya, Osaka, etc. throughout the whole country area.

Fifth Class Exchange (KTC-V)

This exchange ranks above a plurality of fourth class exchanges and has functions of relaying and switching ordinary outgoing and incoming telephone calls of the fourth class exchanges, functions of processing subscriber information (functions of accepting, changing and cancelling position registration) for portable telephone sets and a telephone originating and terminating function. This term is also used for an area having a spatial expanse which this exchange administers, or hardware which implements the telephone exchange function. This exchange will sometimes be referred to simply as KTC-V. Further, this exchange has an interface with a fifth class radio base station (a satellite) for calling portable telephone sets over a wide area.

In Japan it is desirable that this exchange be placed at one place (Tokyo). Moreover, this exchange has an international telephone exchange function.

n-th Radio Base Station for Calling Portable Telephone Sets over a Wide Area (n=1, 2, 3, 4, 5)

The portable telephone set is usually used in association with the portable telephone key service unit; this radio base station is one that enables the portable telephone set to receive a call in places where the condition of radio waves propagation is poor and where there is no portable telephone key service unit close by, for example. Using strong radio waves emitted from this base station, basements and undergground shopping centers in cities would also be included in its service area. The field strength of radio waves from the first to fifth class radio base station and the conditions for their installation are substantially the same as in the case of a pocket pager calling radio base station now in use. This radio base station performs wide-area calling and sends out communication signals over a service area which is an area administered by an n-th class exchange. The second class and higher-ranking radio base stations sometimes use the same facility as the first class radio base station.

The fourth class radio station is also employed for an incoming call to the portable telephone set mounted in a car, train, airplane, or high-speed vehicle. The field strength of sending radio waves of this radio station and the conditions for its installation are almost identical with those of the pocket pager calling radio station now employed.

The fifth class radio station is incorporated in a satellite, for providing services for portable telephone sets mounted in ships on an ocean and airplanes above an ocean, and used in high mountains such as the Japan Alps.

These radio base stations send out call signals and communication signals under control of the n-th class exchange which has an interface with the radio base stations.

There are cases where the call signal only produces an incoming indicator tone (ringing) in the portable telephone set and the communication is caused to take place via the nearest portable telephone key service unit and where call signal contains communication information to the called telephone set when no communication can be expected because of the absence of radio equipment close by.

Radio Channel (Radio Communication Circuit)

This refers to that section of a signal transmission line used in the present system which employs radio waves. The radio channel is subdivided into a control channel (a control circuit) and a communication channel (a communication circuit). When the same channel (communication circuit) is used as both of them, it will be referred to simply as a radio channel (a radio circuit).

While the present invention is described as being applied to a system which has both of the control channel and the communication channel, the invention is also equally applicable to a system adapted to use only the communication channel throughout the system. In such an instance, the control channel in the disclosure of the present invention should read as the communication channel and a shift to the communication channel should read as the use of the local communication channel; further, in a case where a plurality of communication channels are used, it is necessary only to provide a function of seizing an unused one of them by cyclically retrieving them.

Control Channel (Control Circuit)

Signals, which the user exchanges, prior to the start (or after the end) of communication, with the portable telephone key service unit or wide area portable telephone calling i-th class radio base station for causing it to register the position of his portable telephone set and to originate and receive calls therethrough, will hereinafter be referred to as control signals and the transmission line therefor as a control channel (a control circuit). Although in the present invention the control channel means mainly the radio system, the term "control channel" will also be applied to control signal transmission lines, mainly formed by wire systems, between the portable telephone key service unit and an i-th exchange, between the i-th exchange and a j-th exchange (where $i = 1, 2, 3, \ldots n$ and $j = 1, 2, 3 \ldots n$), and between wide area portable telephone calling i-th radio base stations which transmit and receive control signals in association with the i-th exchange.

In some cases, the control channel and the communication channel share the same transmission line or use it on a time-shared basis. The control channel over which the control signal is flowing for transmission toward the telephone network (correctly speaking, the n-th class exchange) as viewed from the portable telephone set will be called an upward channel and the control channel of the reverse direction therefrom as a downward channel. There are cases where the control signals from the portable telephone key service unit and the portable telephone set are transmitted at all times and where they are transmitted as required.

Communication Channel (Communication Circuit)

This term will be applied to a transmission line over which user's actual communication signals (also including image data signals in the case of a new media) are transmitted for outgoing and incoming calls of the portable telephone set. In the present invention the communication channel which uses a radio transmission line is mainly between the portable telephone set and the portable telephone key service unit, but sometimes the control channel from the wide area portable telephone set calling i-th radio base station is also used as the communication channel. Furthermore, the communication channel is also employed for communication between the portable telephone key service unit and the first class exchange and between the i-th and j-th exchanges (where $i = 1, 2, 3, \ldots n$ and $j = 1, 2, 3, \ldots n$) which use wire systems as main transmission lines, and for communication with a computer or the like which is used in a portable telephone system of a verification mode. The communication channel over which communication signals are flowing for transmission toward the telephone network (correctly speaking, the n-th class exchange) as viewed from the portable telephone set will be referred to as an upward communication channel (an upward communication circuit) and the communication channel of the reverse direction therefrom as a downward communication channel (a downward communication circuit).

Subscriber Information Memory Section

This is a function which the first to fifth class exchanges each possess. The exchange stores various information about each portable telephone set user (outgoing and incoming call information, position registration information, charging information, and special information such as credit information) in this section, reads out therefrom, changes, and cancels these pieces of information, and further the exchange exchanges these pieces of information between its subscriber information memory section and that of a higher-or-lower-ranking exchange. The subscriber information memory section is divided into (1) a position registration information storing section, (2) a charging information storing section, and (3) an individual subscriber's special information storing section. The subscriber information memory section will sometimes be referred to simply as MEM or a memory section.

The portable telephone key service unit also has a function substantially identical with the subscriber information memory section. The portable telephone set also possesses a function of storing, changing and cancelling information such as radio channel numbers and the SID of the key service unit with which it communicates.

Home Area

Figure 8A:
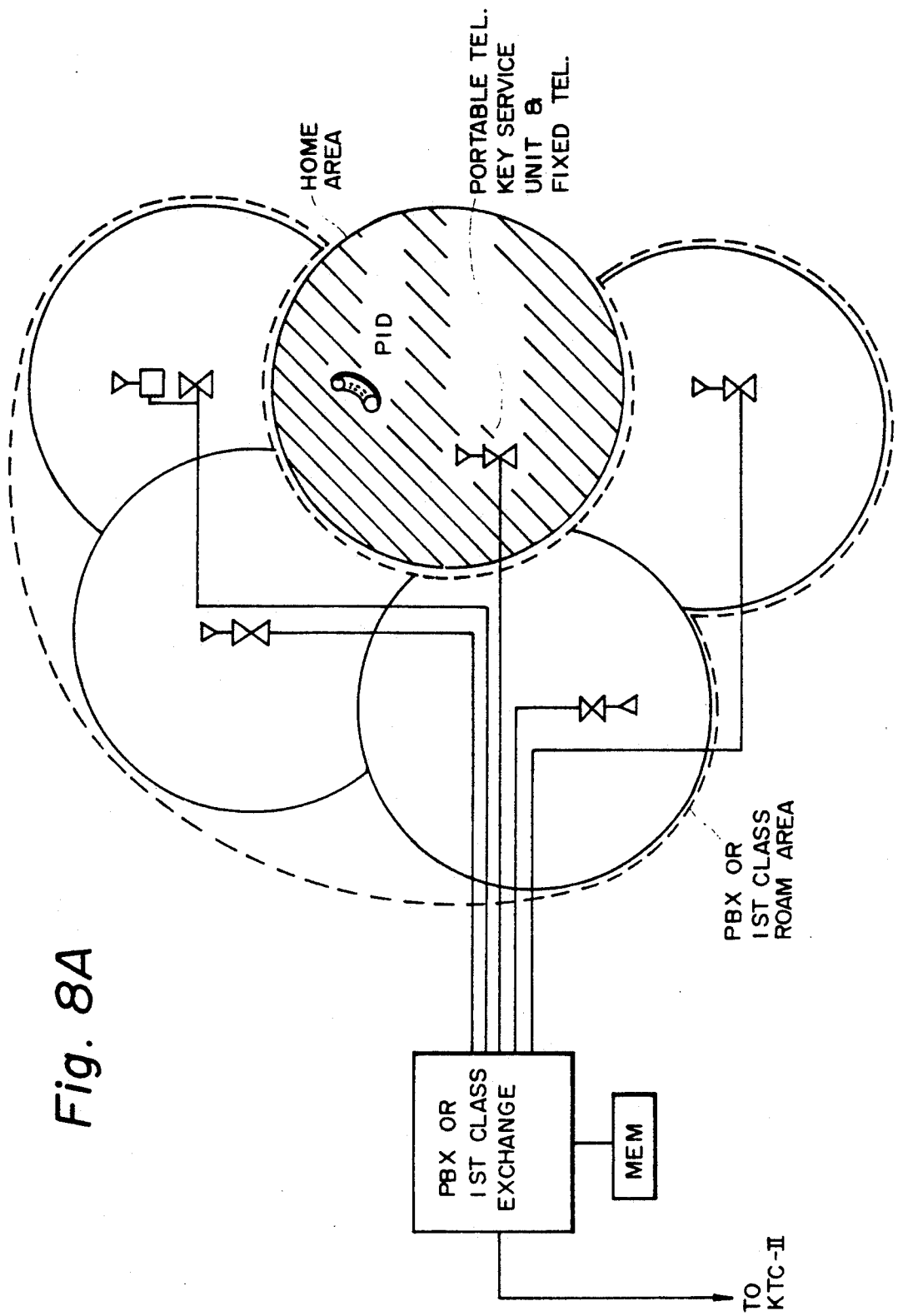
FIGS. 8A, 8B, 8C and 8D are block diagrams illustrating examples of the systems employed in the present invention.

This means an area with a radius of about 25 meters (This is suitable on transmission power of 6 milli-watts. If transmitter power of radio wave is changed, this figure will be reduced or expanded accordingly.) in which the portable telephone set is always placed and is able to communicate with the portable telephone key service unit to which it bears a parent-chiled relationship. The hatched circle in FIG. 8A shows the home area of the portable telephone set $PID_1$. Incidentally it is normal to install in the home area the fixed telephone set which pairs with the portable telephone set (though not always necessary). Telephone rates in a roam area are all charged to the account of the portable telephone set or fixed telephone set placed in the home area.

Roam Area

This is an area in the case where the portable telephone set is used outside the home area.

The roam area is subdivided into the following five areas according to the distance from the home area.

Roam Area in the Same PBX

This is an area except the home area in the same PBX containing the home area of the portable telephone set. Usually the portable telephone set for use in an exterprise utilizes this area. The area indicated by the broken line in FIG. 8A is the roam area in the same PBX.

First Class Roam Area

This is an area in which the portable telephone set is used except its home area in the same area as a local exchange area in which general telephones are accommodated (an area which is occupied by terminals accommodated in the first class exchange, to be precise). The area indicated by the broken line in FIG. 8A is the first class roam area. Portable telephone sets for general residence use are often used in this area.

The area will sometimes be referred to simply as the KTC-I roam area.

Second Class Roam Area

This is an area in which the portable telephone set is used except the first class roam area in an area administered by a toll center (the second class exchange, to be precise).

This area will sometimes be referred to simply as the KTC-II roam area.

Figure 8B:
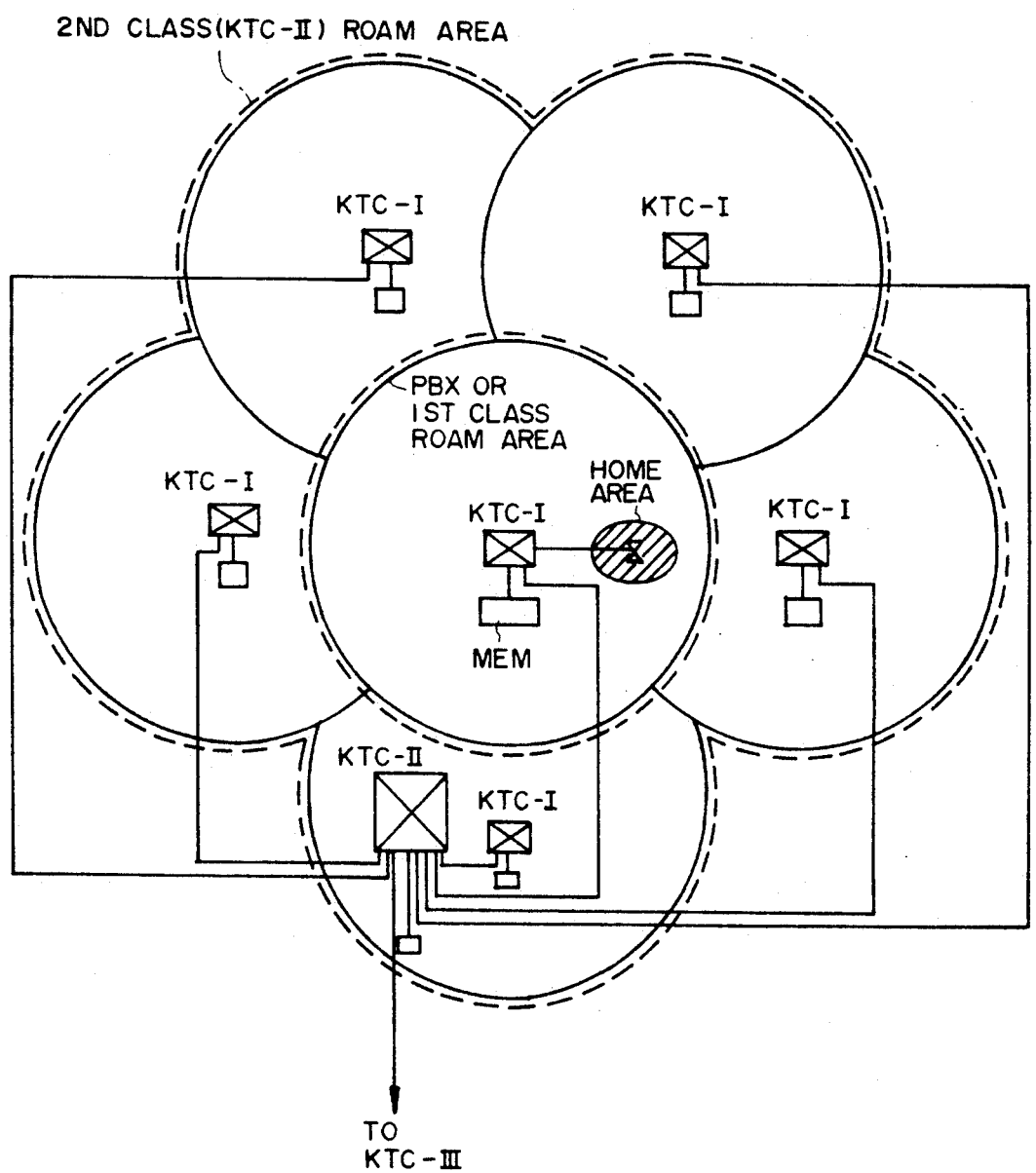

The area surrounded by the broken line in FIG. 8B shows the second class roam area.

Third Class Roam Area

This is an area in which the portable telephone is used except the second class roam area is an area administered by the third class exchange.

This area will sometimes be referred to simply as the ITC-II roam area.

Figure 8C:
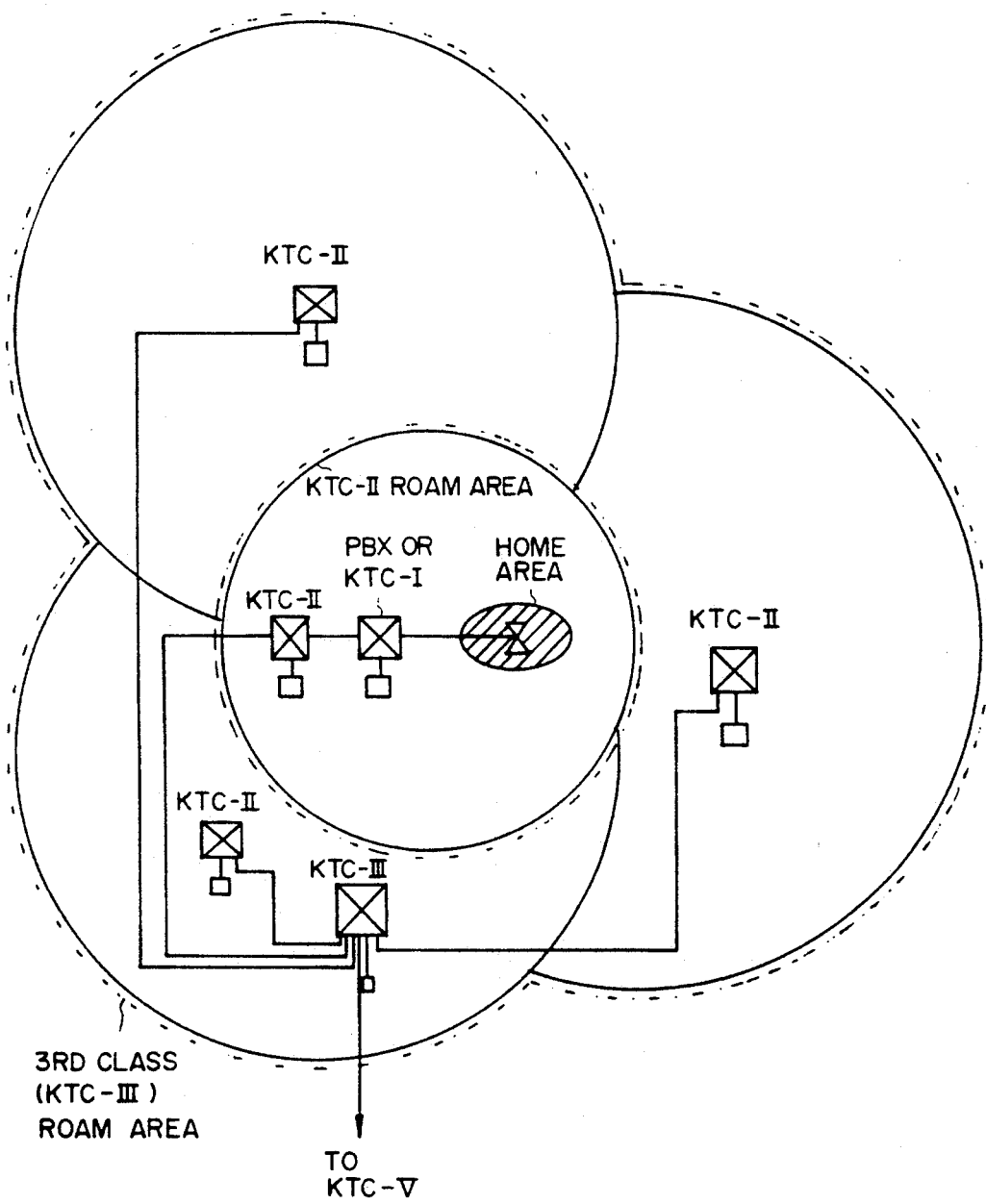

The area surrounded by the broken line in FIG. 8C shows the third class roam area.

Fourth Class Roam Area

This is an area in which the portable telephone set is used except the third roam area in an area administered by the fourth class exchange.

This area will sometimes be referred to simply as the KTC-IV roam area.

Figure 8D:
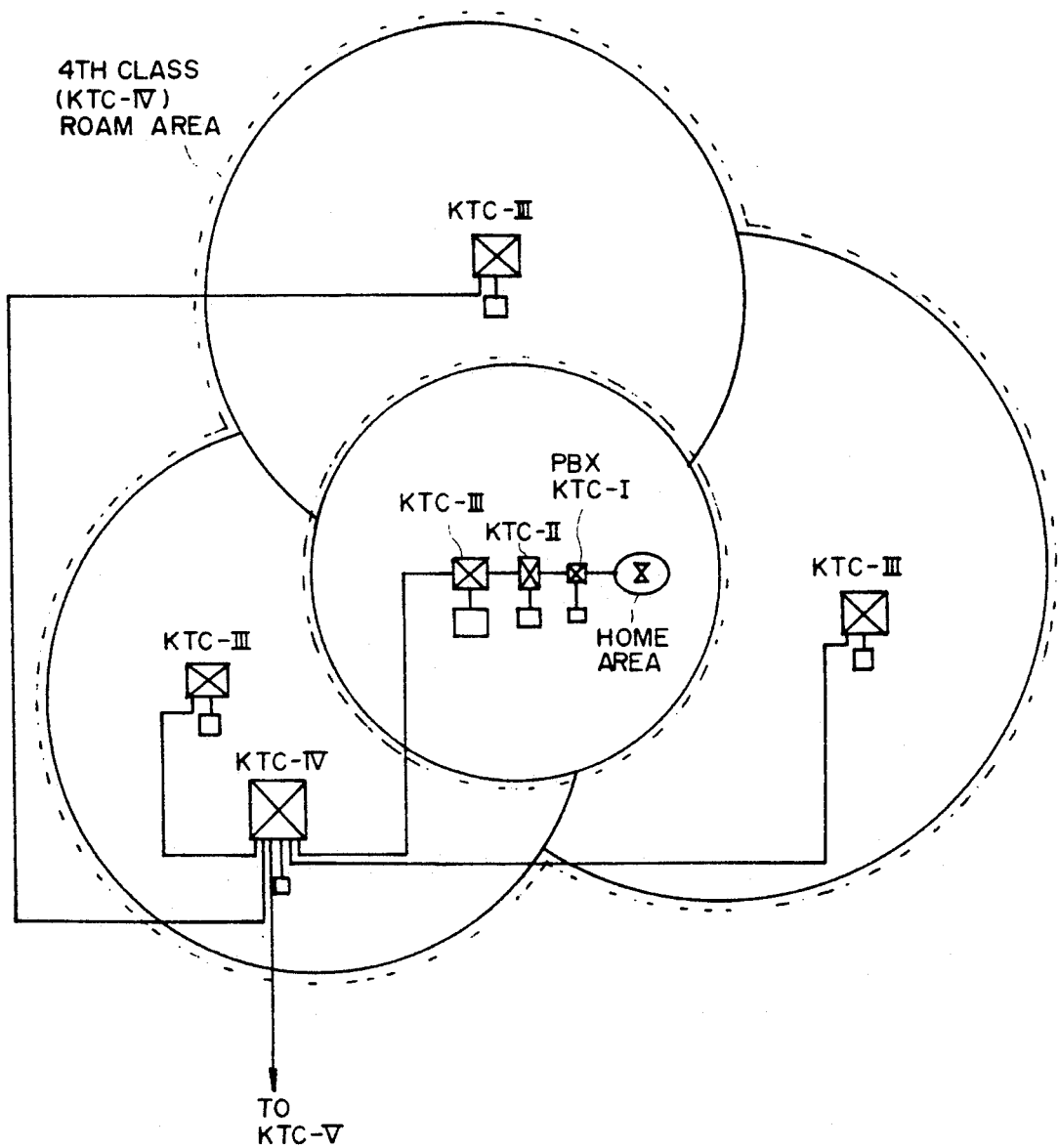

The area surrounded by the broken line in FIG. 8D shows the fourth class roam area. When the position of the portable telephone set mounted on a car, airplane, or ship is registered, it is regarded that the portable telephone set lies in the fourth roam area.

Fifth Class Roam Area

This is an area in which the portable telephone set is used except the fourth class roam area in an area administered by the fifth class exchange. In the case of Japan, the whole country is covered by this area except the fourth class roam area. It is assumed that the area in which the portable telephone set owner of Japan uses in a foreign country is this area.

Portable Telephone System of Cordless Telephone Mode

This is a system in which a key service unit (also called a connecting device) of the cordless telephone system now employed is used as radio equipment for communication with the portable telephone set. Of course, it is a precondition, in this case, that the key service unit of the cordless telephone has a modified or additional function so that the portable telephone set may exhibit the desired communicating function.

The telephone system of this mode is broken down into the following three systems.

Portable Telephone System of Residential District Mode

This is a system in which the portable telephone key service unit is installed in an indevidual house or on the external wall thereof mainly in a residential area of a city or village and a radio section is estabished between the key service unit and the neighboring portable telephone set. This system is usually suitable for use in a case where the communication traffic is not to heavy and the distribution density of the key service units is uniform throughout the residential area. The portable telephone key service unit sends out the control signal only as required, and only its receiver is always in operation (in the waiting state) in a predetermined control channel. Despite the residential area, however, there are cases where the traffic of a specific portable telephone key service unit is large and where the traffic increases temporarily and suddenly when an accident or disaster occurs. To cope with such a situation, this system is configured so that it can be switched provisionally to a portable telephone system of an office-blocks mode described later.

Portable Telephone System of Continuous Position Registration Request Mode

This is a system which is used when the portable telephone set delivers position registration request signals continuously or at regular intervals based on a certain rule. This system is used in the cases where the portable telephone set user moves in the services area of the portable telephone system of the residential district mode, where he notifies the KTC-I of his current position, and where he wishes to ensure receiving an incoming call.

Portable Telephone System of Business District Mode

In a place or area where there is always a crowd of people and the communication traffic is heavy and varies greatly, such as a street of business buildings, busy street, area for special events, large market place, or large place of business in an urban area, portable telephone key service units are installed both inside and outside each building, on public facilities such as telegraph and electric light poles and on the walls of public buildings. This system is used for establishing a radio communication circuit between each of such key service units and the neighboring portable telephone set.

The portable telephone key service unit always sends out the control signal, and the portable telephone set is capable of registering its position and originating and receiving calls by seizing the control signal. The portable telephone key service unit normally has one communication channel, but in some cases a plurality of communication channels are made simultaneously available in the same place in accordance with the communication traffic.

According to the type of the business district, there is an area in which the traffic markedly decreases late at night and on holidays; in this case, this system is configured so that it can be switched to the portable telephone system of the residential district mode described above.

Portable Telephone System of Pocket Pager Mode

This is a system which employs a call wave of the existing pocket pager as a downward control channel to the portable telephone set, for notifying it of an incoming call thereto. Under certain circumstances information to the called portable telephone set is contained in the call wave.

Portable Telephone System of Land Mobile Radio Telephone Mode

This is a system which is used when the portable telephone, brought in a car subscribed to the existing land mobile radio telephone system, performs communication through connection with various equipment of the car telephone. It is a matter of course, in this instance that the land mobile radio telephone system has a modified or additional function for permitting the use of the portable telephone set.

Portable Telephone System of Train Radio Telephone Mode

Portable Telephone System of Maritime Mobile Telephone Mode

Portable Telephone System of Maritime Satellite Communication Mode

Portable Telephone System of Aircraft Radio Telephone Mode

Each of these four systems is one that enables the portable telephone set of the present invention to perform communication, using a part of radio telephone equipment installed on the respective vehicle. It is a matter of course that the existing equipment has its function modified or is added with a new function.

Portable Telephone System of Wide Area Calling Mode

This means that the portable telephone set is in a state in which it is able to receive radio waves from a wide area portable telephone set calling n-th class radio base station (where n=1, 2, 3, 4, or 5).

Portable Telephone System of Identification (Ownership Identification) Mode 5 The portable telephone set is used not as a communication terminal but as a credit card, identification card, or cash card for withdrawing money from a bank account. It is a matter of course, also in this case, that the communicating function of the portable telephone set is effectively utilization.

In view of the above technical terms, the present invention will be described below.

CONSTITUTION AND OPERATION OF THE INVENTION (1) Functions and Features of Main Components (Devices) of the Present Invention FIG. 3A illustrates the arrangement of the portable telephone system of the present invention as being applied in a usual house or office building. A first class exchange (KTC-I) shown at the lower left-hand side in FIG. 3A and a portable telephone key service unit in the house at the lower right-hand side are interconnected through a subscriber line. In the house there is provided the portable telephone key service unit which is one of the main components of the present invention, and this is connected to a portable telephone set by radio and a fixed telephone set by wire. Shown in the upper part of FIG. 3A are the main internal constitutions of the portable telephone key service unit and the portable telephone set. A desired frequency can be employed as the working frequency, so long as it is suitable for use in mobile communication and permitted by the government authorities; however, it is assumed that this example employs a 250/400 MHz band as in the case of the NTT cordless telephone.

FIG. 3B is a block diagram showing the constitution of the fixed telephone set, which is connected to the portable telephone key service unit via a hybrid circuit H. The constitution of the fixed telephone set will hereinbelow be described. In FIG. 3B a dial and signal transmitting section 31 is actuated for originating a call. The dial and signal transmitting section 31 is added with a transmitter 36, a talkie for service during the absence of the called subscriber, and an SID and PID memory which permits the transmission of a dial signal with one touch of a finger when originating a call. The signal sent out from the dial and signal transmitting section 31 is stored in an outgoing call information memory 33 and at the same time it is displayed on a display 40 under control of a controller 34. This signal is used for transferring an incoming call to the subscriber's registered position through utilization of the information (SID, PID) when the subscriber is absent. On the other hand, an incoming call to the fixed telephone set occurs in the case where the power source switch of the portable telephone set combined with the fixed telephone set is OFF, that is, where the portable telephone set is not in the stand-by state, or in the case where an incoming call to the portable telephone is transferred to the fixed telephone set at certain timing when the portable telephone set cannot receive the incoming call because its power source switch happens to be in OFF state or for some other reason although it is not in its home area but stays in any one of the roam areas. In this instance a signal receiver 32 actuates to ring a bell 38, and when off-hooking, the user can hear the calling subscriber's voice through a receiver, thus starting talking. Further, information about the incoming call thus received is stored in an incoming call information memory 35.

This system is configured so that the portable telephone key service unit is able to communicate with a desired portable telephone set as long as the latter stays in an area in which communication can be established therebetween. Accordingly, there will occur with a certain probability, though low in terms of traffic, a situation in which when the subscriber is about to use the portable telephone set $PID_1$ or fixed telephone set ($SID_1$) at his home, the portable telephone key service unit is already in communication with another (a third party's) portable telephone set. This does not matter when two or more communication channels are available; but when only one channel might be available at an early stage of the introduction of this system, it is indicated on the display 40 of the fixed telephone set that no outgoing call can be made. This is achieved in the following manner. Where the portable telephone key service unit is being used, a busy signal is sent from a subscriber line interface circuit in the key service unit shown in FIG. 3A and the busy signal is received by the signal receiver 32 of the fixed telephone set and is displayed on the display 40 under control of the controller 34.

Moreover, in this instance the owner of the fixed telephone set can demand the third party to early terminate the communication with the portable key service unit, by sending out a clear request signal through use of the dial and signal transmitting section 31 of the fixed telephone set. The clear request signal is transmitted to the portable telephone key service unit, from which it is applied, as an audible tone or a control signal of the upper or lower side-band frequency, via a transmitter of the key service unit (shown in FIG. 4A) to the portable telephone set engaged in communication with the third party.

The internal structure of the portable telephone set is depicted in FIG. 4A, which will be described in detail later. The above-said clear request signal is received by its receiver, as a signal of an audible frequency, or the reception of the clear request signal is indicated on a display which indicates whether it is possible to make an outgoing call and receive an incoming call.

In such a situation, if the portable telephone user moves about 20 to 25 meters, he can continue the communication with the third party by setting a new channel between his portable telephone set and a portable telephone key service unit installed there. In a case where the user continues the communication staying at the same place in disregard of the reception of the clear request signal, it is possible to put an end to the communication by transmitting a disconnect signal (a clear-down signal) to the portable telephone set after a certain elapsed time by use of a timer 1-7 built in the portable telephone key service unit.

Next, the portable telephone key service unit will be described. The one-dot chain line block at the left-hand side shows the internal structure of the key service unit. The key service unit is connected via a subscriber line interface circuit 1-8 to a subscriber line and a fixed telephone set. The telephone signal is connected via a controller 1-3 to a transmitter 1-5 and a receiver 1-2. The control signal is used for issuing an instruction via the controller 1-3 to a "synthesizer oscillator" 1-4 to acquire a desired communication channel.

The timer 1-7 in FIG. 4B is used for obtaining charging information in the case of an outgoing call from the portable telephone set and for generating the timing for sending the clear request signal to the busy portable telephone set in association with a control signal generator 1-6. Furthermore, in a case where when the portable telephone user has moved from one place to another during communication the relative distance between the portable telephone set and the key service unit increases and the radio wave field strength value of the input to the portable telephone set becomes so small that the speech quality is deteriorated (which is detected by a radio wave field strength detector 1-9), the control signal generator 1-6 applies a channel change-over request (or disconnect) signal to the portable telephone set, causing it to search for a nearly portable telephone key service unit.

Next, a description will be given of a function of changing the mode of the control signal which is sent out from the portable telephone key service unit. A control mode switching circuit 1-10 in FIG. 4B shows a mode switching circuit for siwtching between an as-required-transmit mode and a normally-transmit mode in response to an instruction from a traffic monitor of the first class exchange as shown in FIG. 5A. Assuming, for example, that when a switch SW of the control mode switching circuit 1-10 is held on the one contact $S_1$ the portable telephone key service unit is in the as-required-transmit mode, it can be switched to the normally-transmit mode by changing over the switch SW to the other contact $S_2$. As already described in the Definition of Terms, the portable telephone key service unit is usually held in the as-required-transmit mode when it is installed in a residential area (in a residence), whereas the key service unit, when installed in a business district, is usually in the normally-transmit mode. Sometimes the portable telephone key service unit includes a traffic measuring section (1-11 in FIG. 4B which performs the same function as that of the control mode switching section 1-10.

Referring next to FIG. 4A, the internal structure of the portable telephone set.

In FIG. 4A the portable telephone set has its receiving and transmitting mixer outputs connected to the portable telephone key service unit, and hence is ready for radio communication. A signal received from the portable telephone key service unit is applied via the receiving mixer to an amplifier, the amplified output of which is provided to a demodulator. A part of the demodulator output is applied to a ringer (R). The ringer (R) is adapted to ring upon receiving from the wide area portable telephone calling n-th class radio base station (where n=1, 2, 3, 4, or 5) such a signal as described later. The remaining part of the demodulator output is applied to the receiver and the controller. The signal applied to the receiver is used for actuating it. Next, the operation of the controller will be described. Upon turning ON of the power source of the portable telephone set, the controller usually decides that the portable telephone set stays in the service area of the portable telephone system of the residential district mode, and registers the position of the portable telephone set in the following manner. The controller controls a transmitting frequency synthesizer so that a position register request signal can be sent out through a predetermined control channel (#1 in Table 1). At the same time the controller controls a reveiving frequency synthesizer to acquire a predetermined down control channel from the portable telephone key service unit. If the down control channel cannot be acquired, the controller decides that the portable telephone set stays in the service area of the portable telephone system of the business district mode, and starts sweep for acquiring the down control channel. In many cases the controller succeeds in acquiring the down control channel at this stage and registers the position of the portable telephone set. If the controller should fail, it would decide that the portable telephone set stays in a dead zone, and would proceed to the acquisition of a control signal from the aforementioned wide area portable telephone set calling n-th class radio base station. In this case, however, the controller holds the receiving frequency synthesizer in the state of receiving the down control channel of the wide area calling i-th class radio base station and the down control channel of the portable telephone key service unit alternately with each other, regardless of whether or not the control signal from the n-th class radio base station could be aquired. When receiving a call signal contained in a wide area calling down control signal, the controller actuates the bell to ring and tries to catch a control signal from the portable telephone key service unit. If the control signal could be acquired, a blue lamp (OK) is lighted on the display, and if not a red lamp (NO) is lighted. Further, the controller controls the transmitting frequency synthesizer to make it possible to generate a predetermined communication (or control) frequency, and controls a roam area communication information memory and a self-identification (PID) memory.

Where the portable telephone set is used in the business district alone, software can be set so that the turning ON of the power source is immediately followed by the operation of the business district mode instead of the residential district mode, or that only when the down control signal could not be acquired by the operation of the business district mode, the operation of the residential district mode is carried out. Moreover, it may also meet the user's purpose, in some cases, to keep the portable telephone set waiting in the wide area calling mode, without registering its position in the cordless telephone mode. These modifications can easily be achieved.

Besides, the controller has the following function. In the case where the portable telephone subscriber is about to make an outgoing call from his portable telephone set in the home area, if the portable telephone key service unit happens to be engaged in communication with another portable telephone set in a certain roam area, the red lamp (NO) display is provided on the display, indicating that no outgoing call can be made. That is, since the portable telephone key service unit does not respond to a communication channel assign request from the subscriber's portable telephone set through the upward control channel (because the key service unit is busy), the controller decides, after a certain lapse time, that no outgoing call is possible, and makes the display provide a diplay to that effect.

However, when the portable telephone key service unit is capable of simultaneous communication in two or more channels, the above explanation need not be taken into account because one of the channels is used exclusively for communication with the portable telephone set in the home area.

A continuous position register request signal generator and a timer in FIG. 4A are employed also for sending out position register request signals from the portable telephone set at regular intervals.

In the portable telephone system of the residential district mode the down control signal from the portable telephone key service unit is sent out only when necessary, not at all times. Accordingly, even if the portable telephone set has moved out of the service zone of a certain portable telephone key service unit and into the service zone of the neighboring portable telephone key service unit, the registered position of the portable telephone set would not be changed unless the portable telephone set originates a call or sends out a position register request signal; therefore, no incoming call is made in the cordless telephone mode. In order to avoid this, the controller is equipped with the above-mentioned function by which position register request signals can be sent out from the portable telephone set in succession or at regular intervals (or at random).

The portable telephone set is further provided with a switch (SW3 in FIG. 4A) for switching between a continuous position register request mode and the as-required transmit mode.

Incidentally, even if the portable telephone set has been set in the continuous position register request mode, when it enters the service area of the portable telephone system of the business district mode, it will automatically stop the continuous transmission of the position register request signal after having catched the down control signal from the portable telephone key service unit, and the portable telephone set will be switched to the as-required transmit mode for the up control signal. It is also possible, however, to keep the portable telephone set in the normally-transmit mode for (VID-PID).

The continuous position register request mode is suitable for use in the case where it is desirable to always locate, for example, at an office, the current position of a doctor, insurance canvasser or like person, or where it is desirable to ensure the reception of an incoming call to them while they are from their offices or the like.

The portable telephone set is, in principle, capable of displaying and storing the PID of the calling party in communication therewith. Sometimes the portable telephone subscriber wants to know subscriber information such as the SID of the portable telephone key service unit communicating with the portable telephone set. In this instance, it is necessary only to depress a function button (#, for example) of the dial section, by which the controller reads out, from the roam area communication information memory, information about the nearest portable telephone key service unit, i.e. the SID of the key service unit in communication with the portable telephone set. Where the portable telephone is in its stand-by state after having its position registered in the portable telephone key service unit, the SID of the latter can be displayed, without the necessity of exchanging radio waves between them, simply by depressing the function button of the dial section. This function is convenient for it can be used not only for the above purpose but also for guidance, for example, by displaying the address of a place where the portable telephone subscriber has lost his way.

Besides, the portable telephone set has a function of displaying the telephone number of the calling party if its address is known partly or wholly. That is, when the address of the calling party is transmitted, with voice, to the first class exchange, it is identified by its voice signal identifier, and for verification, a prefectural ID, a city ID, a town ID, etc. described later, are sent back to the calling portable telephone set, and they are displayed on its display.

When the dial signal, voice signal, or control signal is transmitted from the portable telephone set, it is applied first to a modulator, the output of which is provided to a transmitting amplifier, the output of which is, in turn, applied to a mixer for converting its frequency to a frequency specified by the controller. The frequency-converted signal is thus transmitted from a transmitting antenna.

The above has described in detail the external functions and the constitutions of the portable telephone key service unit, the fixed telephone set and the portable telephone set. Now, a description will be given of basic functions of the system of the present invention which utilizes them.

i) At a place where the portable telephone set is usually used (the subscriber's home or desk in his office, which will hereinafter be referred to as the home area), it operates in the cordless telephone mode which is now employed by the NTT.

ii) In many cases the fixed telephone set is provided which is associated with the portable telephone set mentioned above in i) and has the SID number. The fixed telephone set is connected to the CO line in the same manner as in the case of an ordinary telephone set, but unlike the ordinary telephone set, it has an incoming call transfer function, a function of displaying the current position of the portable telephone set, and various other functions.

iii) The portable telephone set is given the PID (the self-identification number) different from those of other portable telephone sets or other system terminals. When originating a call or demanded by the portable telephone key service unit, the portable telephone set automatically sends out its PID signal. (The PID of this portable telephone set will hereinafter be referred to as $PID_1$.)

iv) When having originated a call outside its home area, the portable telephone set stores, in its "roam area communication information memory", the roam area SID (the terminal identification number) which is sent from the portable telephone key service unit which communicates with the portable telephone set.

v) Upon turning ON its power source, the portable telephone set automatically transmits its PID signal through the transmitting control channel of the cordless telephone mode of the home area. This will hereinafter be referred to as the "position registration" in the home area or roam area. The flow of operation in this instance will be described later.

vi) The portable telephone set has a function by which when the portable telephone set has received an incoming call made in the wide area calling mode but cannot answer it owing to the absence of the portable telephone key service unit in the vicinity of the portable telephone set, it stores the calling subscriber's number in its PID roam area outgoing call communication information memory for a certain period of time and then answers the calling subscriber when having become capable of doing so as a result of movement of the portable telephone subscriber.

Figure 5B:
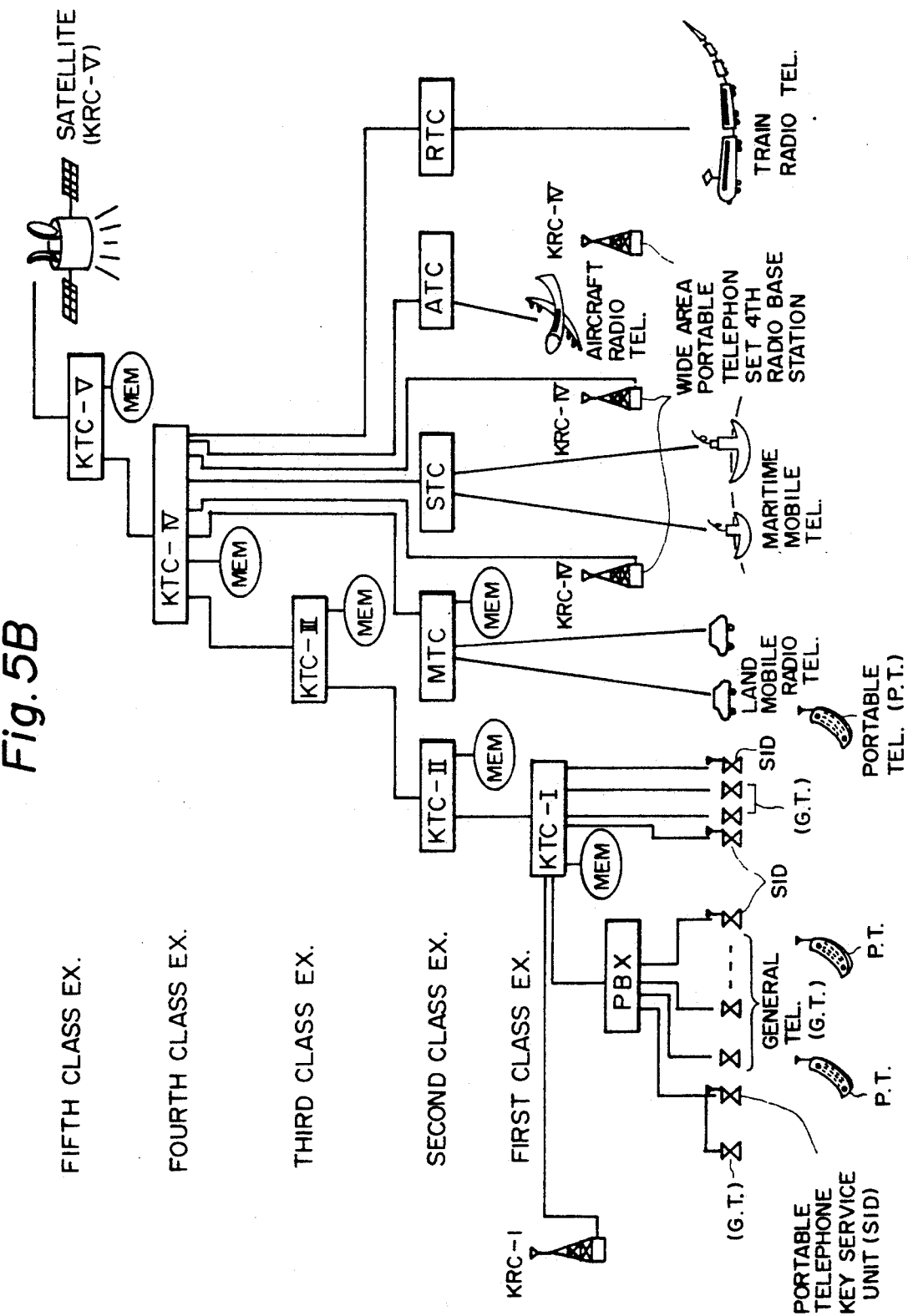

Next, a description will be given of the subscriber information memory which is provided in each of the first to fifth class exchanges and which is one of the features of the present invention. FIG. 5B illustrates the stratification of the first to fifth class exchanges. The first class exchange administers the portable telephone set, the fixed telephone set, and the ordinary telephone set as mentioned previously in the Definitions of Terms, and hence has the subscriber information memory MEM therefor. The second class exchange is connected to a plurality of first class exchanges via transmission lines as shown and is provided with the subscriber information memory MEM. Higher-ranking exchanges each have also the subscriber information memory MEM as depicted. The subscriber information memories provided in the respective ranks are operatively associated with one another for handling the request for the registration of the position of the portable telephone set and its charging information, and has a decentralized memory function which is also characteristic of the present invention.

(2) The Principle of the Present Invention and the Grounds therefor

This section will describe first that the decentralized arrangement of the subscriber information memories in the exchanges of respective ranks is superior over the centralized arrangement used in the prior art, and then a method of providing the personal identification information PID.

A description will be given first of the function of the subscriber information memory (MEM).

(2-1) Function of the Subscriber Information (Information such as Position Registration and Charging Information for Each PID) Memory Provided in the Exchange of Each Rank i) The exchange stores, in the subscriber information memory, subscriber information received from the portable telephone set via the key service unit, a PBX, or the like, and if necessary, transfers the information to the higher- or lower-ranking station.

ii) When receiving new subscriber information from the portable telephone set owing to its movement from the previous place to a new one, the exchange compares the new information with the previous one and rewrites or cancels the stored information, and if necessary, transfers the new subscriber information to a higher- or lower-ranking exchange.

iii) Where the following subscriber information (1) and (2) have been prestored for the portable telephone set, even if the exchange receives the position register request signal from the portable telephone set, it performs the registration of the position of the portable telephone set and outgoing and incoming call control therefor in accordance with the prestored subscriber information.

(1) Rejection of the Acceptance of the Position Register Request

The exchange does not register the position of the portable telephone set, and hence inhibits outgoing and incoming calls. In this case, the exchange notifies a higher- or (and) lower-ranking exchanges of the rejection of the registration of the position of the portable telephone set.

(2) Limited Acceptance of the Position Register Request

In order to control of outgoing and incoming calls of the portable telephone set, the exchange accepts the position register request within a limited range. (That is, the length of time for an outgoing or incoming call is limited, and the time is limited during which outgoing and incoming calls are permitted in a day.)

iv) Where the fixed telephone set corresponding to the portable telephone set stays in the home area of the latter, the exchange performs an absence transfer service.

v) In case of abnormal communication traffic the exchange performs the connection of the communication circuit according to the class.

vi) The exchange identifies the method and kind of the registration of the position of the portable telephone set, and in the case of an incoming call, determines the method of calling (wide area calling and narrow area calling)

vi) The exchange transmits to a third party a required portion of the information stored in the special information memory for each subscriber, on the basis of contracts made with the subscriber and the third party.

viii) Where the portable telephone set is capable of outgoing and incoming calls of different media services, the state of communication is stored for each different media.

ix) Data on the telephone rate chargeable on the portable telephone set having made an outgoing call in the roam area is acquired by the first class exchange to which the portable telephone set belongs, but the charging data is transmitted via another exchange or the like to the subscriber information memory of the first class exchange which administers the home area of the portable telephone set.

x) Information obtained in the subscriber information memory of the exchange of each rank is transmitted to the wide area portable telephone calling n-th radio base station which has an interface with the exchange.

(2-2) Function of the Subscriber Information Memory of the Telephone Key Service Unit i) The PID of the portable telephone set which has acquired the down control signal from the portable telephone key service unit ($SID_n$) and requested the resistration of its position is stored in the PID signal memory of the key service unit. The portable telephone key service unit ($SID_n$) notifies the associated fixed telephone set and KTC-I that the portable telephone set has its position registered in the key service unit.

ii) In the case where the radio wave field strength of the input to the portable telephone set engaged in communication through the associated key service unit has been reduced below a certain level because the portable telephone set has been brought far away from the key service unit, the system proceeds to an in-communication channel switching so-called hand-off operation. The key service unit stores the PID of the portable telephone set in the PID signal memory for a certain period of time after the channel switching operation. This is intended to provide for re-establishing a communication channel between the key service unit and the portable telephone set in a case where the system has failed the above channel switching operation.

iii) In the case of communication with the portable telephone set as well, the key service unit notifies the subscriber information memory of the first class exchange of the times of commencement and completion of the communication as well as the PID information of the key service unit and the portable telephone set.

(2-3) Function of the Subscriber Information Memory of the Fixed Telephone Set i) This memory stores outgoing call information from the fixed telephone set and, if necessary, supplies information to the display, and besides, transfers the stored contents in response to a request signal from KTC-I.

ii) Where the portable telephone set stays in the roam area and does not receive an incoming call thereto, the memory stores incoming call information transferred at certain timing.

iii) Where the portable telephone set has registered its position in the roam area, the memory receives the information from KTC-I-1 and stores it if the necessary function has been preset.

(2-4) Function of the Subscriber Information Memory of the Portable Telephone Set i) The memory stores the information on the registration of the position of the portable telephone set in the roam area and outgoing call information of the portable telephone set.

ii) The memory stores incoming call information of the portable telephone set in the roam area.

iii) The self-ID memory stores the self-ID information, a code number, credit information, and other ID information necessary for identification use.

Moreover, the fixed telephone set responds to a request signal from KTC-I to transmit thereto required pieces of the information stored in the self-ID memory above has clarified the functions of the subscriber information memories. A description will be given first of the radio communication circuit control system for use in the present invention and then the registration of the position of the portable telephone set which plays an important role in the present invention.

The control system for the radio communication circuit between the portable key service unit and the portable telephone set usually employs a plurality of control channels (although only one channel is used as in the case of the residential district), providing a function of controlling outgoing and incoming calls in a plurality of communication channels. The control channels are utilized for the position register request signal from the portable telephone set and a special signal (an outgoing call stop signal, for instance) to the portable telephone set. However, the present invention is applicable as well to a system in which control and communication channels are not separated from each other as mentioned above. In such a case, the same channel is used first for controlling operations of outgoing and incoming calls and then used as a communication channel. Where the system has a plurality of radio communication circuits, a function is provided which retrieve the communication circuits in a repeating cyclic order to find an unused radio communication circuit.

Now, a description will be given of the method of arrangement of control channels in the cordless telephone mode, that is, a method of providing a system which permits a number of portable telephone sets to individually make an outgoing call and receive an incoming call without interference and jamming in the case where a number of portable telephone key service units are installed in the service area. At first, an example of the system in a residential district, i.e. a portable telephone control system in the residential district mode will be described. In this instance, the down control channel from each portable telephone key service unit usually sends out a control signal only when necessary.

Upon turning ON of the power source of the portable telephone key service unit $SID_1$, it sends out a down ward control signal through down ward channel of a predetermined control channel (No. 1, for example) to the neighboring portable telephone set $PID_1$ to inform it of the turning ON of the power source. The downward control signal contains the $SID_1$ information, the channel number, etc. The portable telephone key service unit $SID_1$ repeatedly transmits the signal of the same contents. At the same time, the key service unit actuates a signal receiving circuit of an up channel of the control channel (No. 1) in preparation for receiving a position registration signal from the neighboring portable telephone set. In this case, there is installed another portable telephone key service unit in the neighborhood of the above-mentioned one. Since they employ the same control channel, if their power sources are turned ON at the same time, interference and jamming will occur, the probability of which is very low.

This will hereinbelow be described in concrete numeric values. Assuming that the number of control channels used is one, the probability of contention for the control channel (that is, in the case where the neighboring portable telephone key service units accept position register request signals at the time, the signals are not sufficiently transmitted due to jamming) is 3%, the time for which the control channel is occupied by each signal is 10 seconds, the busy hour call concentration ratio is 1/10, and the number of repetitive zones is 25 (that is, all radio waves of the 24 neighboring zones cause jamming), the number N of portable telephone key service units (for each zone) which can be accommodated in the system is given by the following equation:

$$N = \frac{a(1, 0.03)}{\frac{10}{60} \times \frac{1}{60} \times \frac{1}{10}} \times \frac{1}{25} = \frac{0.0309}{\frac{25}{3600}} = 4.45,$$

where a (1, 0.03) is offered traffic (in Erlang.) on the condition that the number of outgoing channel is one and the propagation of lost call is 0.03.

The above shows that about four portable telephne key service units can be accommodated at a maximum in each zone in which a single key service unit usually suffices. It will be appreciated from comparison with a calculated example of the communication traffic in Tokyo, described later, that the above value satisfies a necessary condition for the portable telephone system of the residential district mode. Since it is considered that the portable telephone key service units are normally used with their power sources held ON in practice, the above-mentioned value may be considered as a condition for setting up the system. Accordingly, the 10 seconds assumed above as the time for which the control channel is occupied by each signal is applied to the time of establishing the system. In the case where each portable telephone key service units is held with the power source ON, control of outgoing and incoming calls between it and the portable telephone associated therewith and other purposes can be achieved within one second.

Next, a description will be given of the number of portable telephone sets which can be accommodated, in view of the control ability of the portable telephone key service unit which is held in the residential district mode of operation. Assuming, as the conditions of the system design, as in the above, that the control signal disable (owing to interference) ratio is 3%, the time for which the control channel is occupied by each signal is 0.5 sec., the busy hour call concentration ratio is 1/10, the number of control operations for outgoing and incoming calls is 10 per day, and the number of repetitive zones is 25, the number n of portable telephone sets which can be accommodated in the key service unit is given by the following equation:

$$n = \frac{a(1, 0.03)}{\frac{0.5\ 10}{60} \times \frac{1}{60} \times \frac{1}{60}} \times \frac{1}{25} = \frac{0.0309}{\frac{125}{36000}} = 8.9$$

That is, about nine portable telephone set can be accommodated. On the other hand, in the case of the residential district mode, one portable telephone key service unit is installed for each residence and is used by its all family members. It is considered that the family usually consists of four or less, and even if the number of third parties who will use the key service unit on roads or similar places outside the residence is assumed to be four; therefore, the above numerical value is greater than a total of eight users, and hence does not pose any problem in the system configuration. However, the portable telephone set in the continuous position register request mode was excluded from the calculation. (In practice, since other key service units are installed on posts and at public places in the residential district as well, the number of users per key service unit will be further reduced.)

Moreover, the portable telephone system of the residential district mode must be studied from the viewpoint of the communication traffic. Assuming, as conditions for the system design in this case, that the loss probability is 0.03%, the number of communication channels is 50 (in Japan 89 channels will be permitted to use in the end of 1987 for cordless telephone instead 46 channels presently available, the number of communications is 10 per day, the time for which the control channel is occupied is three minites per call, the busy hour call concentration rate is 1/10, and the number of repetitive zones is 25, the number m of portable telephone sets which can be accommodated in each key service unit is given by the following equation:

$$m = \frac{a(50, 0.03)}{\frac{10\ 3}{60} \times \frac{1}{10}} \times \frac{1}{25} = \frac{41.933}{\frac{750}{600}} = 33.5$$

That is, about 34 portable telephone sets can be accommodated per key service unit. As compared with a calculated example of the traffic in 23 wards of Tokyo, described later, the above numerical value is sufficient for dealing with the traffic density in practice.

Next, a description will be given of the communication between the portable telephone key service unit with its power source held ON and the nearby portable telephone set (in an area in which radio waves are transmitted well and the communication therebetween is possible). It is considered that the neighboring portable telephone set assumes either one of the following states:

(1) The portable telephone set was put in the stand-by state (the power source was turned ON) before the power source of the key service unit is turned ON).

(2) The portable telephone set is put in the stand-by state after the key service unit was started its operation (the power source was turned ON).

The state (1) will be described first.

In this case, the portable telephone set $PID_1$ is in the state in which it is about to acquire (i.e. receive) either one of the down control channel of the portable telephone key service unit and the down control channel of the wide area portable telephone calling i-th class base station by cyclically switching them. The length of the control signal from the key service unit is made longer than the switching interval and the portable telephone set $PID_1$ can well receive this control signal without fail. In the case of the portable telephone set in the continuous position register request mode, since the position register request mode is received by the key service unit, the position registering operation is further ensured.

In this way, the portable telephone set $PID_1$ receives the down control signal from the key service unit $SID_1$, checks its contents, stores the $SID_1$ information and other information in its memory, and at the same time, sends out the position register request signal to the key service unit $SID_1$. The subsequent operations follows the steps described later, completing the registration of the position of the portable telephone set $PID_1$. Thereafter, only when an outgoing call from the portable telephone set PID$_1$ or an incoming call thereto occurs, the key service unit sends out a control signal.

It is seen from the above that in the portable telephone system of the residential district mode one control channel is sufficient in terms of the traffic of the control signal for outgoing and incoming calls. Table 1 shows, by way of example, the numbers of various control channels including the above. The reason for which two channels are assigned as control channels in the residential district mode is to cope with an increase in the communication traffic by the introduction of a new service or the division of the system; however, one channel will suffice in practice. The portable telephone system of the residential district mode utilizes frequency more effectively and consumes less power for transmission than the portable telephone system of the business district mode. However, in the case where it is desirable to locate the current position of, for example, a doctor or salesman as well as communicate with them through use of this system, it is necessary that the portable telephone set take the initiative in communication. This demand can be met by the use of a method in which the portable telephone set put in the continuous position register request mode sends out the position register signal at certain intervals. That is, the continuous position register request signal generator and the timer in FIG. 4A are actuated to operate the controller at, for example, 10- or 30-second, or 1-minute intervals, sending out the position register signal through a predetermined up control channel, for example, channel 1.

performs substantially the same operations as described above; therefore, no description will be given thereof, and let it be assumed that the portable telephone set PID$_2$ has entered the area, with its power source held ON. Since the portable telephone set PID$_2$ usually uses the upward control channel only when necessary and since the key service unit SID$_1$ also uses the downward control channel only when necessary, an outgoing call from the portable telephone set PID$_2$ can be made (In this case the portable telephone registers its position first and then sends out a calling signal.), but an incoming call can be received only in the wide area calling mode. To avoid this, it is necessary that, as described previously, the portable telephone set be put in the continuous position register request mode and caused to send out the position register request signal through the control channel No.1 at certain time intervals, and that the portable telephone key service unit having received the signal check its contents, store it in the memory if the portable telephone set PID$_2$ has not been stored therein yet, and send out a position registration signal of SID$_1$+PID$_2$ to KTC-I.

Incidentally, the communication traffic is sometimes high in the steady state in connection with a specific area or portable telephone key service unit even in the residential district—for example, the communication traffic in a supermarket or private store in the residential district. The communication traffic increases especially when the portable telephone set is used as a credit terminal. To cope with such a situation, the portable

TABLE 1

Examples of Number and Function of Control Channels from Fixed Radio Station in Portable Telephone System

| Kind of Mode | Control Channel Number | Communication Channel Number | | Note |
|---|---|---|---|---|
| | | For Communication Only | For Both of Communication and Data Transmission | |
| Cordless Telephone | 1 For residential district mode<br>2 (transmit when necessary)<br>3 For business<br>4 district<br>. (transmit at<br>. all times)<br>.<br>31<br>32 | 33<br>34<br>.<br>.<br>.<br>150 | 151<br>.<br>.<br>.<br>200 | Control channel can be converted to communication channel. |
| 1st Class Wide Area | 1001~1020 | — | — | All transmit |
| 2nd Class Wide Area | 2001~2121 | — | — | continuously and |
| 3rd Class Wide Area | 3001~3121 | — | — | capable of sending |
| 4th Class Wide Area | 4001~4020 | — | — | out voice, data, |
| 5th Class Wide Area | 5001~5020 | — | — | etc. |

Next, a description will be given of the case where a portable telephone set PID$_2$ has entered from the roam area into an area in which it can communicate with the portable telephone key service unit SID$_1$ (the case (2)). In the case where the power source of the portable telephone set PID$_1$ is turned ON in the neighborhood of the key service unit SID$_1$, the portable telephone set telephone key service unit is provided with a circuit for measuring the communication traffic in the key service unit itself, as indicated by 1-11 in FIG. 4B. When the traffic exceeds a certain value, the above circuit provides a state equivalent to that caused by connecting the switch SW1-10 to the contact S$_2$, thereby switching the key service unit from the control signal as-required-transmit mode to the control signal normally-transmit mode. This make it possible to cope with an increase in the traffic. When the communication traffic becomes smaller than a fixed value, the control signal transmission mode is switched from the normally-transmit mode to the as-required-transmit one, by which it is possible to achieve effective utilization of frequency and power saving.

Next, a description will be given of a method of switching the portable telephone system from the residential district mode to the business district one.

The communication traffic in the residential district is normally small and substantially uniform over the entire service area, but it sometimes abnormally increases in a specific section when an unexpected accident occurs or a meeting or special event is held. A monitor MON included in KTC-I shown in FIG. 5A monitors the comminication traffic in the area which the exchange administers, and when the traffic exceeds a certain value, the monitor changes the control signal transmission mode in the service area concerned. In this instance, the residential district mode is switched to the business district one. That is, the mode of transmission of the control signal from the portable telephone key service unit is switched from the as-required-transmit mode to the normally-transmit one. To this end, a switching signal is transmitted to all portable telephone key service units in the area concerned. The mode switching section in FIG. 4B has a function of switching between a state $S_1$ (the residential district mode) and a state $S_2$ (the business district mode) in response to an instruction from the KTC-I. This change of state is informed to the controller of each key service unit, switching the down control signal transmission mode from the as-required-transmit mode to the normally-transmit one.

With a view to preventing interference with the down control signal from the neighboring key service unit at the time of this change of state, the control channel is also changed (namely, the control channel from each portable telephone key service unit is made different from the control channel of the nearby key service unit). As a result of this, the portable telephone system enters the business district mode described in detail hereinbelow, making it possible to cope with an increase in the communication traffic.

Next, a description will be given of the radio communication circuit control system which is employed in the portable telephone system of the business district mode. The method of use of the control channel differs from that in the case of the residential district mode described above; namely, the down control channel of each portable telephone key service unit sends out the control signal at all times.

The transmission of the control signal at all times, herein mentioned, includes the case of sending out the control signal for one second at regular intervals (or at irregular intervals), for example, at 10-second intervals. The provision of such a 9-second non-transmission time serves for the purposes of reducing the power consumption by the transmitter of each key service unit and alleviating interference and such an intermittent transmission produces exactly the same effect as is obtainable with the constant transmission, and hence can be included in the former. In this case, the following three methods are employed for selecting the control channel which is used by the portable telephone key service unit. Although in this case the number of transmittable and receivable channels of the portable telephone key service unit is assumed to be one, an example of a plurality of such channels will be described later.

(1) The portable telephone key service unit is equipped with a function of retrieving down control channels from a number of key service units installed in its vicinity and selecting a control channel which will not interfere with those of the other key service units.

(2) Radio control equipment (RC) (see FIG. 5D or 5G) is provided, by which are specified the down control channels to be emitted from a number of portable telephone key service units (SID) subordinate to it. In this case, the radio control equipment RC is equipped with a function of administering the control channel and a function by which when the portable telephone key service unit, with which the portable telephone set has communicated, is changed to a new key service unit as a result of a travel of the portable telephone set from one place to another, the channel between them is switched to a new one. However, the radio control equipment RC is not permitted to carry out an administration such as specifying the communication channel which is used by each portable telephone key service unit.

(3) Radio control equipment RC is provided as in the case (2), and is equipped as well with the function of the administration of the communication channel.

Figure 5D:
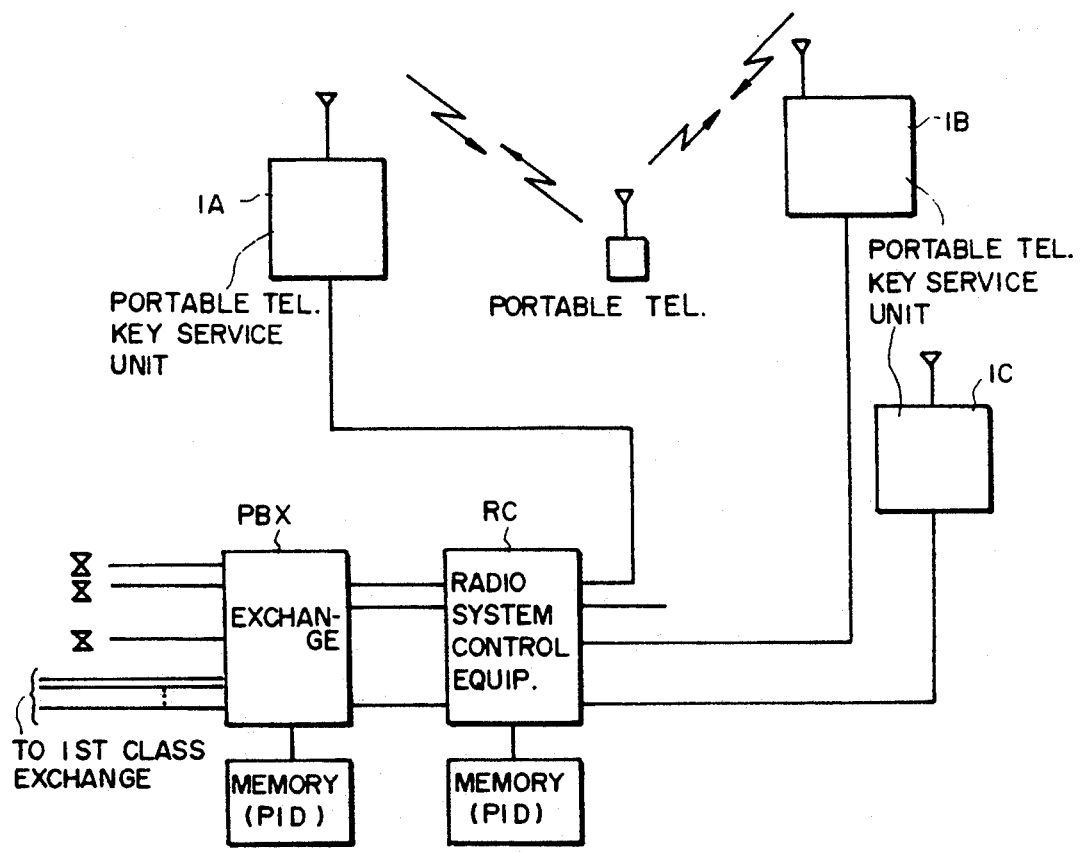
FIGS. 5D and 5E are block diagrams explanatory of systems employed in the present invention.
Figure 5E:
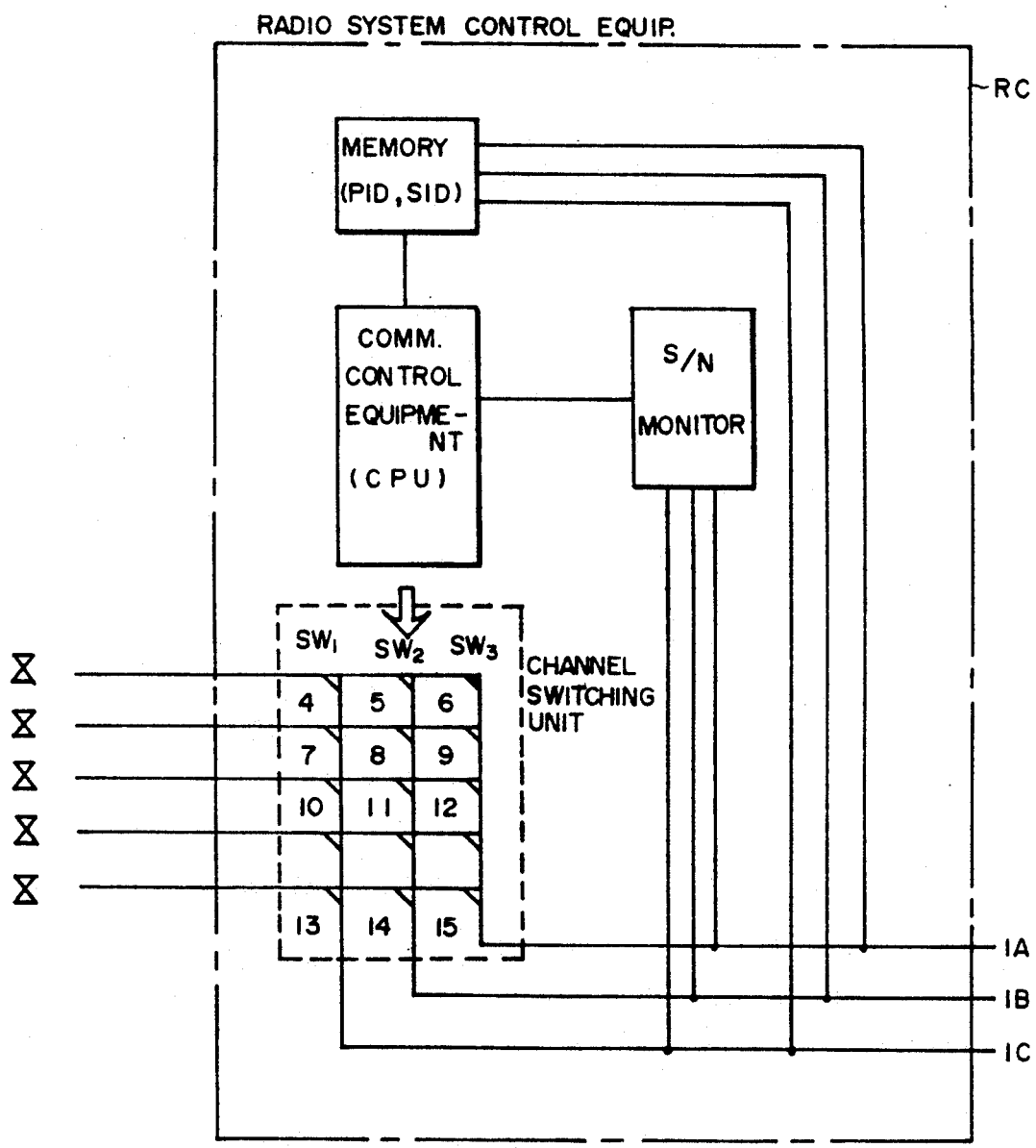
Figure 5G:
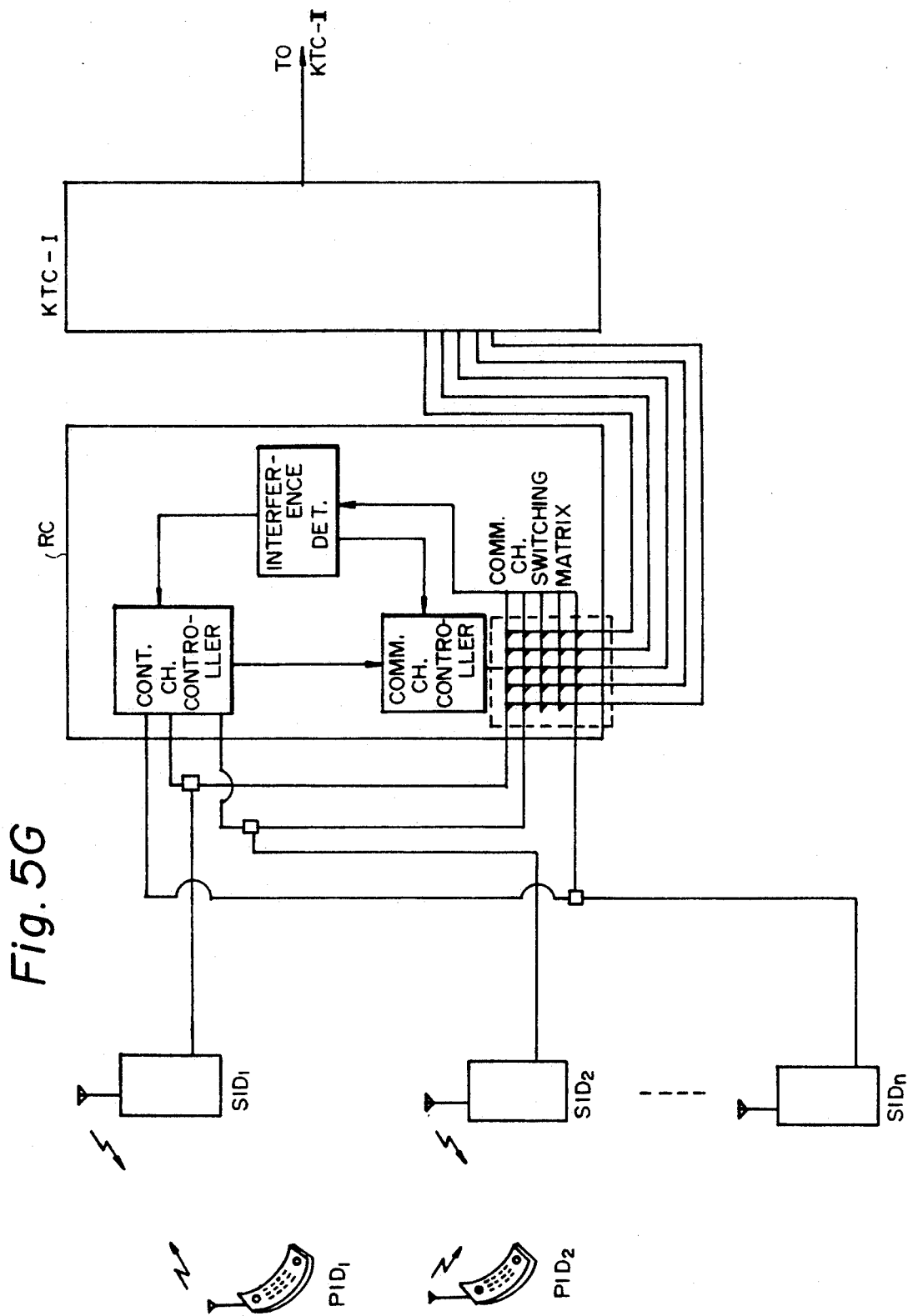
FIGS. 5G and 5H are block diagrams illustrating systems employed in the present invention.
Figure 5H:
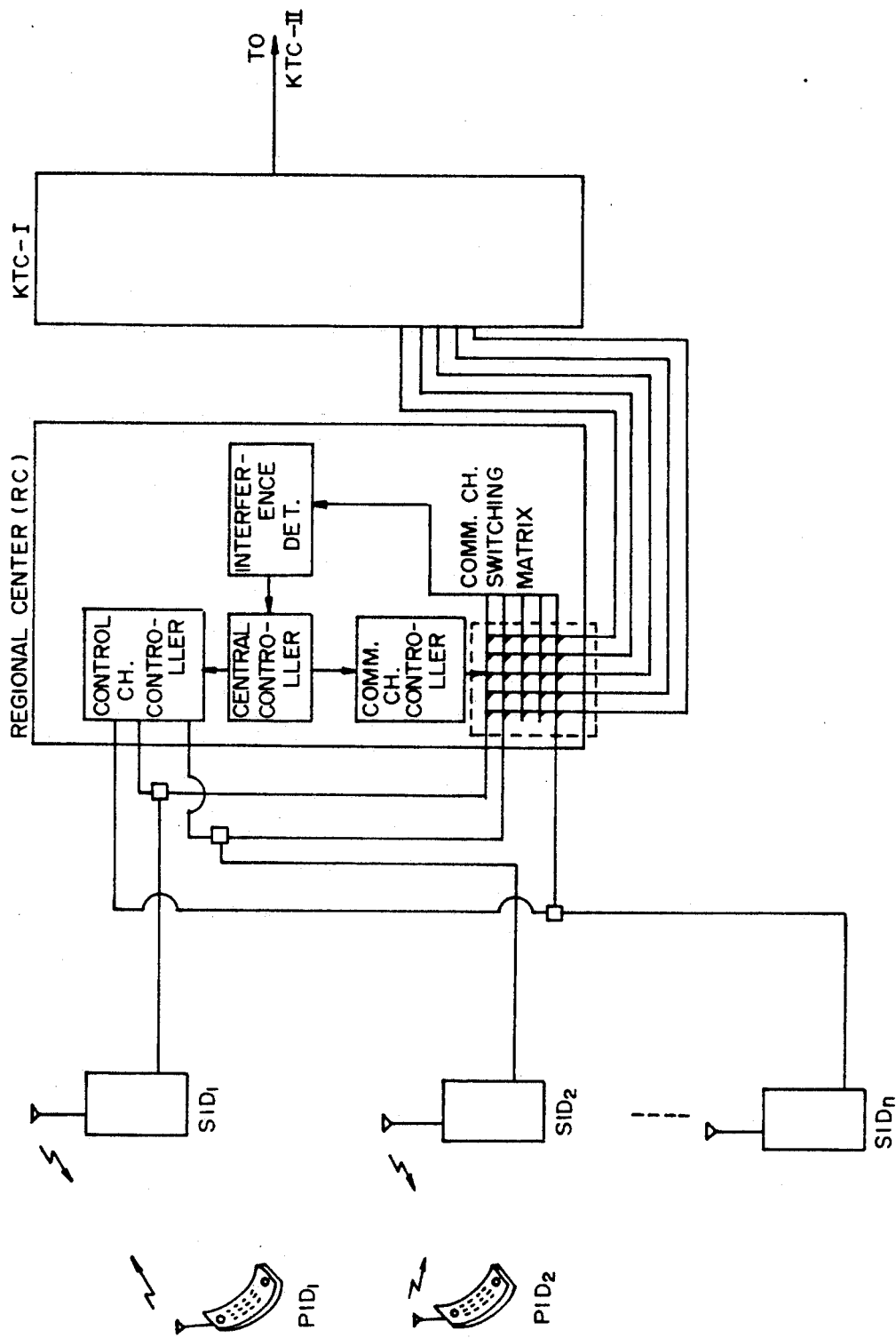
Figure 5I:
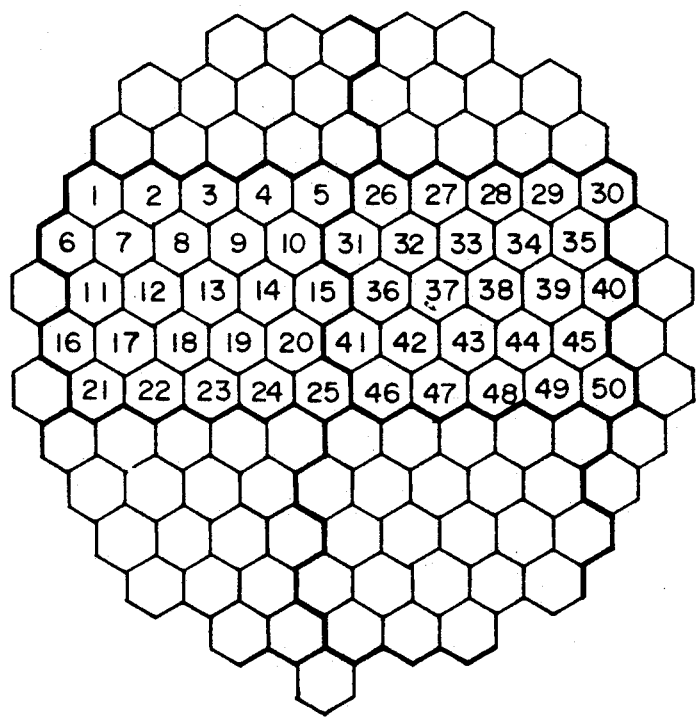
FIGS. 5I and 5J are diagrams illustrating examples of frequency allocations in the system of the present invention.

Now the method (1) will be described first. Let it be assumed that the portable telephone key service in their service areas are each installed at the center of one of such uniformly distributed regular hexagons as shown in FIG. 5I (the service area of each key service unit being a hexagonal zone (each side about 25 m long)). In practice, however, houses differ in size and the key service units are installed at different places within them and hence are not distributed uniformly as shown. In such a case, it is necessary only to avoid interference and jamming by increasing the number of control channels used; therefore, the above assumption will not impose any limitations on the effect of the present invention. Numerals in FIG. 5I indicate respective hexagonal zones. Assume that at a certain point of time the portable telephone key service units, each disposed in one of zones 1 to 25, are held with their power sources in the OFF state, that is, the key service units are not emitting radio waves. Further, assume that the number of control channels is 25. When the power source of the portable telephone key service unit in the zone 13 is turned ON at the next point of time, the key service unit sends out a control signal, using any one of control channels (down) Nos. 1 to 25. Prior to the emission of radio waves, the key service unit sweeps the control channels Nos. 1 through 25 by its receiver to check which channel or channels are being used or are not being used by any other key service units. In this example, the key service unit of the zone 13 finds out that no control channels are not used by the key service units of the other remaining zones. Accordingly, the key service unit of the zone 13 recognizes that any control channel will not be subjected to interference and jamming. Now, let it be assumed, for convenience of explanation, that the key service unit of the zone 13 uses the control channel No. 13.

When the power source of the portable telephone key service unit in the zone 14 is turned ON next, the key service unit will also emit radio waves through some other control channel after sweeping, by its receiver, the control channels Nos. 1 to 25 to check which channel or channels are being used. In this example, since the control channel No. 13 is being used, the key service unit in the zone 13 will use any one of the other control channels. Let it be assumed, for convenience of explanation, that the key service unit in the zones 14 uses the control channel No. 14.

Thereafter, when the power sources of the portable telephone key service units in the other zones 1, 2, 3, .. . 12, 15, 16, . . . 24 and 25 are turned ON one after another, the key service unit in each zone performs, prior to the emission of radio waves, the same operation as described above, that is, the key service unit checks the control channels No. 1 to 25, by sweeping them with its receiver, for an unused control channel. In this example, each key service unit recognizes that the control channels of the same number as the zone number of its own is not being used, and sends a control signal therethrough.

The zones 1 through 25 in the above description from a part of the whole service area as shown in FIG. 5I, in which there are provided zones 26 through 50 on the right-hand side of them. As regards the control channels to be used in these zones 26 to 50, let it be assumed that each zone uses a control channel the number of which is equal to the value obtained by subtracting 25 from its zone number, namely, the control channels Nos. 1, 2, 3, . . . are used in the zones 26, 27, 28, . . . , respectively. Accordingly, the control channel No. 1 is used in the zones 1 and 26. In this instance, the zones 1 and 26 are appreciable distant from each other, and the control signals from the both key service units are attenuated, in terms of their propagation characteristic, to such as extent that they will not interfere with each other. (Incidentally, 12 zones or so are employed in the NTT land mobile radio telephone system.) Accordingly, the use of 25 control channels will ensure that the control signals from the respective portable telephone key service units, even if transmitted at the same time, are free from interference and jamming by the others over the entire service area, no matter how wide it may be. Therefore, the system mentioned above is a kind of cellular system.

Although in the above the portable telephone key service units are distributed uniformly throughout the service area as depicted in FIG. 5I, there is also a case where they are distributed nonuniformly. In such a case, it is necessary only to increase the number of control channels used. When the relative distance between the portable telephone key service units which employ the same control channel is smaller than in the case of FIG. 5I, the introduction of another control channels, for instance, No. 26 will suffice. It is considered that a larger number of spare control channels may be required in practice. Table 1 shows examples of the number of control channels and the number of communication channels which are employed in the portable telephone system of the present invention. Of the control channels shown in the table, 30 control channels Nos. 3 to 32 are of the cordless telephone mode.

While in the above the number of the control channel used in each zone is described to the same as the zone number, this is not always necessary and it is a matter of course that each zone can use any channel so long as it does not interfere with other channels.

Moreover, the control channel being used may sometimes be jammed owing to a change in the state of propagation of radio waves or by an external radio waves even if the control channel is free from such interference or jamming at a certain point of time. The portable telephone set and the key service unit of the present invention are equipped with a function of checking for such interference and jamming and switching the control channel to another one when recognizing the interference. For example, if the control channel being used in the zone 14 is jammed, then another unused control channel, for instance, No. 26 is selected and used. The same is true of the communication channel. A transmission quality monitor incorporated in the receiving section of the portable telephone key service unit always monitors the transmission quality of the communication channel assigned thereto and switches the communication channel to another one if interference or jamming occurs.

Next, a description will be given of the operation of the portable telephone key service unit for registering the position of the portable telephone set. Assume that the portable telephone key service unit ($SID_1$) is installed in the zone 1 in FIG. 5I and that the power source of the portable telephone set $PID_1$ using this zone as its home area is turned ON. The receiving frequency synthesizer in the portable telephone in FIG. 4A starts its operation, automatically triggering the sweep of the control channels Nos. 1 through 32. As a result of this, it acquires the control channel in which a downward control signal is flowing. The downward control signal contains the $SID_1$ information, the control channel number, etc. Having received the down control signal, the portable telephone set $PID_1$ provides a position register request signal on the corresponding upward control channel of the control channel No. 1. This request signal contains the $PID_1$ information, the channel number, etc. Having received this request signal, the key service unit stores the $PID_1$ signal in its subscriber information memory and, at the same time, notifies the first class exchange of the position register request from the portable telephone set $PID_1$. This signal contains $PID_1+PID_1$ information. Having received this signal, the first class exchange KTC-I-1 stores in the position registration information memory of its subscriber information memory that the position of the portable telephone set $PID_1$ has been registered in the key service unit $SID_1$. At the same time the first class exchange notifies the key service unit $SID_1$ that the registration of the position of the portable telephone set $PID_1$ has been completed. Then the key service unit $SID_1$ checks the contents of the signal from the first class exchange and notifies the portable telephone set $PID_1$ of the completion of the registration of its position through the downward control channel.

In this way, the position of the portable telephone set $PID_1$ in the key service unit $SID_1$ is registered. The above operation is shown in FIG. 11A.

Next, a description will be given of an outgoing call from the portable telephone set the position of which has already been registered. When the portable telephone set $PID_1$ is off-hooked, it transmits a call request signal to the associated key service unit through the corresponding up control channel of the control channel being acquired. The request signal contains the $PID_1$ signal. Upon receiving the request signal, the portable telephone key service unit $SID_1$ checks the $PID_1$ signal and then notifies the portable telephone set $PID_1$ of the number of the communication channel which is not being used in the neighborhood, asking to send out a dial signal through this channel. (According to the system configuration, the dial signal may be transmitted using the control channel instead of the communication channel.) The portable telephone key service unit is capable of storing, by its synthesizer, communication channels which are not always used in its vicinity. That is, if channels 51 and 151 are unused channels among communication channels 33 to 150 and 151 to 200 of the cordless telephone mode in Table 1, the channel 51 is used exclusively for communication and the channel 151 is assigned to data communication. Accordingly, when receiving the downward control signal appointing the channel, the portable telephone set actuates its synthesizer under instructions of the controller, providing the dial signal on the communication channel No. 51 or 151.

Figure 7A:
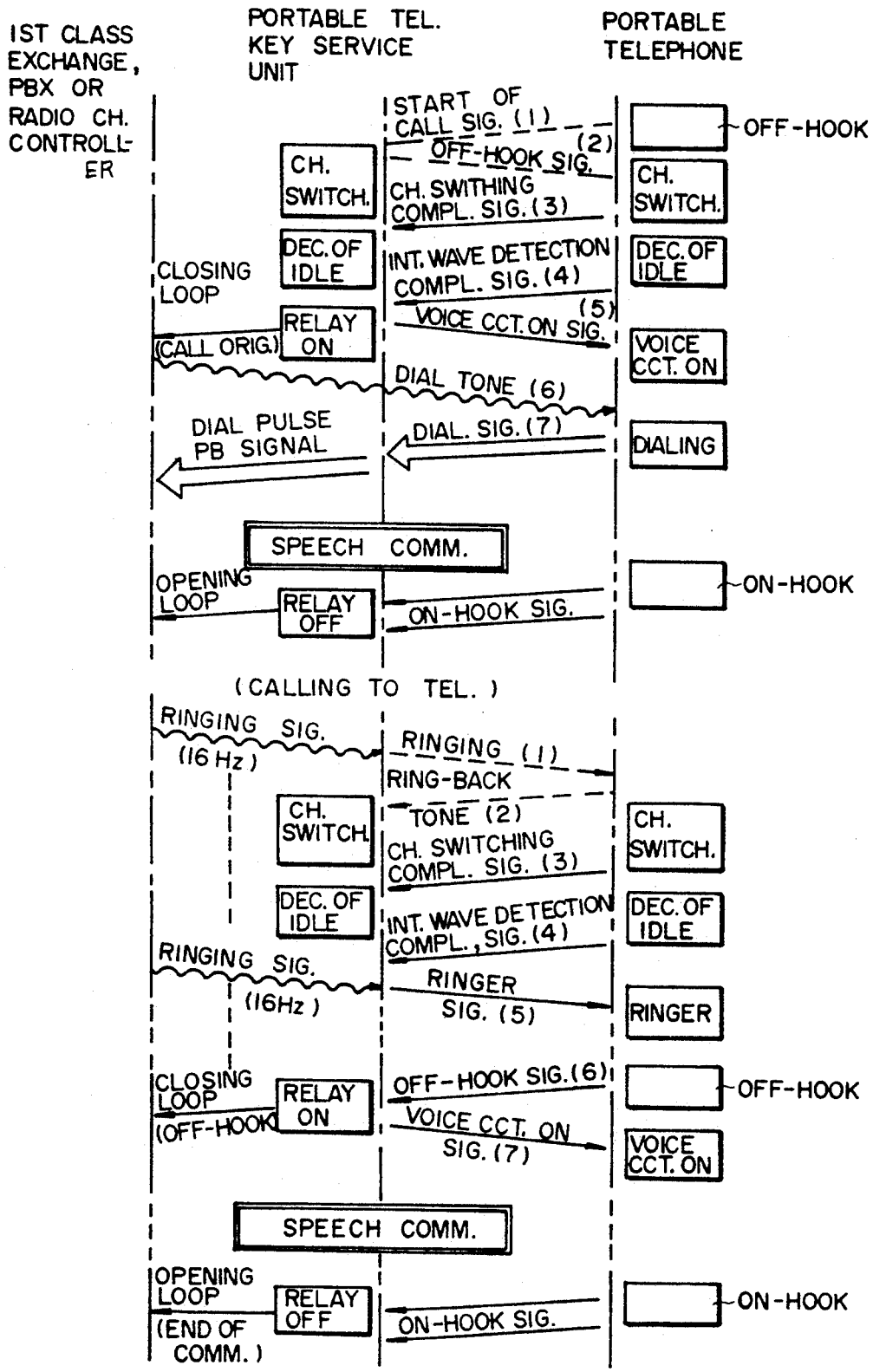
FIG. 7A is a flow shart illustrating signal flows at the outgoing call and the incoming call in the system of the present invention.
Figure 7C:
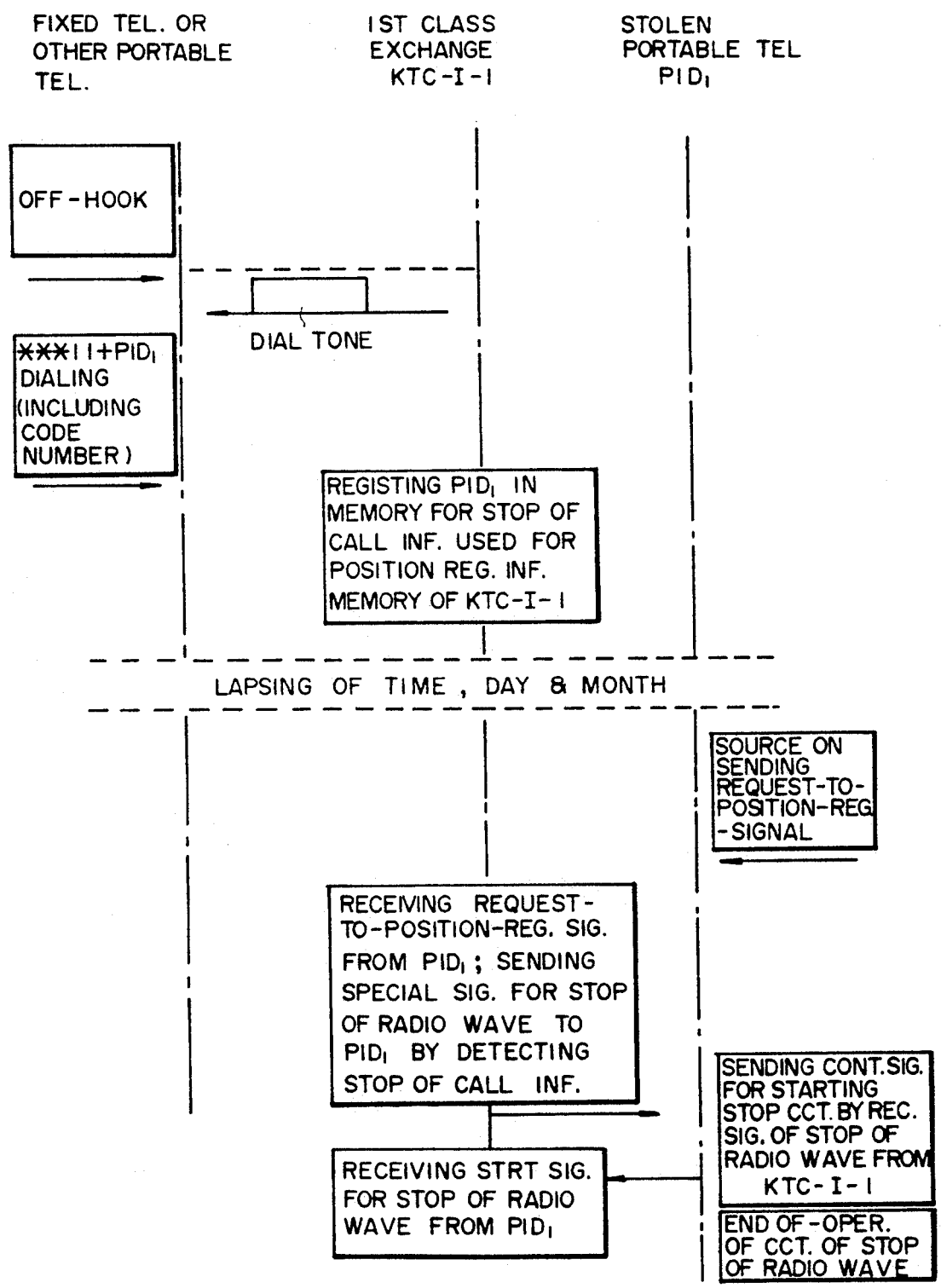

Thereafter, the call originating operation proceeds in the manner described later (see FIG. 7A).

The channels Nos. 51 to 200 in Table 1 are used exclusively for communication. In a case where the communication traffic has increased and all the communication channels are busy, no extra channel can be used as a communication channel but the portable telephone key service unit possesses a function of provisionally diverting a control channel to communication. If the portable telephone set $PID_1$ transmits the call request signal when the communication channels are all busy, the key service unit sends to the portable telephone set $PID_1$ a command signal instructing it to use the control channel No. 11 as a communication channel. Then the portable telephone set $PID_1$ sends out the dial signal, using the control channel No. 11 as a communication channel accordingly. After this, the call originating operation proceeds as depicted in FIG. 7A.

Next, a description will be given of the number N of portable telephone sets which can be accommodated in terms of the processing capability in the portable telephone system of the business district mode described above. Using, as various numerical values for calculation, the same values used previously for the residential district mode (except that the communication traffic is 40 times per day), the number N is given as follows:

$$N = \frac{a(1, 0.03)}{\frac{40 \times 0.5}{60} \times \frac{1}{60} \times \frac{1}{10}} = \frac{0.039}{\frac{20}{36000}} = 55.6$$

That is, 56 portable telephone sets can be accommodated in each zone. It was assumed, however, that the number of repetitive zones need not be taken into account since adjoining zones use different control channels.

Judging from the above, it is possible to implement a system model described later.

Next, a description will be given of a radio communication circuit control method of the portable telephones of the business district mode at a place congested with people.

It is considered that even if the afore-mentioned portable telephone system of the business district mode is applied at such a place, no satisfactory communication can be achieved because of high traffic density. A solution to this problem is the adoption of smaller zones. In the above the service zone of one portable telephone key service unit is selected to be a zone with a radius of 25 m, but if the transmitting powers of the portable telephone set and the key service unit and reduced and if the radius of the service area of the latter is reduced to 10 m, then $(25/10)^2 = 6.25$; this represents a six-fold or more increase in the communication traffic that can be processed. From the technical point of view, this can easily be done, for example, by reducing the transmitting power of the key service unit to 1 mW which is 1/10 of its ordinary transmitting power and by furnishing the portable telephone set with a transmitting power control function by which it responds to the down control signal to lower its transmitting power to the same level as that of the key service unit only when it is used in the small zone. This is a known technology.

A second solution is to instal a plurality of portable telephone key service units in the same service zone (cellular zone). By employing n key service units in the service zone, the traffic processing capability in that zone will become n-fold. However, this calls for n control and communication channels for each zone and hence is not so advisable but economical. A more effective method will be described below.

According to this third method, the radio communication circuit control equipment RC mentioned previously in (2) (see FIG. 5D) is utilized, by which are appointed down control channels from a number portable telephone key service units placed under control of the equipment RC. In this instance, however, the function of the radio communication circuit equipment RC is limited to the administration of the control channels and the switching of the channel of the portable telephone set during communication. Further, this method is applied to the portable telephone system of the business district mode because the function of the equipment RC is not performed in the residential district mode.

Figure 5J:
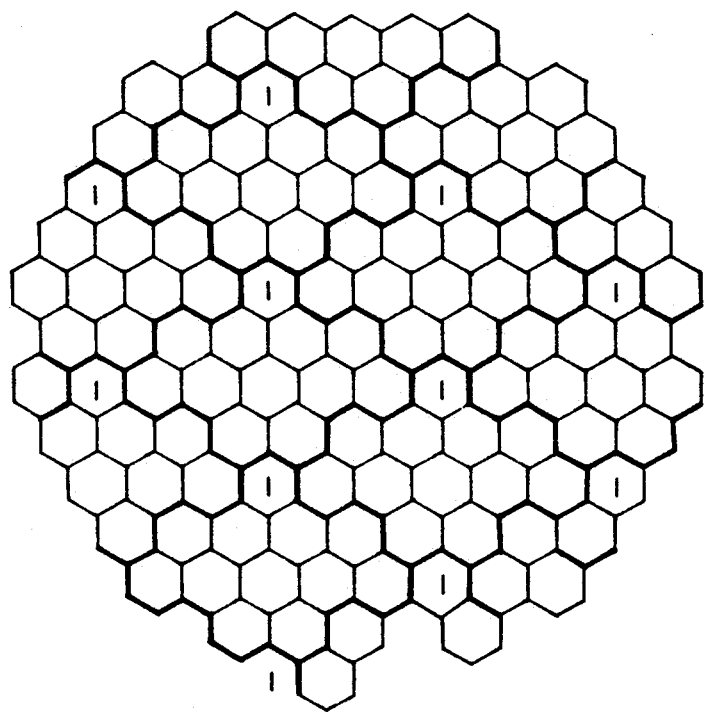

With the provision of the radio communication circuit control equipment RC, it is possible to assign the control channels to its subordinate portable telephone key service units under a certain rule or utilize, for the channel assignment, values of interference and jamming premeasured in a state in which control signals were actually transmitted from a number of key service units. Therefore, this method improves the utilization efficiency of frequency as compared with the case described previously in (1). FIG. 5J shows an example of this method, in which the number of repetitive zones is 12; accordingly, the same frequency can be reused for every 12 zones. Also in this case, however, it is better to prepare a spare channel against the occurrence of interference or jamming, and it is possible to instal two portable telephone key service units for each small zone in anticipation of an increase in the traffic density of the whole system. In such a case, the number of control channels is $12 \times 2 = 24$ plus the spare channel.

Figure 5K:
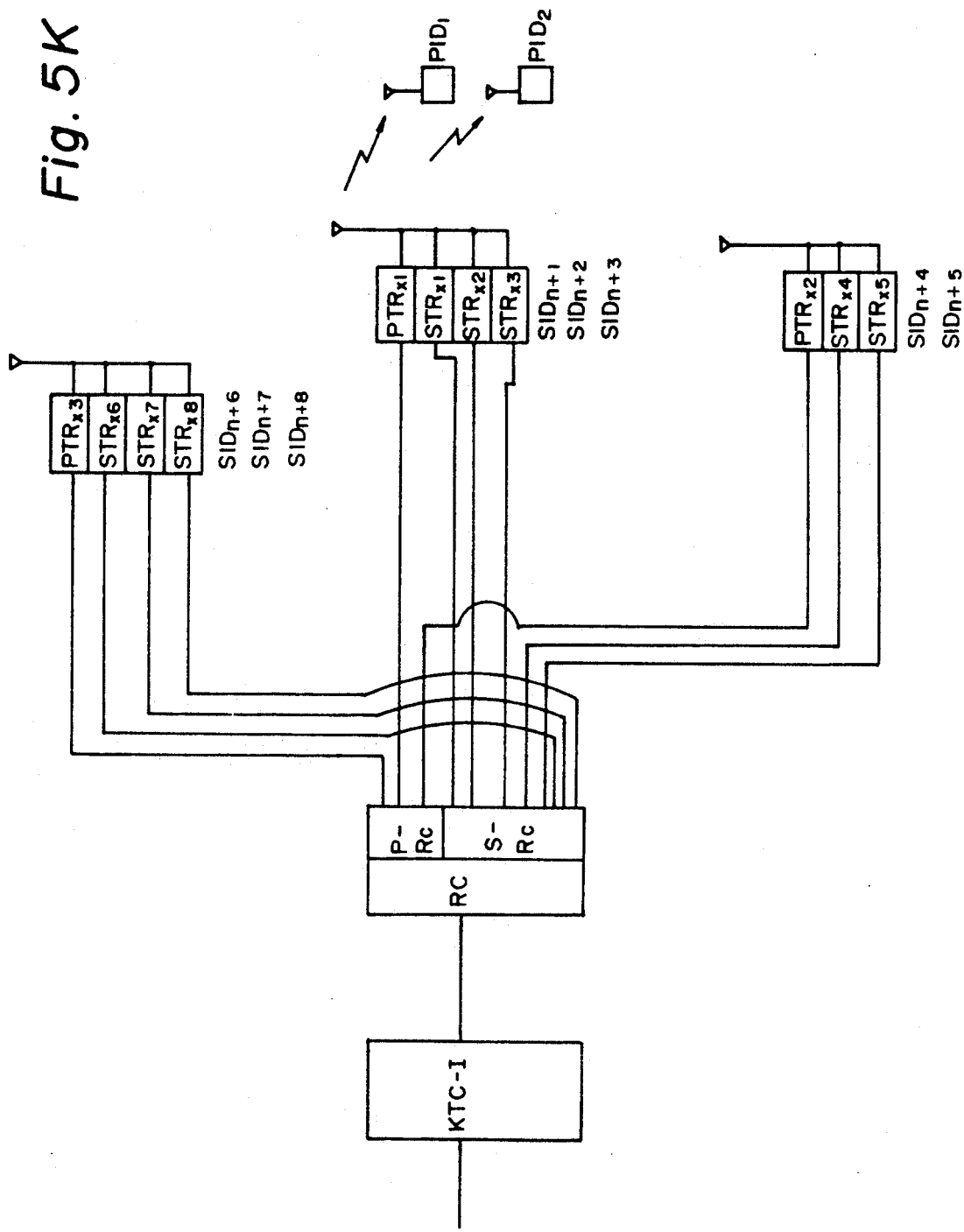
FIG. 5K is a block diagram illustrating an example of the system employed in the present invention.

With the use of this method, the portable telephone key service unit for use in the residential mode can be utilized as it is, with no particular necessity of newly designing the key service unit. However, this method employs two control channels for each zone, and hence is not advantageous from the viewpoint of efficient utilization of frequency. To avoid this shortcoming, it is also possible to employ a method in which one control channel is assigned to each zone and is caused to control the use of a plurality of communication channels, as shown in FIG. 5K Since the number N of portable telephone key service units which can be accommodated in one zone in terms of the control signal processing capability is 4.45 as referred previously, four to five key service units can be provided in this method. Also in this case, it is possible, of course, to divert the transceiver for the control channel use to communication in the case of a traffic congestion. (The control signal used in this case is outside the band of the communication signal.)

It is considered that this method (2) will be used in many cases when the portable telephone system is extended. The method (1) is simple in system configuration, and hence is suitable for use in an area of small communication traffic, such as a residential district. On the other hand, the method (2) will be employed in an area of large traffic, such as busy streets. However, the method (2) will be used as well in the residential district when the communication traffic therein increases.

The registration of the position of the portable telephone and its calling operation are carried out in the same manner as described above. FIG. 5G shows the case where the radio communication circuit controller RC is disposed apart from the exchange KTC-I, but they may also be provided at the same place. Alternatively, it is possible to dispose one radio communication circuit controller in each administrative district, i.e. in each town and each village, and place the controllers RC under the same exchange KTC-I.

In the radio communication circuit controller RC shown in FIG. 5G, a control channel controller is capable of applying a control signal to a communication channel controller, instructing it to switch the communication channel in response to the travel of the portable telephone unit or for avoiding interference and jamming.

Now, the method (3) will be described. FIG. 5H shows an embodiment of this method, in which the communication channel as well as the control channel are designated by the radio communication circuit controller RC. This method is of particular utility when employed in an area of extremely high traffic.

The above has described the communication circuit control of the portable telephone systems of the residential district mode and the business district mode. Next, a description will be given of the operation of the portable telephone near the boundary between areas in which these two modes are employed, respectively.

Now, let be assumed that a portable telephone owner is walking near the boundary between the above-mentioned areas, with his portable telephone set $PID_1$ held in the ON state. In such a situation, the portable telephone set usually tries to acquire the down control channel, and hence is considered to belong to the business district mode. As he walks away from a business district and into a residential district, the SN ratio of the control channel acquired until then becomes deteriorated. When the SN ratio becomes smaller than a certain value, the portable telephone set proceeds to the retrieval of another down control channel. In this case, however, the portable telephone set cannot acquire any down control channel because in the portable telephone system of the residential district mode no key service unit sends out the down control channel at all times. After a certain elapsed time the portable telephone set decides that it has entered the residential district mode area, and thereafter sends out a position register request signal through an up channel of a control channel (channel No. 1 is Table 1) assigned under the portable telephone system of the residential district mode. Upon receiving this request signal, the nearest portable telephone key service unit in the residential district mode registers the position of the portable telephone in the same manner as described previously, after which the portable telephone set operates in the residential district mode. Where the portable telephone set was initially set in the continuous position register request mode, it will return to its initial state and resume the continuous transmission of the position register request signal.

In the case where a portable telephone set in the residential district mode has been carried in the business mode area, if the portable telephone set is in the continuous position register request mode, it is continuously transmitting its $PID_1$ signal through the up control channel of the channel No. 1 shown in Table 1. In this case, however, since the portable telephone set has entered the business district mode, it cannot receive any answer through the down channel of the control channel No. 1 from the portable telephone key service unit in the residential district mode area. Then, after a certain elapsed time the portable telephone set automatically stops the continuous signal transmission for the registration of its position and starts searching for a down control channel which is used in the business district mode. That is, the portable telephone set cyclically retrieves the control channels Nos. 3 to 32 of the cordless telephone mode shown in Table 1. Thus the portable telephone set acquires an unused control channel and then proceeds to its stand-by state.

Even in the case where the portable telephone set has succeeded in acquiring the down control channel of the cordless telephone mode, if it still continues travelling, its down control channel receiving power decreases, and finally the received signal quality also falls below a certain transmission quality standard. Then the portable telephone set gives up the down control channel and resumes the retrieval to catch another down control channel, thereafter repeating exactly the same operations as described above.

The above is the case in which the portable telephone set is in the continuous position register request mode. Next, a description will be given of a portable telephone set which is in the ordinary residential district mode.

In this instance, the portable telephone set still remains in the state of receiving the down control signal in the channel No. 1 shown in Table 1 even after it has entered the service area of the business district mode. Accordingly, the portable telephone set cannot receive an incoming call and cannot but resort to the wide area calling mode therefor. As regards an outgoing call, the portable telephone set transmits a calling signal through the up channel of the control channel No. 1 in Table 1 but receives no answer from the nearest portable telephone key service unit; and so that after a certain elapsed time the portable telephone set automatically starts the retrieval of a down control channel which is used in the business distric mode.

Therefore, the subsequent operations are exactly the same as described previously.

In order to enable the portable telephone set of the present invention to communicate with other telephone sets at all times even while its owner travels all over the country, it is necessary to always detect the current position of the portable telephone set, that is, monitor and store with which key service unit the portable telephone set is able to communicate. This is done by the subscriber information memories (MEM) of the portable telephone key service unit and the first to fifth class exchanges.

The registration of the position of the portable telephone set is classified into the following six cases according to the distance from its home area.

In the following it is assumed, for the sake of brevity, that the portable telephone system of the business district mode is used in which the portable telephone key service unit always transmits a control signal through a down control channel. In the case of the residential district mode, since the key service unit does not send out the control signal at all times, the portable telephone set must be switched to the continuous position register request mode when it transmits the position register signal to the key service unit, but the subsequent operations are identical with those in the normally-transmit mode.

i) Position Registration in the Home Area

Upon turning ON the power source of the portable telephone set in its home area, it immediately starts the operation for registering its position. FIG. 11A shows the flow of operation in this case. The following description will be given with reference to FIG. 11A. In FIG. 11A, when its power switch is turned ON, the portable telephone set $PID_1$ acquires a down control cahnnel of the portable telephone key service unit $SID_1$ in the home area and transmits thereto a position register request signal, using the corresponding up control channel. The portable telephone key service unit $SID_1$ receives and stores the request signal in its memory and at the same time transmits it to the first class exchange KTC-I-1. The exchange KTC-I-1 stores in its subscriber information memory that the position of the portable telephone set $PID_1$ has been registered in the key service unit $SID_1$ of its home area, after which the exchange transmits a registration completion signal to the portable telephone key service unit $SID_1$. When receiving the signal, the key service unit $SID_1$ collates the $PID_1$ information contained in the signal and then transmits a registration completion signal to the portable telephone set $PID_1$, which, in turn, checks the signal contents and stores the $SID_1$ information.

Thus the registration of the position of the portable telephone in the home area is completed.

ii) Position Registration in the First Class Roam Area

Referring next to FIG. 11B, the position registration in the first class roam area will be described. In FIG. 11B, when its power source is turned ON, the portable telephone set $PID_1$ transmits a position register request signal to the associated portable telephone key service unit $SID_1$ as in the above. Upon receiving the request signal, the key service unit $SID_2$ checks the $PID_1$ information contained in the received signal. In this case, the key service unit $SID_2$ recognizes that the portable telephone set $PID_1$ is not a portable telephone set $PID_2$ associated with the key service unit but a portable telephone set of a third party in the roam area. Then the key service unit $SID_2$ stores the $PID_1$ information in its memory and transmits a position register request signal to the exchange KTC-I-1. The exchange stores in its memory that the position of the portable telephone set $PID_1$ has been registered in the key service unit $SID_2$ in place of the key service unit $SID_1$, and then transmits a completion signal to the key service unit $SID_2$. The subsequent operations are exactly the same as those in the case of FIG. 11A and the registration of the position of the portable telephone set $PID_1$ in the key service unit $SID_2$ is finished.

Next, a description will be given, with reference to FIG. 11C, of the position registration in the case where the portable telephone set $PID_1$ with its power source held ON has been moved in the first class roam area. In FIG. 11C, the portable telephone set $PID_1$ still holds the down control channel from the portable telephone key service unit $SID_2$, but as it travels, its input radio wave field strength decreases and finally becomes lower than a fixed reference value. Then the portable telephone set $PID_1$ starts the retrieval of another control channel on the basis of information from a noise level detector (see FIG. 4(a)). When the portable telephone set $PID_1$ finds that the input field value of a down control channel from another portable telephone key service unit, for example, $SID_3$ satisfies the reference value, the portable telephone set $PID_1$ rewrites the $SID_2$ information prestored in its memory to the $SID_3$ information, and transmits a position register request signal to the key service unit $SID_3$. The key service unit $SID_3$ stores the $PID_2$ information in its memory and transmits a position register request signal to the exchange KTC-I-1. The subsequent operations are the same as in the case of FIG. 11B.

iii) Position Resistration in the Second Class Roam Area

With reference to FIG. 11D, the operation flow in this case will be described. In FIG. 11D the operations from the turning ON of the power source of the portable telephone set $PID_1$ to the signal reception by an exchange KTC-I-2 are exactly the same as those in the case of FIG. 11D. Having checked the contents of the position register request signal, the exchange KCT-I-2 recognizes that the portable telephone set $PID_1$ is not a portable telephone set which the exchange administers, and stores the $PID_1$ information in its position registration memory. At the same time the exchange KTC-I-2 transmits a position register request signal to an exchange KTC-II-1 which administers the portable telephone set $PID_1$. After checking the contents of the request signal, the exchange KTC-II-1 stores the signal in its position registration memory and requests the exchange KTC-I-1, which administers the portable telephone set $PID_1$, to store that the position of the portable telephone set $PID_1$ has been registered in a portable telephone key service unit $SID_4$ which the exchange KTC-I-2 administers. The exchange KTC-I-1 checks the contents of the request signal, stores it in its position registration memory, and further transmits a registration completion signal to the exchange KTC-II-1. The exchange KTC-II-1 collates the contents stored in its position registration memory and then transmits a registration completion signal to the exchange KTC-I-2. The subsequent operations are exactly the same as in the case of FIG. 11C and the registration of the position of the portable telephone set $PID_1$ in the portable telephone key service unit $SID_4$ is completed.

i) Position Registration in the Third Class Roam Area

Turning next to FIG. 11E, the operation flow in this case will be described. In the operation flow of position registration shown in FIG. 11E the operations from the turning ON of the power source of the portable telephone set $PID_1$ to the signal transmission to an exchange KTC-II-3 are exactly the same as those in the case of FIG. 11D.

A position register request signal transmitted to the exchange KTC-II-3 is checked and stored in its memory. Since it is found, as a result of this checking, that the portable telephone set $PID_1$ is not a portable telephone set which the exchange administers, the exchange KTC-II-3 transmits a position register request signal to a high-ranking exchange KTC-III-1. The exchange KTC-III-1 recognizes that the portable telephone set $PID_1$ is under its control, and stores the signal in its memory. Further, the exchange KTC-III-1 transmits a position register request signal to the exchange KTC-II-1. The subsequent operation follows exactly the same process as in the case of FIG. 11D, completing the registration of the position of the portable telephone set $PID_1$ in a portable telephone key service unit $SID_5$.

v) Position Registration in the Fourth Class Roam Area

FIG. 11F shows the operation flow in this case. This operation flow is exactly identical with that in FIG. 11E except the intervention of the fourth class exchange.

vi) Position Registration in the Fifth Class Roam Area

FIG. 11G shows the operation flow in this case. This operation flow is exactly identical with that in FIG. 11F except the intervention of the fifth class exchange.

Incidentally, it is not always necessary to store the position registration information of the portable telephone set $PID_1$ in the memories of the exchanges KTC-II-3 in FIG. 11E, KTC-II-4 and KTC-III-4 in FIG. 11F, and KTC-II-5, KTC-III-5 and KTC-IV-5 in FIG. 11G. Even if the information is not stored in the memories of these exchanges, the effect of the present invention will not be adversely affected at all. However, by such a seemingly awkward operation of storing the position registration information in each exchange it is possible to obtain the advantage that when the portable telephone set $PID_1$ in a certain roam area is called from a roam area of the same kind, a channel can be established between them simply by retrieving the exchange which administers the latter roam area, without the need of inquiring of a higher-ranking exchange. Judging from the fact that memories are now becoming more and more inexpensive, it is preferable to store the registration information in the memories of all exchanges which take part in the registration.

Finally, the operation for cancelling (or transferring) the registration will be described in connection with the case where the portable telephone set $PID_1$ having been registered in the fifth class roam area now transfers the registraction of its position to the home area.

vii) Operation by which Portable Telephone Set $PID_1$ Registered in Fifth Class Roam Area Transfers its Position Registration to Home Area As a matter of fact, a situation like this would arise, for example, in the case where a person who lives in Tokyo travels to Hokkaido carrying a portable telephone set with him, uses it at various places in Hokkaido, holds it OFF on his way home, and then turns it ON in his home on the following day.

In this instance, the portable telephone set registers again its position in its home area in Tokyo through the following flow of operation, which is exactly reverse from that for the position registration in the fifth class roam area described above with regard to FIG. 11G. That is, the exchanges $SID_1$, KTC-n-5 (where n=1, 2, 3, 4, 5) and KTC-n-1 (where n=1, 2, 3, 4, 5) have stored in their memories that the position of the portable telephone set $PID_1$ is registered in an exchange $SID_7$, but this information is changed (or erased). In concrete terms, the exchange $SID_1$ changes in its memory the registration of the position of the portable telephone set in the fifth class roam area to the registration in the home area. The exchange notifies the exchange KTC-I-1 that the portable telephone set $PID_1$ has requested to register its position. The exchange KTC-I-1 retrieves its memory and changes the stored contents and, at the same time, request the exchange KTC-II-1 to change (or erase) the registration of the position of the portable telephone set $PID_1$. The exchange KTC-II-1, in turn, erases the position registration information of the portable telephone set $PID_1$ stored in its memory and requests the exchange KTC-III-1 to change (or erase) the position registration information of the portable telephone set $PID_1$. Thus the position registration information of the portable telephone set $PID_1$ stored in the memories of all the exchanges except those $SID_1$ and KTC-I-1 is erased.

The above has clarified the operation for registering the position of the portable telephone set. As described above, the registration of the position of the portable telephone set is always carried out in the portable telephone system of the present invention. In addition, the thus registered position is limited to an area with a radius of 25 m in the cordless telephone mode, and hence is very accurate. Accordingly, in the case of supervising the current positions of insurance canvassers or salesmen through use of an electric scoreboard or similar equipment installed in their office or the like, the purpose can easily be attained simply by letting them carry portable telephone sets with them and receiving their registered position information from the nearest first class exchange (KTC-I-1). As will be appreciated from the above, the present invention is of very wide application including communication.

In order to make full use of the position registration in the portable telephone system of the present invention, it is a precondition that the portable telephone be held in the stand-by state (with its power source ON). Taking into account the fact that the power consumption of ICs and high-frequency circuits are now being reduced more and more, it is desirable that the portable telephone set having once left the home area be held in the ON state. If portable telephone sets in the roam area satisfy this condition, then the following new services can be achieved.

(1) Each portable telephone owner can send out an emergency call in cases of a tidal wave, a typhoon, some other calamities, and accidents.

(2) Even if an important person who has not registered his portable telephone set for some reason, he can be called up in the wide area calling mode (using a satellite).

(3) It is possible to communicate with a salesman, doctor, or some other person who has arrived at a designated city, town, or village. Conversely, when such a person has left a certain area, he can automatically inform his office in the home area that the registration of the position of the portable telephone has been changed.

(4) A service of reporting market conditions at the fixed time every day can be performed for persons who are travelling all over the country.

(5) An emergency message from the portable telephone set can effectively executed.

Next, the application of this invention system to the above cases will be concretely described in detail.

(a) Emergency Call from the Owner of the Portable Telephone Set

It is predetermined, in this case, that when the owner of the portable telephone set feels ill or is suddenly taken ill in his home or somewhere else, he needs only to press an emergency call button of the portable telephone set or dial "119" (an emergency number now adopted in Japan). When receiving the emergency call, an emergency medical center can dispatch an ambulance to the place where the patient is, immediately after making the exchange KTC-I-1 transfer information about the current position of the portable telephone set. In the existing system for the aged, old men and women are each given what is called an emergency pendant and when this pendant is pulled in case of emergency, radio transmitter incorporated therein sends out an SOS call to an emergency medical center which is ready to dispatch an ambulance at all times. The present invention will enhance the performance of this system and extends its service area across the country. Similarly, in a case of a fire at the place where the owner of the portable telephone set is, he needs only to say "fire" after dialing "119", for example (the verbal message is not always needed but may be substituted with a dial signal or the like), without the necessity of telling the place name and address of the scene of the fire and explaining in detail appearances of the neighboring buildings as in the existing system. In a fire defense center the registered position of the calling party can be displayed on its electric scoreboard, and accordingly, fire engines can immediately dispatched to the scene of the fire.

Also in a case of a crime or traffic accident, by dialing "110", for instance, from the portable telephone set at the scene, its current position can clearly be recognized at a squad car control center, and accordingly, effective activities can be performed.

(b) Current Position Sending of a Senile Person, etc.

At present the Japanese population is aging and the number of elderly people is on the increase; at the same time, an increasing number of senile persons is becoming a social problem. In particular, senile persons who slip out of their homes and wander about aimlessly day and night are annoyance to the neighborhood and are likely to meet traffic accidents; and so that members of their families are mentally exhausted by searching for their missing old people. The portable telephone system of the present invention is good news as well to the families who have senile persons on their hands.

Letting such a senile person carry a portable telephone set (with its power source held in the ON state) with him, it is very easy to find him simply by inquiring the current position of the portable telephone set from the exchange KTC-I-1. In a similar manner, letting a child get hold of a portable telephone set in a spacious pleasure ground, for example, he can easily be found even if he should get lost.

While the above description has been given on the assumption that the subscriber information memory of the n-th class exchange has a storage capacity large enough to store new information at all times, the situation arises where it cannot store the positional information of the portable telephone set PID because of the saturation of its storage capacity or its breakdown. In this case, the positional information is stored by other exchanges in the order of their priorities. Where the subscriber information memory of the n-th class exchange becomes out of order, the (n+1)th class exchange stores the information. If this exchange cannot store the information, then the information is transferred to a higher class exchange and finally to the fifth class exchange. When the memory of the fifth class exchange cannot store the information either, the position of the portable telephone set PID is registered in the portable telephone key service unit or fixed telephone set ($SID_1$) of the home area.

When an incoming call to the portable telephone set $PID_1$ is made in the above-said state, its current position is inquired of the exchange $SID_1$ through a transmission line, after which the portable telephone set PID is called through the exchange which administers the area in which the portable telephone set $PID_1$ is staying actually. Thus communication is enabled between the calling and called parties without any trouble although the control signal makes an appreciably long detour.

It will be appreciated from the above how important a role the subscriber information memory of the n-th class (where n = 1, 2, 3, 4 and 5) plays in the system of the present invention. Now a description will be given of the traffic which uses this memory and its required storage capacity, showing that the decentralized system of the present invention is advantageous over the conventional centralized system.

(2-5) Position Registration Traffic and Required Storage Capacity

The portable telephone set of the present invention is carried to various places all over the country and is used for outgoing calls to and incoming calls from telephone sets at various places. Accordingly, the current position of the portable telephone set must always be registered each time it has moved from one place to another, so as to make it ready for communication with other telephone sets at all times. The system of the present invention calls for such constant registration of the current position of the portable telephone set but is far more efficient, economical and rational than the prior art systems, as described below in detail.

Roughly speaking, users of portable telephone sets in Japan (or the Japanese people in general) stay at home or at their places of employment almost all day, and accordingly they go out at a correspondingly low frequency. In addition, the time for and the frequency at which they go out markedly decreases in inverse proportion to an increase in the distance to the destination of visit.

For example, an average office worker spends business hours almost at his desk and even if he leaves his seat, he does not go so far away but, at most, calls at a council room, another working room or so in the same building. Even if he carries his portable telephone set with him on such an occasion, he needs only to change the positional information registered in the subscriber information memory of the PBX or first class exchange. This can be done by the signal transmission and reception between the portable telephone set, the key service unit, and the PBX (or first class exchange) only.

Even if a company employee is ordered to go on business, it is usually a half-day's or a day's trip. As viewed in terms of the class of exchange used in the present invention, almost all business trips are within the same city (the service area of the second class example) and the same prefecture (the service area of the third class exchange). There are only slight chances of a business trip to a place outside the prefecture (the service area of the fourth exchange) and a long-distance business trip, for example, from Tokyo to Hokkaido (the service area of the fifth class exchange).

The above is not necessarily limited to office workers alone. For instance, an ordinary housewife also stays at home almost all day long, usually except going out for shopping or making an errand in the neighborhood of her home. That is, the scope of her daily activity is limited to the city or prefecture where she lives. Usually she will seldom go to other prefectures.

Moreover, the frequency at which the whole family goes out for recreation or some other purposes is very low as described later.

From the above it will be understood that the frequency of using the subscriber information memories (the registered position Memories) of high-ranking exchanges, that is, the frequency of the signal transmission for registering the position of the portable telephone set is very low. Accordingly, from the viewpoint of the national traits of the Japanese people it is considered to be most suitable to employ the decentralized registration system for registering the position of the portable telephone set each time it moves from one place to another.

It can be said that the present invention entirely differs in this very point from the prior art which administers subscriber information centralized at only one place.

Now, daily activities of the Japanese people in general, such as mentioned above, will be described in detail by reference to a literature (Investigative Report on the Movement of Travellers in Japan, edited by the Prime Minister's Office, October 1982). That is, the traffic densities at which portable telephone owners are registered in the first to fifth class exchanges will hereinbelow be calculated on the basis of the Report.

a) Kind, experience rate and number of travels

In twelve months from September 1980 to August 1981, 66.0% of the Japanese people experienced an overnight trip or two or more day's trips. (Table 2)

TABLE 2

| Experience rate and average number of travels according to the kind of travel | | |
|---|---|---|
| Kind | Experience rate | Average |
| *Sightseeing tours | 45.9% | 0.821 times |
| Business trips | 7.1 | 0.180 |
| *Business trips combined with sightseeing | 4.2 | 0.060 |
| Trips for family and private reasons | 9.1 | 0.139 |
| Homecoming | 13.8 | 0.235 |
| *Trips for family and private resons and homecoming combined with sightseeing | 9.5 | 0.126 |
| Schooling | 3.6 | 0.044 |
| *Schooling combined with sightseeing | 2.2 | 0.023 |
| Others | 3.4 | 0.044 |
| Unknown purpose | 0.6 | 0.010 |
| Total of all travels | 66.0 | 1.683 |
| *Total of sightseeing and sightseeing combined with others | 53.3 | 1.030 |

TABLE 3

| NTT area Dial number | From | Inter-block movement (Movement rate initiating on departure basis according to places of departure) To | | | | | | | | | | |
|---|---|---|---|---|---|---|---|---|---|---|---|---|
| | | Hokkaido | Tohoku | Kanto | (Tokyo) | Hokuriku. Koshinetsu | Tokai | Kinki | Chugoku | Shikoku | Kyushu | Total |
| 01 | Hokkaido | 85.9 | 5.5 | 2.1 | (0.7) | — | 1.4 | 2.4 | 1.0 | — | 1.7 | 100 |
| 02 | Tohoku | 3.1 | 71.4 | 11.0 | (6.4) | 4.6 | 3.9 | 4.6 | 0.2 | 0.2 | 1.0 | 100 |
| 04 | Kanto | 1.9 | 5.0 | 39.6 | (2.9) | 20.1 | 24.5 | 4.6 | 0.8 | 0.5 | 1.4 | 100 |
| 03 | *(Tokyo) | (1.2) | (4.1) | (40.9) | (4.2) | (24.7) | (22.4) | (4.5) | (1.0) | (0.3) | (0.8) | 100 |
| 07 | Hokuriku. Koshinetsu | 0.6 | 7.2 | 13.8 | (6.4) | 49.8 | 13.8 | 11.7 | 0.2 | 2.3 | 0.6 | 100 |
| 05 | Tokai | 1.0 | 0.9 | 6.2 | (2.5) | 28.9 | 42.9 | 15.9 | 1.8 | 1.2 | 1.3 | 100 |
| 06 | Kinki | 2.0 | 0.6 | 2.6 | (1.3) | 21.0 | 15.0 | 43.6 | 8.6 | 3.0 | 3.6 | 100 |
| 08 | Chugoku | 1.0 | 0.5 | 3.9 | (2.6) | 2.3 | 1.8 | 25.6 | 36.8 | 9.1 | 18.9 | 100 |
| 08 | Shikoku | — | — | 2.6 | — | 2.6 | 5.1 | 33.3 | 10.2 | 38.5 | 7.7 | 100 |
| 09 | Kyushu | 1.2 | 2.0 | 1.6 | (1.0) | 0.8 | 1.0 | 6.7 | 6.9 | 2.4 | 77.6 | 100 |

*Tokyo is a part of Kanto and these figures are picked up from Kanto.

TABLE 2-continued

| Experience rate and average number of travels according to the kind of travel | | |
|---|---|---|
| Kind | Experience rate | Average |
| others | | |

The experience rate of overnight, two or more day's trips is 45.9% for sightseeing, 7.1% for business, 13.8% for homecoming, 9.1% for family and private reasons, etc. Adding up the experience rates of the tour for sightseeing alone and the tour for sightseeing and other purposes, the experience rate is 53.3%.

The number of times of overnight or few day's trips is 1.683 on average; 0.821 times for sightseeing only and this is 48.8% of the total number. The number of times of business trips is 0.180 and the number of times of homecoming journeys is 0.235. The total of the numbers of times of pure sightseeing tours and sightseeing tours combined with some other purposes is 1.030 and accounts for 61.2%.

The annual per capita total number of travelling days is 4.92 days on average.

b) Movement between blocks

Looking at the destinations of visits from places of departure in each block, the rate of intra-block trips is high in every block, as shown in Table 3.

c) Foreign tours

The per capita rate of experience of travelling abroad from September 1980 to August 1981 is 2.0%. The number of days of travelling abroad for each traveller in the above-said period is 8.6 days on average.

d) Day trip for sightseeing and recreation

The results of questionnaires on day trips for sightseeing and recreation, conducted in two months January and February and in two month of July and August 1981, shows that the experience rate per each family is 32.4% in winter and 43.6% in summer; the latter exceeds the former by 10 points. The mean number of day trips for each person is 0.659 in winter and 0.956 in summer.

Classifying day trips for sightseeing and recreation by destination, i.e. inside and outside the administrative divisions (of Japan) where respondents to the questionnaires lived, more than 60% of the respondents went on days trips in the administrative divisions of their own in both winter and summer.

(2-6) Estimation of Traffic for Position Registration and Storage Capacity of the Subscriber Information Memory of Each Exchange a) Fifth class exchange Where a Japanese wants to use his portable telephone set while travelling abroad, he must register the position of the portable telephone set in the memory of this exchange.

Since each Japanese makes a trip 0.03 times per year and the average number of days therefor is 8.6, the rate at which each Japanese registers the position of his portable telephone set in the fifth class exchange in a year is as follows:

$$0.03 \text{ times} \times 8.6 \text{ days} = 0.248 \text{ day-times/person-year}$$

That is, where the traffic is uniform, even if 80% (one hundred million) of all the Japanese (one hundred one twenty million) possess portable telephone sets, the required storage capacity of the fifth class exchange is as follows:

$$0.03 \times \frac{8.6 \text{ days}}{365 \text{ days}} \times 100{,}000{,}000 \text{ persons} = 70{,}000$$

That is, a storage capacity for 70,000 persons will suffice.

Moreover, it is necessary to take into consideration that the position of each portable telephone sets is registered when it moves from one fourth class roam area to another. This corresponds to the case where a portable telephone subscriber who lives in Tokyo, for example, makes a trip to Hokkaido. The number of such position registrations can be obtained from the following equation on the basis of Table 2.

$$\begin{array}{c}\text{total number of trips}\quad\text{number of intra-area trips}\\ 0.66 \times (1.683 - 0.4903) \times 4.92 = 3.873 \text{ day-times/year-person}\end{array}$$

This shows that each portable telephone subscriber annually uses the memory for 3.87 days while travelling to areas outside the areas of his own.

Further, since he travels 1.2 times per year, and since it is considered that he seldom visits a plurality of districts in one travel, he will use the memory for $0.66 \times 4.92 = 3.2$ days. Therefore, the traffic for registration is 1.2 times $\times 2 = 2.4$ times (for registration and erasing).

From the above, the annual traffic and storage capacity of the fifth class exchange necessary for position registrations of each portable telephone set during overseas and out-of-district tours is as follows:

Traffic: $(0.03 + 1.2) \times 2 = 2.46$

Storage capacity: $0.248 \times 3.873 = 4.116$ day-times
That is, each portable telephone set annually accesses the fifth class exchange 2.5 times and uses it 4.12 days $$\left( \frac{4.116}{365} = 0.0112 \text{ year} \right).$$

Therefore, the total storage capacity is for 1130,000 persons $$\left( = 100{,}000{,}000 \text{ persons} \times \frac{4.116}{365} \right).$$

In the above, the traffic which uses the wide area calling fifth class radio base station of the present invention and the storage capacity therefore were neglected because their estimations are difficult and because the actual traffic is considered small.

b) Fourth class exchange

It is necessary to add intra-block movement, such as the Tokyo or Tohoku block in Table 3, and the movement by day trips.

As for the former, the number of accesses by each portable telephone set for each year is:

$$0.4903 \text{ times} \times 0.66 \times 4.92 \text{ days} = 1.592 \text{ day-times}$$

As for the latter, the estimated result of similar calculation will be 1.456 day-times.

In addition, since the fourth class exchange also operates upon each occurrence of registration in the fifth class exchange, this must be taken into account as follows: That is, each portable telephone set accesses the fourth class exchange 6.35 times and uses its memory for 7.16 days for each year.

c) Third class exchange, etc.

It is difficult to estimate the traffic and the storage capacities of the third to first class exchanges because they are greatly affected by the manner in which subscribers use their portable telephone sets. As regards the storage capacities, however, these exchanges will have to be designed taking into account that each portable telephone set will use the third, second and first class exchanges for 20 to 30 days, 50 to 100 days, and 365 days annually. The ground for the above calculations are the results of investigations conducted in 1980 as mentioned in the aforementioned literature. The above estimated values will have to be somewhat corrected in accordance with changes in the lifestyle of the people. Yet, it is believed that there will be no substantial change which disproves the basis of the present invention radically.

In the above, rough estimations were made of the traffic which uses the subscriber information memories and their required storage capacities in the present invention. Next, a rough estimation will be made of the required traffic and storage capacity in the case of employing the afore-mentioned functions and operations and the conventional centralized memory system (in which the subscriber information memory is provided at one place alone).

(1) Traffic

The traffic becomes enormous since position registration information, charging information, etc. must be transmitted to the single memory whenever portable telephone sets each have moved from one place to another, as described previously in i) to iii). In particular, the charging information is transmitted immediately after on-hooking of each portable telephone set (If not, other memories are needed and the effect of the centralized memory system is not produced.), so that the transmission of the charging information takes place in the busy hour during which the communication traffic is congested, and the capacity of the communication circuit must be increased accordingly. In contrast thereto, according to the present invention, the charging information need not be transmitted immediately after the end of communication but needs only to be transmitted to the exchange KTC-I once a day, week, or month, and besides, it is possible to select therefor a time slot of small traffic at night, for example. Accordingly, the decentralized memory system of the present invention is advantageous over the conventional centralized memory system in this regard as well.

(2) Memory capacity

Comparing the decentralized subscriber information memory system of the present invention and the conventional centralized memory system, it is apparent that the storage capacity needed in the former is smaller than in the latter. This will be discussed below quantitatively. In order that the centralized memory system may provide the same service as that of the present invention, it is necessary to place the subscriber information memory in a telephone station corresponding to the first class exchange (for storing charging information, for example); therefore, the point is the difference between the storage capacities of the second to fifth class exchanges in the present invention and the memory capacity of the centralized memory. Since the storage capacities of the fifth and fourth class exchanges are very small, the storage capacities of the second and third class exchanges and the storage capacity of the centralized memory must be compared. The storage capacity required in the decentralized system is larger than the storage capacity ($M_0$) of the centralized system by $$\frac{M_2 + M_3}{M_0},$$

where $M_2$ and $M_3$ are the total storage capacities of the second and third class exchanges distributed all over the country. The actual values of $M_2$ and $M_3$ differ according to the design concept employed, that is, depending upon the margin technique for the busy hour, but the above value is estimated to range from 2 to 3.

In recent year, however, since hardware for use in memories has become more and more lowcost, the larger storage capacity of this invention system is not a serious demerit; rather, the superiority in terms of traffic is important.

(3) PID (Personal Identification Information)

Next, a description will be given of a method of appending PID information to each portable telephone set in the present invention.

Information which is contained in the PID enables the following identification:

(1) Identification of a particular person in distinction of the other persons. (That is, even in the same family its members are never given the same PID information.)

(2) Identification of each of the first to fifth class roam areas. (This is the most striking feature of the PID appending method of the present invention.)

(3) Clear indication of the position of the home area of each portable telephone set, i.e. the address of the portable telephone subscriber (that is, the place where he is). (What is intended to mean by the "clear indication" is not that the PID information enables the user to immediately know the position of the portable telephone set, but that where there is stored in, for example, the subscriber information memory of a first class exchange a contrastive table showing PID information of portable telephone sets whose first class roam areas belong to the service area of this exchange and the names of places where they are, the address of a particular portable telephone subscriber can easily be obtained from his PID information stored in the memory of this first class exchange.) Moreover, when a plurality of home areas are registered, priorities must be assigned to them.

(4) Identification of the regional center, the district center, toll center, and terminal station to which the portable set PID belongs to, and besides, the corresponding ward, town (address). This is required for the reason given above in (2).

(5) Identification of the administrative division, city (ward), ward and town (address) to which the portable telephone set stays. This is required for the reason given above in (3).

(6) Identification of countries (in anticipation of future extension of the system)

(7) Identification of service class (8) Permitting the appending of a code number to the portable telephone set for preventing it from theft and from being used by a third party without leave.

(9) Identification of the following service classes i) Limiting the area in which an outgoing or incoming call is possible ii) Limiting the hour and minute for an outgoing or incoming call iii) Limiting the time slot for an outgoing or incoming call iv) Indicating whether an additional service, such as a conference system, is available v) Indicating where or not a fixed telephone set corresponding to the portable telephones set exists in its home area vi) Connecting a communication circuit for each class in case of abnormal traffic vii) Indicating whether or not the portable telephone system is combined with another mobile communication system viii) Indicating whether a non-telephone (non-voice) service is available ix) Permitting the general calling of a plurality of portable telephone sets appended with the PID information under a specific rule A description will be given first of the number of digits necessary for the PID information, followed by the PID configuration for use in the present invention.

Since Japan has a population of about 120,000,000, it is necessary to identify this number. If what is called a national number system is adopted, then nine digits will suffice as follows:

xx-xxx-xxxx (where x=0, 1, 2, ... 9)

However, since it is necessary to satisfy the requirements mentioned above in (1) to (9), the nine digits will be insufficient. Then, the following number of digits are assigned to each of the following areas.

Fifth class roam area: three digits for country xxx (country ID)

Fourth class roam area: two digits for administrative division xx (administrative division ID)

Third class roam area: Three digits for city ward (in the case of Tokyo) or country xxx (city ID)

Second class roam area: Three digits for ward, town or equivalent place (city of less than 50,000 being partly included) xxx (town ID)

First class roam area: four digits for address, name of housing complex or name of apartment house xxxx (subscriber ID)

That is, a total of 13 digits are required. Furthermore, seven digits are needed for the service class, VIP identification and a code number. Accordingly, a total of 20 digits are necessary, and the number of bits involved is $4 \times 20 = 80$ bits. However, the identification of country will not be required for the time being. In principle the calling party need not dial the service class, the VIP identification, and the code number. FIG. 6 shows the PID appending method described above.

In practice, since it is necessary, for improving the service of the system, to assign each subscriber the PID information of the smallest possible number of digits, the number of digits at the time of introduction of this system will be reduced to substantially the same number as the NTT's national number. However, the following description will be made on the basis of the number of digits shown in FIG. 6, so as to explain the feature of the present invention.

The portable telephone subscriber of the system of the present invention can originate an outgoing call at any place all over the country of Japan and can also receive an incoming call from any place all over the country. The PID appending method of the present invention produces its effect in the case of an incoming call. Now, let it be assumed, for example, that Mr. A whose home area is Hoya-shi, Tokyo is travelling all over the country, and that Mr. B, a friend of Mr. A, who lives in Kumamoto in Kyushu, wishes to call Mr. A, using an ordinary telephone set. The flow of signals of the incoming call will be described in connection with the cases where Mr. A is in the first to fifth class roam areas, respectively.

[1] In the case of the first class roam area:

Mr. B dials the PID signal (from which the code number and the service class are omitted in FIG. 6) of Mr. A. In this case, it is necessary to dial all pieces of Mr. A's PID information, that is, the administrative division ID, the city ID, town ID, and the subscriber ID. If Mr. B's telephone set is under control of the same n-th class exchange as Mr. A's portable telephone set, Mr. B needs only to dial the following identification information:

n=1: subscriber ID n=2: town ID+subscriber ID n=3: city ID+subscriber ID n=4: administrative division ID+city ID+town ID+subscriber ID Even if the town ID or city ID is dialled despite of n=1, the exchange judges and hence does not connect the call errouneously or make it impossible of connection; accordingly, the desired incoming call operation can be performed. After receiving the call signal from Mr. B, the first class exchange which administers his telephone set starts a routing operation for establishing a channel between Messrs. A and B. At first the exchange starts to send out a control signal for retrieving the positional information of Mr. A. After recognizing from Mr. A's PID information that Mr. A's portable telephone set is administered by the exchange KTC-I in Hoya-shi, Tokyo, Mr. B sends out an outgoing call (control) signal to higher-randing exchanges sequentially which administer Mr. A's telephone set; finally the call signal reaches the subscriber information memory of the fifth class exchange.

Then, the subscriber information memory is retrieved, but since the position of Mr. A's portable telephone set has not been registered in its fifth class roam area, an incoming call (control) signal is transferred to the fourth class exchange (KTC-IV-1) which administers Mr. A's portable telephone set. The subscriber information memory of the fourth class exchange is also retrieved, but since it has not registered the position of Mr. A's portable telephone set in the fourth class area either, the incoming call signal is further transferred to the third class exchange, for retrieving its subscriber information memory. Now, let it be assumed that since it has been found that the position of Mr. A's portable telephone set in the roam area was not registered in the exchanges from the fifth to first class one (KTC-I-1), the incoming call signal is transferred to the first class exchange (KTC-I-1) as is the case with an incoming call to an ordinary telephone set, and it has now found, as a result of the memory of the first class exchange, that Mr. A's portable telephone set is not in the home area but has its position registered in a roam area key service unit $SID_2$.

This positional information is sent back to the calling-side exchange KTC-I in a direction exactly reverse from the direction of flow of the signal described above, that is, via a route [KTC-I-1 - KTC-II-1 - KTC-III-1. In the case of sending back Mr. A's positional information, however, the exchanges KTC-I-1, KTC-II-1, ... KTC-IV, KTC-V, KTC-VI, ... KTC-II each append the positional information with initial path entry in the case of setting a path from the exchange to the calling telephone set and the called subscriber portable telephone set. Since this information is very effective and contains the communication traffic state which each exchange seizes at that point of time, the calling-side exchange can perform optimum routing at that point of time through utilization of these information. Incidentally, the following routing technique is the same as in a known fixed network.

That is, a channel is set from the exchange which administers Mr. B's telephone set to the exchange KTC-I-1 which administers Mr. A's portable telephone set. Namely, it is shown that channels have been established from the exchange KTC-I to KTC-II and from the exchange KTC-II to KTC-I-1. The exchange KTC-I sends out a ring-back tone to the calling telephone set, and the exchange KTC-I-1 sends out an audible ringing signal to the called portable telephone set via the portable telephone set key service unit $SID_2$. Thus, the key service unit $SID_2$ retrieves the PID memory of its own and recognizes that the position of Mr. A's portable telephone set has been registered, and accordingly, sends out the incoming call signal to the portable telephone set $PID_1$. Then, when Mr. A hangs off his portable telephone, his communication with Mr. B starts.

The above-described routing method according to the present invention aims at the most effective use of the network from the viewpoint of the whole telephone network as well. Accordingly, it is possible to offer high-quality services to users and to economically design the network. In the prior art, the routing for setting a communication network is performed by the calling-side exchange 3 alone, whereas in the present invention the routing can be performed by all exchanges which are concerned in the retrieval or transmission of the registered positional information. This greatly influences the efficient use of the network. The information thus retrieved is added to a signal (14) which is applied to the exchange KTC-V. Such routing and retrieval are carried out by each exchange and the results are added to a signal which is applied to the next exchange. Finally, all the information thus obtained is provided to the calling exchange KTC-1.

Upon completion of the communication between Messrs. A and B, the channel established therefor is opened using the same technique as in the fixed telephone network.

[2] In the case of the second class roam area

In this case, the operations from the transmission of the dial signal by Mr. B to the reception of the incoming call signal by the second class exchange (KTC-II-1) which administers Mr. A's portable telephone set are the same as in the case [1].

Having received the incoming call signal to Mr. A, the second class exchange KTC-II-1 retrieves its memory and, as a result, finds that Mr. A has registered his position and stays in the service area of the exchange KTC-I-2, not in the service area of the exchange KTC-I-1 which administers the home area of Mr. A's portable telephone set. Then, the exchange KTC-II-1 transmits the incoming call signal to the exchange KTC-I-2. The exchange KTC-I-2 retrieves its memory and when it recognizes that the portable telephone set $PID_1$ has been registered in the portable telephone key service unit $SID_3$ placed under administration of the exchange KTC-I-2, it sends out the incoming call signal to the key service unit $SID_3$. The subsequent operations are the same as in the case [1].

[3] In the case of the third class roam area

In this case, the operations from the transmission of the dial signal by Mr. B to the reception of the incoming call signal by the third class exchange (KTC-III-1) which administers Mr. A's portable telephone set are the same as in the case [1].

Upon transmission thereto of the incoming call signal to Mr. A, the third class exchange KTC-III-1 retrieves its memory and, as a result, finds that Mr. A has registered his position and stays in the service area of the exchange KTC-II-2, not in the service area of the exchange KTC-II-1 which administers the home area of Mr. A's portable telephone set. Then, the exchange KTC-III-1 transmits the incoming call signal to the exchange KTC-II-2. The exchange KTC-II-2 retrieves its memory and when it recognizes that the portable telephone set $PID_2$ has been registered in the exchange KTC-I-2 placed under administration of the exchange KTC-II-2, it sends out the incoming call signal to the exchange KTC-I-2.

Upon receiving the incoming call signal, the exchange KTC-I-2 retrieves its memory and when it recognizes that Mr. A's position has been registered in the portable telephone key service unit $SID_3$, it sends out the incoming call signal to the key service unit $SID_3$. The subsequent operations are the same as in the case [1].

[4] In the case of the fourth class roam area

In this case, the operations from the transmission of the dial signal by Mr. B to the reception of the incoming call signal by the fourth class exchange (KTC-IV-1) which administers Mr. A's portable telephone set are the same as those in the case [1].

Upon transmission thereto of the incoming call signal to Mr. A, the fourth class exchange KTC-IV-1 retrieves its memory and, as a result, finds that Mr. A has registered his position and stays in the service area of the exchange KTC-III-2, not in the service area of the exchange KTC-III-1 which administers the home area of Mr. A's portable telephone set. Then, the exchange KTC-IV-1 transmits the incoming call signal to the exchange KTC-III-2. The exchange KTC-III-2 retrieves its memory and when it finds that the position of the portable telephone set $PID_1$ has been registered in the exchange KTC-II-3 placed under administration of the exchange KTC-III-2, it sends out the incoming call signal to the exchange KTC-II-3. The subsequent operations are identical with those in the case where the same operations as in the case [3] are each carried out by the immediately higher-randing exchange.

[5] In the case of the fifth class roam area

In this case, the operations from the transmission of the dial signal by Mr. B to the reception of the incoming call signal by the fifth class exchange KTC-V which administers Mr. A's portable telephone set are the same as those in the case [1].

Upon transmission thereto of the incoming call signal to Mr. A, the fifth class exchange KTC-V retrieves its memory and, as a result, finds that Mr. A has registered his position and stays in the service area of the exchange KTC-VI-2, not in the service area of the exchange KTC-IV-1 which administers the home area of Mr. A's portable telephone set. Then the exchange KTC-V transmits the incoming call signal to the exchange KTC-IV-2. The exchange KTC-IV-2 retrieves its memory and when it finds that the portable telephone set $PID_1$ has been registered in the exchange KTC-III-3 placed under administration of the exchange KTC-V, it sends out the incoming call signal to the exchange KTC-III-3. The subsequent operations are identical with those in the case where the same operations as in the case [4] are each carried out by the immediately higher-randing exchange.

Next, a description will be made in connection with the case where Mr. A's positional information is not obtained unregistered state) although Mr. B's call request signal has been handled in any of the above-described cases [1] to [5].

Technically, it is considered that this state corresponds to one of the following cases:

a) Although Mr. A registered the position of his portable telephone set in the roam area where he stayed, the registration was cancelled according to regulations because he did not use the portable telephone set for a certain period of time after the registration. At present the portable telephone set is not in the ON state or stays in a dead area of the cordless telephone mode.

b) The portable telephone set is overlapped by the land mobile radio telephone mode or some other mobile communication and the positional information was cancelled for some reason.

c) Mr. A carries the portable telephone set with him without registering its position in the home area (power ON) and, at present, the portable telephone set is not ON or stays in a dead area of the cordless telephone mode.

(In the above cases a) to c), Mr. A's positional information is not available. In the following cases, calling takes place at the registered position, but since no answer is obtained, the portable telephone is virtually in the unregistered state.)

d) Mr. A left the service area of the portable telephone key service unit in which the position of the portable telephone set was registered in the portable telephone system of the residential district mode and entered another area of the residential district mode, but no outgoing and incoming operations were carried out for a certain period of time thereafter.

e) Although Mr. A stays at the position registered in the portable telephone system of the residential district mode or business district mode, the portable telephone is in the OFF state or cannot receive and incoming call because radio wave propagation is locally poor.

Solutions to the above problem will be described below.

One solution is automatic calling of the fixed telephone set in Mr. A's home area. In this case, even if Mr. A is absent, it is possible to partly satisfy the caller's requirement by use of an automatic answering telephone set or through communication with a member of Mr. A's family.

A second method is to send out a call signal from the wide area portable telephone set calling i-th class radio base station via the i-th class exchange.

In the respective cases a) to e), the portable telephone set is in the OFF state or the portable telephone set is in the ON state and has its position already registered but no outgoing and incoming operations have not been carried out even after a certain elapsed time. The portable telephone set has a function of starting an interchannel sweep for acquiring a down control signal (a control signal which is transmitted from the portable telephone key service unit or the wide area portable telephone set calling i-th radio base station) in these cases. Accordingly, it can be said that the portable telephone set is in the wide area calling mode.

Where an incoming call has occurred to the portable telephone set in such an unregistered state, its position must be registered before everything else. The method therefor has already been disclosed in our prior Japanese Patent Application No. 254659/86 "Wide Area Portable Telephone Set Calling System", but routing after the position registration which is related directly to the present invention will be described below.

Since the called portable telephone set A has been found unregistered as a result of searching for its position registration in the exchange KTC-I-1, a call signal is sent out from the wide area portable telephone set calling first class radio base station via the exchange KTC-I-1.

This method is effective, for example, when Mr. A's sphere of movement, because the first and fourth class radio base stations can be utilized. Let it be assumed, however, that the portable telephone set A is incapable of being called for some reason. This decision is made where the called portable telephone set does not answer a certain period of time after the transmission of the call signal. In this instance, the control signal for routing flows to a higher stage, finally, enters the exchange KTC-V. The exchange KTC-V determines to call from the wide area portable telephone set calling fifth class radio base station and transmits thereto a signal. The base station responds to the signal to call the portable telephone set A, using calling radio waves. Assume that Mr. A happens to be on the outskirts of Sapporo, Hokkaido and in an unreceivable area more than 100 m away from any of portable telephone key service units installed in some places on the streets, but that the portable telephone set is in the ON state fortunately and receives the radio waves. At this time, the portable telephone set generates an audible ringing signal, notifying Mr. A of the incoming call. This audible ringing signal is different in tone from that in the cordless telephone mode, so that Mr. A can immediately understand the situation. In this case, a red lamp is lighted in the display of the portable telephone, indicating that no outgoing call can be made. Then, as Mr. A approaches the nearest portable telephone key service unit, a blue lamp is lighted instead of the red one. Then, he stands by for a while, with the call button pressed for sending out an answer signal. When receiving the answer signal, the nearest portable telephone key service unit checks the signal content, stores it in its memory and, at the same time, transmits a $PID_1$ signal plus the answer signal to the exchange KTC-I-2.

The exchange KTC-I-2 checks the content of the $PID_1$ signal and transmits to the higher-randing exchange the $PID_1$ signal appended with a signal indicating that the $PID_1$ signal is an answer signal to the wide area calling ((22) to (25)). The fifth class exchange, when receiving the signal, confirms that it is the answer signal from the portable telephone set $PID_1$, and transmits Mr. A's positional information to the first class exchange KTC-I to which the calling telephone set belongs. It is a matter of course, in this instance, that as in the aforementioned case, the exchanges KTC-I-2, KTC-II-2, ... KTC-IV-2, KTC-V, KTC-IV, ... KTC-II, involved in the transfer of Mr. A's positional information each performs routing therefrom and transmits the routing information as well.

The exchange ITC-I, which has received the routing information and Mr. A's positional information, begins setting up a channel between the calling party Mr. B and the called party Mr. A. Now, let it be assumed, in this case, that such a channel as shown in FIG. 10C is established in view of the communication traffic at that time. That is, channels between the exchanges are KTC-I→KTC-II→KTC-III→KTC-II-2→KTC-I. The exchange KTC-I sends a ring-back tone to the calling telephone set B and audible ringing signals and to the called portable telephone set A, and upon off-hooking of the telephone set B, communication starts. Upon completion of the communication, the channel is opened as in the case of the known fixed telephone network.

In addition to the above-described wide area portable telephone set calling function, the present invention has a function of sending out the communication signal itself to the portable telephone set, using radio waves from the wide area portable telephone set calling i-th class radio base station. This function provide the following advantages in such cases as:

i) The service area is in a city or like place and the portable telephone set cannot sufficiently receive signals from the key service unit because of poor radio wave propagation characteristic. But the key service unit can sufficiently receive signals from the portable telephone set because their frequency differs from that of the signals transmitted from the key service unit or by virtue of the use of transmission diversity techniques.

This includes the case where the transmitter of the portable telephone key service unit is incapable of transmission because of trouble.

ii) Where the service area is in an agricultural area far away from a city and communication traffic is very small, the portable key service unit is not equipped with a transmitter, for some economical reason or from the viewpoint of maintenance, and is installed exclusively for reception use.

In this case, one or more wide area portable telephone set calling first class radio base station are installed for each town or village and are connected to the first class exchange. The first class exchange performs wide area calling of the portable telephone set concerned and transmits communication information thereto, following instructions from the higher-randing i-th class exchange. This will hereinbelow be described in detail.

Also in this case, let it be assumed that Mr. A whose home area was Hoya-shi, Tokyo was making a tour of the whole country and that his friend Mr. B, who lived in Kumamoto, Kyushu, wishes to call Mr. A, using an ordinary telephone set. The flows of the call request signal from Mr. B is are exactly the same as described for the cases [1] to [5] previously. Assume that a call signal for calling Mr. A's portable telephone set was sent out from the wide area portable telephone set calling third class radio base station having an interface with the third class exchange KTC-III-1 (14), and that the call signal was received by the portable telephone set A which was in the area of this wide area calling service and was held in the ON state.

Since the portable telephone sets generated an audible ringing signal of a tone peculiar to the wide area calling, Mr. A understood that he was being called by the wide area calling, and found the red lamp ON, indicating that no outgoing call could be made, but Mr. A who happened to be on the outskirts of a mountain village in Saitama Prefecture positioned at the outskirt of Tokyo tentatively pressed the call button because he thought that the communication traffic there would be very small and a portable telephone key service unit there might not be equipped with a transmitter. The portable telephone set A sent out a call request signal (an answer signal in this case) and the PID signal contained in the call request signal was received by the nearest portable telephone key service unit $SID_{20}$ with no transmitter. The key service unit $SID_{20}$ checked and stored the received signal in its memory and, at the same time, transmitted the answer signal of the portable telephone set A to the first class exchange KTC-I-2 which administered the key service unit $SID_{20}$. Since this signal contained the $PID_1$ information of the portable telephone set A, and $SID_{20}$ signal, and signals indicating that the received signal was an answer to wide area calling and that a communication signal would have to be sent out from a wide area radio master station because the key service unit $SID_{20}$ had no transmitter, the exchange KTC-I-2 stored these signals in its memory and transmitted them and its ID information (KTC-I-2) to the second class exchange which administered the first class exchange. The second class exchange processed the received signal in the same manner as did the first class exchange and transmitted the received signal and its ID information (KTC-II-2) to the third class exchange (KTC-III-1). As a result of retrieving its subscriber information memory, the third class exchange recognized that the ID information of the portable telephone set A contained in the received signal was the ID information of the portable telephone set which had been called from the wide area calling third class radio base station which has an interface with the third class exchange. Then the third class exchange determined to set a channel and flowed routing control signals to exchanges on the side of the calling party in the order of KTC-IV-1→KTC-V→KTC-IV→KTC-III→KTC-II→KTC-I. The exchange KTC-I applied a ring-back tone to the calling telephone set. On the other hand, the exchange KTC-I set a channel KTC-I→KTC-II→KTC-III-1 on the basis of the routing information therefor. Then, on the basis of the routing information, the exchange KTC-III-1 decided it would be proper to transmit the incoming call signal, a voice signal, etc. to the called portable telephone from a wide area portable telephone set calling third class radio master station KRC-III-1 which had an interface with the exchange KTC-III-1. In this case, it would also be possible to transmit the signals from all radio base stations KRC-III-1, but a channel set request signal to the exchange KTC-II-2 from the viewpoint of efficient utilization of frequency. The exchange KTC-II-2 similarly selected from many wide area portable telephone set calling first class radio base stations KRC-I in its the service area a radio base station KRC-I-2 which had an interface with the first class exchange KTC-I-2, and the exchange KTC-II-2 requested the selected radio base station KRC-I-2 to send out the incoming call signal. However, where only an i-th radio base station existed and (i-1)th (i-2)th, . . . first class radio base stations were not provided, the communication signal and other signals would naturally be send out from the i-th radio base station.

The radio base station KRC-I-2 transmitted, by its transmitter, the incoming call signal to the portable telephone set A. The incoming call signal was confirmed by Mr. A and, by hanging off his portable telephone set, his voice was sent out therefrom to the portable telephone key service unit $SID_{20}$.

When the calling telephone set B is also hung off, communication is enabled between Mr. A and Mr. B. When the telephone set is hung on upon completion of the communication, the above-noted channel B - KTC-1 - KTC-II - KTC-III-1 - KTC-II-2 - KTC-I-2 - $SID_{20}$ - A is opened naturally.

In the above, it was assumed that the exchange KTC-II-2 is subordinate to the exchange KTC-III-1, but if the portable telephone set is in Hokkaido as described previously in connection with FIG. 10C, the former is not subordinate to the latter. In such a case, the exchange KTC-II-2 traces back to the higher-randing exchanges in the order of KTC-III-2 - KTC-IV-2 - KTC-V until the portable telephone set A answers. As a result of this, the wide area calling and the transmission of the communication signal are performed by the radio base station KRC-V or the like on the basis of the stored information of the called portable telephone set.

Furthermore, the above-described answer signal from the called portable telephone set need not always be stored in the memories of the key service unit $SID_{20}$ and the exchanges KTC-I-2, KTC-II-2, etc. as far as this incoming call is concerned. The answer signal is stored only because it will facilitate outgoing or incoming call processing in the first class exchange and others when Mr. A will have called another subscriber or will have been called by a subscriber other than Mr. B.

Next, a description will be given of other advantages of the PID assignment to the portable telephone system of the present invention.

(1) Group calling

When administrative authorities want to send administrative information to residents of the same prefecture, city, town, or village, they need only to perform general calling for the ID information, shown in FIG. 6, which covers required residents.

(2) Guide service

Since the PID information corresponds to a place name as described later, the desired name can be roughly judged simply by checking the PID information.

(3) To use a postal code number as a substitute for the administrative division ID, city ID, or like ID The PID information in the portable telephone system of the present invention is classified into the administrative ID, city ID, town ID, and subscriber ID. Accordingly, even if the calling party knows the postal code number of the subscriber desired to be called (602, for example), his town ID (123, for example) and his subscriber ID (1234, for example) alone, an outgoing call request can be made. In this instance, the first class exchange which has received the call request search its postal code number versus district ID constrastive table for the telephone number of the called party and dials, for example, #0-602-123-1234 from the portable telephone set of the first class exchange, thereby enabling communication with the called party. That is, the exchange decides, from its constrastive table, that the postal code number 602 represents Kamigyo-ku, Kyotoshi, Kyoto-fu, and converts it to the ID of Kyoto-fu (555, for example) and the city ID (45, for example).

According to the portable telephone system of the present invention, any subscriber need not always remember the other party whom he desires to call. If the calling party knows the address and name of the other party alone, the exchange KTC-I informs the calling party of the other part's correct number as a result of reasoning by AT (Artificial Intelligence) of a number directory of the exchange. For instance, when the calling subscriber verbally dials "KYOTOSHI KAMIGYOKU SHMOTACHIURI OOMIYA AGARUTANAKACHO 202 BANCHI NOSEHAJIME", he will get an answer "HIS NUMBER IS xxx-xx-xxx-xxxx. DO YOU WANT TO COMMUNICATE?". If the calling party desires to communicate, he needs only to dial #1 and if not, then dial *2. Thus, the calling party can attain his object. The reason for this is that reasoning by the artificial intelligence since the PID information is separated into the administrative division ID, city ID, town ID, and subscriber ID.

(4) [Ground on which even if the transmitting power of the portable telephone set is very low in a city district, communication is enabled all over the district, and an Embodiment]

As regards the prospects for future mobile communications

In Japan, a literature [Long-Term Prospects for Utilization of Radio Frequency Spectrum (edited by Radio Technical Council, published by Radio Promotion Association (a foundation), July 1984] states as follows: The importance of mobile communications will further increase and it is expected that there will be a growing demand for its quantitative enlargement and qualitative improvement. Since no mobile communication service can be existent without efficient utilization of radio frequency spectrum, it will be necessary to strive as hard as possible for reserving required radio frequency spectrum to meet the demand for mobile communications.

Accordingly, it is necessary to take measures for enhancing the capability of accomodating mobile communication subscribers, such as integration of various systems, development of technologies for efficient utilization of radio frequency spectrum, development of new frequencies for mobile communications.

There are cases where the following communications are carried out:
(1) Communication with essentially mobile members (man, train, ship, airplane, etc)
(2) Cordless communication utilizing radio frequency spectrum for more convenience The following is a rough estimate of demand which will be in 2000 or so for each of principal service for which many needs can be anticipated and which will call for a relatively wide frequency band.

(1) Land mobile radio telephone
  4,500,000 (10% of all vehicles)
  Tokyo metropolitan area: 1,150,000
  (25% of all lend mobile radio telephones)
(2) Portable telephone
  1,200,000 (1% of population)
  KANTO populated area including Tokyo: 300,000
  (25% of all portable telephone sets)
(3) Train public telephone: 1,000
(4) Maritime mobile radio telephone:
  50,000 (ships of 5 and more tons)
(5) Maritime satellite communication: 100,000
(6) Aircraft radio telephone: 1,000
(7) Cordless telephone:
  7,000,000 (10% of all telephone sets)
  KANTO populated area including Tokyo: 1,750,000
  (25% of all telephone sets)
(8) Pocket pager:
  6,000,000 (5% of population)
  KANTO populated area including Tokyo: 1,500,000
  (25% of all pocket pagers)
Police, protection against disasters, fire fighting etc. 600,000
Two-way radio for protection against disasters
  4,800,000 (4% of population)
  KANTO populated area including Tokyo: 1,200,000
  (25% of all two-way radio sets)
Personal radio (non-common carriers):
  6,000,000 (5% of population)
  KANTO populated area including Tokyo: 1,200,000
  (25% of all personal radio sets)
Fishery radio: 400,000

As set forth above, it is expected that mobile communications in Japan, especially, land mobile radio telephone will attain a great development.

The present invention concerns the portable telephone in the above-mentioned mobile communications. The portable telephone herein mentioned includes all of the mobile communications (1) to (7). FIGS. 5B and 5C show national portable telephone network structures according to the present invention.

(5) Constitution of Portable Telephone System in 23 Wards of Tokyo as Embodiment of the Invention The present invention will be described in detail as being applied to a portable telephone system in a city. FIG. 5B shows the system configuration of the portable telephone system of the present invention carried into practice in 23 wards of Tokyo. A description will be given first of the constitution and operation of this invention system in the year of 2000 when it will come into full use, followed by those of the system at an earlier stage of its partial introduction. The former is an ultimate form of this invention system, so to speak. At the earlier stage of its partial introduction the system of the present invention is put to use in combination with existing various mobile communication systems such cordless telephone, land mobile radio telephone and pocket pager systems. Under such circumstances the portable telephone system of the present invention must therefore be designed for use in common to them. Accordingly, the system configuration at the early stage of introduction will naturally somewhat differ from the ultimate one in terms of software as well as hardware, but the both system configurations are equally advantageous.

(6) Constitution of National Portable Telephone Network of the Present Invention Assuming that the construction of the portable telephone system of the present invention will substantially completed in the year of 2000 or so, the final system configuration will be such as shown in FIGS. 5A and 5B. Suppose that the first class exchange KTC-I-1 in FIG. 5A accomodates a portable telephone set ($PID_1$). The exchange KTC-I-1 accommodates many other portable telephone sets, portable telephone key service units ($SID_1$, $SID_2$, $SID_3$), and fixed telephone sets, together with ordinary telephone sets as well, though not shown. (Circles are each a service area of one key service unit.) A portable telephone key service unit $SID_4$ has the same electric characteristics as those of key service units installed in houses but is disposed on an outdoor post and connected via a transmission line to the exchange KTC-I-1. Such key service units are provided at many places on the streets and in other public spaces so that portable telephone sets can be used at any desired places. Reference numeral 5 in FIG. 5A indicates a large building. Broken-lined circles are each the service area of one of many portable telephone key service units installed in the building so that portable telephone sets can be used at any desired places in the building. These portable telephone sets and key service units are accommodated in the exchange KTC-I-1 or KTC-I-2. Reference character MEM attached thereto indicates their subscriber information memories. The first class exchanges (local offices) KTC-I-2 are KTC-I-2 or unshown ones are each connected to a higher-randing second class exchange (KTC-II-1) as shown. The second class exchange (KTC-II-1), is connected to a higher-randing fourth class exchange (KTC-III-1), which is, in turn, connected to a higher-randing fourth class exchange (KTC-IV-1), which is similarly connected to the highest-randing fifth exchange (KTC-V) as shown. Furthermore, a satellite can also be employed exclusively for calling portable telephone sets. Thus the portable telephone network spreads all over the country. Reference character MEM denotes a subscriber information memory of each exchange.

In order to allow the portable telephone set of the present invention to originate an outgoing call and receive an incoming call at any place, for example, in the 23 wards of Tokyo, about one million key service units will be required; and this is fully realizable as described later. Accordingly, it can be said that in the year of 2000 or so every portable telephone subscriber will be able to originate an outgoing call to and receive an incoming call from any place not only in cities but also in agricultural and mountain villages all day and all night.

The above is the cases where the portable telephone subscriber uses his portable telephone set in building or while walking down the street. The following will describe outgoing and incoming call operations on a car, ship, train, or airplane and a network configuration and system which are applied to outgoing and incoming call operations in a place where radio waves do not propagate well, such as an underground passage or parking lot.

Turning now to FIG. 5B, the parts corresponding to those in FIG. 5A are identified by the same reference characters and will not be described, but parts different from those in FIG. 5A will be described.

Assume that the portable telephone subscriber has now got into a car, with his portable telephone set held in the ON state. In this case, it is necessary, even in the year of 2000, to put the portable telephone set in a land mobile radio telephone mode described later for outgoing and incoming call operations; however, the following description will be made in respect of the case where the portable telephone set is left unswitched to the land mobile radio telephone mode by mistake or on purpose. In such an instance, the portable telephone key service unit in the business district mode is always transmitting the control signal. (There is no such a fear in the portable telephone system in the residential district mode.) Accordingly, the down control channel being emitted transmitted from the nearest portable telephone key service unit on a street lamp post can be well received by the portable telephone set even in the car. Yet, as the car starts running, the portable telephone set quickly goes away from the key service unit on the street lamp post and finally becomes incapable of receiving the down control channel therefrom. At this time, however, the car approaches another portable telephone key service unit and its down control channel out to present a received radio wave field strength large enough to be received by the portable telephone set in the car. Therefore, the portable telephone set tries to store, in its roam area communication information memory, SID information, the number of an idle channel, etc. contained in the down control channel from the key service unit but before this process is completed the car runs out of the service area of the key service unit and approaches another portable telephone key service unit. Therefore, the portable telephone set becomes in capable of communicating with the key service unit with which it has already got in contact. In concrete terms, if the car goes at 36 Km per hour, it runs 10 m per second. Provided portable telephone key service units are installed at intervals of 25 m, the portable telephone set in the car has to acquire the down control channel of a new key service unit every 2.5 second.

In such a case, even if a communication channel can be established between a certain key service unit and the portable telephone set, the channel must be switched every 2.5 second. This is undesirable because ineffective operations of the system increase and various noises also increase which impair the speech quality of the communication channel. To avoid this, in the portable telephone set of the present invention the noise level detector shown in FIG. 5A notifies the controller of the occurrence of fluctuation of a radio wave field strength (a noise level fluctuation) excessive of a fixed value. Then the controller controls the oscillation frequency of the receiving frequency synthesizer to acquire the down control channel emitted from the wide area portable telephone set calling fourth class radio master station (KRC-IV) in FIG. 5B, instead of acquiring the down control channel from the portable telephone key service unit. Further, the portable telephone set requests the key service unit to demand an exchange KTC-I to call the portable telephone set in the wide area calling mode (the fourth class). The exchange KTC-I judges that the portable telephone set is being carried on a running car and requests a land mobile radio telephone exchange MTC (see FIG. 5B), which administers the same area as the exchange KTC-I, to call the portable telephone set $PID_1$ from the fourth class radio master slation KRC-IV, using its down control channel. In practice, the request signal therefor is transmitted via a route [KTC-I→KTC-II→KTC-III→KTC-IV→MTC].

The fourth class radio master station KRC-IV has a transmitting power large enough to cover a service area with a radius of 3 to 5 Km as in the case of the pocket pager service of the NTT. Accordingly, the portable telephone set can receive the down control channel of the fourth class radio master station without an abrupt fluctuation in the input electric field.

If an incoming call occurs in this state, the portable telephone set $PID_1$ is called from the fourth class radio master station KRC-IV, so that the call bell shown in FIG. 4A can be rang. The portable telephone subscriber can answer by using a part of the function of the land mobile radio telephone, as described later.

The above description has been made in respect of an ordinary automobile with a very small capacity. In the case of a bus with a large capacity, if many passengers carry portable telephone sets with them individually, they cannot receive incoming calls in the land mobile radio telephone mode, but they can be called by the operation in the above-described calling mode.

Similarly, in the case of a ship, train, or airplane with many passengers aboard, the portable telephone set is held in the maritime radio telephone mode and also in this case it can receive an incoming call, using the down control channel of the wide area portable telephone calling fourth class radio master station KRC-IV. It is needless to say that an outgoing call can be made from such a vehicle through utilization of such an overlap technique as described later.

The above description has been given of the portable telephone system of the business district mode, and the portable telephone system of the residential district mode is free from such a trouble as referred to above because the portable telephone key service unit does not send out the downward control channel at all times. That is the portable telephone set is receiving in the cordless telephone mode and in the wide area calling mode (the fourth class), while switching therebetween, so that if an incoming call occurs in the wide area calling mode, the portable telephone is called.

In a situation where it is difficult to receive radio waves from the portable telephone key service unit in an underground parking lot or like place, the portable telephone set responds to a signal from the noise level detector (FIG. 4A) to receive radio waves from a wide area portable telephone set calling first class radio base station, and hence is capable of receiving an incoming call as is the case with the above. This will also described in detail later.

Next, a description will be given of a PBX or radio channel control equipment which is provided in the premises of a company or in a large building and is capable of performing the same operation as that of the first class exchange.

The portable telephone system of the present invention enables every portable telephone subscriber to originate an outgoing call to and receiving and incoming call from any other telephone subscriber and to keep communication with him while walking around. This mechanism will also be explained. FIG. 5D shows, by way of example, the arrangement of the portable telephone system of the present invention when employed in the premises of a company. In FIG. 5D, even if the portable telephone set 1 ($PID_1$) is carried along paths near portable telephone key service units 1A, 1B and 1C disposed apart in the previses, the portable telephone set 1 is capable of keeping communication, as described below.

In this instance, radio channel control equipment RC is provided, which is connected via a transmission line to each portable telephone key service unit and is further connected to a PBX (an exchange), corresponding to each channel, as shown. The PBX accommodates an ordinary fixed telephone set as well. In addition, the PBX and the first class exchange are interconnected via a subscriber line.

Now, assume that the portable telephone set originates an outgoing call to an ordinary telephone set ($T_1$) placed under control of the first class exchange. The operation for the outgoing call will be described later. Then assume that the portable telephone set is in contact with the telephone set ($T_1$) and is carried away from the vicinity of the key service unit 1A toward the key service unit 1B as shown. In this case, when the portable telephone set $PID_1$ goes away more than 25 m from the key service unit 1A, the speech quality become deteriorated. This is monitored by an S/N monitor in the radio channel control equipment RC (see FIG. 5E). When the S/N (the signal-to-noise ratio) drops below a fixed value, the S/N monitor requests a communication channel controller to switch the channel 1A-$PID_1$ to a channel 1B-$PID_1$. FIG. 5E illustrates the constitution of the radio channel control equipment RC. In response to the request the communication channel controller (CPU) retrieves its PID, SID memory, confirms the state of communication between the portable telephone set 1 ($PID_1$) and the key service unit 1A ($SID_1$), confirms that the key service unit 1B is not in contact with other portable telephone set, and then switches the key service unit 1A to 1B. This is done by opening a switch $SW_3$ (A black triangle shown in FIG. 5E means the connection between the key service unit (A and the telephone set $T_1$.) of a channel switching unit and closing a switch $SW_2$ (A white triangle in FIG. 5E is changed to a black one.) under control of the communication channel controller (CPU).

Upon completion of the above operation, the user of the portable telephone set 1 can keep on communication with the telephone set $T_1$ while walking.

Also in the case where the portable telephone 1 ($PID_1$) moves away from the key service unit 1B and approaches the key service unit 1C, the communication can be maintained by switching the channel $PID_1$-1B to a channel $PID_1$-1C.

In the above the radio channel control equipment RC possesses the channel switching function. This is a system configuration which is suitable for use in the case where a company or the like is large-scale and has its premises at various places. But when the premises are at one place or reratively narrow, it is economically advantageous to incorporate the radio channel control equipment RC in the PBX.

Since portable telephones used in ordinary residences are not accommodated in such a PBX or radio channel control equipment RC, they are accommodated directly in the first class exchange. In this case, the first class exchange is equipped with the above-noted function of the radio channel control equipment, therefore, portable telephone subscribers can continue communication while walking, by virtue of the same channel switching function as described above.

Next, another embodiment of the portable telephone system of the present invention will be described in which it has an interface with the existing national telephone network, for example, the NTT telephone network. FIG. 5F shows this embodiment. As shown in FIG. 5F, the portable telephone network of the present invention and the NTT telephone network have an interface therebetween at a high-randing switching stage, but they are entirely separate at second and lower class exchanges. This is characteristic of this embodiment and makes the system more independent than the system of FIG. 5C which uses exchanges of respective stages at nodes of the NTT telephone network. In this case, it is possible, of course, to accommodate ordinary telephone sets, pocket pagers as well as portable telephone sets in the first class exchange KTC-I and the land mobile radio telephone system in the exchange KTC-III or KTC-IV. The system configuration exemplified in FIG. 5F is suitable for use in the case where a business entity different from NTT operates the portable telephone network.

While in FIG. 5F three transmission lines are shown for linkage with the NTT national telephone network, they may also be reduced to one or two.

Although in the above-described system configurations FIGS. 5A, 5B, 5C and 5D the number of classes of exchanges have been described to be five, this does not necessarily mean that the use of such five classes of exchanges is optimum. This is the conclusion reached after taking into consideration the population, area and shape of our country and everything, in designing a nationwide portable telephone network at present. However, the optimum number of classes of exchanges will change with the movement of population, changes in the environment of the life of the people, or changes in the costs of hardware and software for this system.

Also when the system of the present invention is put to use in a foreign country, the number of classes will change substantially with its population and national traits.

(7) Constitution of the Portable Telephone System of the Present Invention at an Early Stage of Introduction FIG. 5C shows the system configuration of the portable telephone system of the present invention which is put to use in 23 Wards of Tokyo at an early stage of introduction.

In this case, a cordless telephone key service unit (fixed radio equipment), which is substantially the same functions as those of the existing NTT cordless telephone, is provided in each home or office. This cordless telephone key service unit is accessible to and from a desired portable telephone set. Further, a radio transmitter-receiver equipped with substantially the same functions as those of the cordless telephone key service unit is mounted on each pole on the streets. These devices are accommodated in an exchange of a telephone station or PBX in an office as is the case with the existing cordless telephone system, and they are handled in the same manner as in the case of an ordinary fixed telephone system. However, the above-mentioned exchange or PBX will hereinafter be referred to as a first class exchange. This exchange has a memory (a subscriber information memory) for storing, changing and erasing the current positional information of each portable telephone set.

It will be described below that only with these cordless telephone key service units, the portable telephone set of the present invention is able to originate an outgoing call and receive an incoming call at almost all places in the 23 wards of Tokyo on the ground that several functions mentioned above and essential to the portable telephone system are added.

Recently the Ministry of Posts and Telecommunications of Japan has, published a material in which it is estimated that the number of cordless telephones demanded in Japan in 2000's will be ten million. This estimation is reasonable in view of the numeric values (1) to (7) in the afore-noted material "Long-Term Prospects for Utilization of Radio Frequency Spectrum". It is presumed from the above that the number of cordless telephones which will be demanded in the 23 wards of Tokyo will be one million. Since the total area of the 23 wards is 581 Km$^2$, there will be 1721 cordless telephone sets per square kilometer.

$$\frac{1000000 \text{ sets}}{581 \text{ km}^2} = 1721 \text{ sets/km}^2$$

Accordingly, one cordless telephone set will be present in a square with a side of 25 m.

$$\frac{172}{1000 \text{ m} \times 1000 \text{ m}} = \frac{1.1}{25 \times 25 \text{ m}^2}$$

The above calculations were based on the assumption that traffic would be uniform, and this assumption is considered reasonable because the number of sets demanded is extremely large.

As a result of the above calculations, one cordless telephone key service set will be installed in each square with each side of 25 m if the traffic is uniform. On the other hand, since it is considered that the cordless telephone key service unit has a service area with a radius ranging from 25 to 50 m, it will be seen that in the 23 wards of Tokyo in 2000's any portable telephone set can originate an outgoing call and receive an incoming call when it has succeeded in accessing any one of the cordless telephone key service units.

However, since there are broad roads and playgrounds, underground shopping centers, etc., in the 23 wards of Tokyo, there are places where radio waves from cordless telephone key service units installed indoors cannot be received. Accordingly, it is necessary that, in such districts, transmitter-receivers having the same functions as those of the cordless telephone key service unit be installed on poles, on the streets, on the walls of buildings, etc. and that these transmitter-receivers be accommodated in exchanges of telephone stations as in the case of the cordless telephone. Besides, a number of high-rise housing developments have been built in recent years; and so that this must also be taken into consideration from the viewpoint of the radio wave propagation characteristic.

Moreover, when a large number of peoples use their portable telephone sets at a time, there is a fear that they become incapable of communication because of traffic congestion. This will be described later.

In addition, in order that outgoing and incoming call operations may be performed in an automobile or like high-speed vehicle, it is necessary to link the portable telephone system with the land mobile radio telephone system and other mobile communication systems. This will also be described later.

(8) Study of Traffic of the Portable Telephone for Use in the Cordless Telephone Mode It is apparent from the above that in the case of using the portable telephone system of the present invention in the 23 wards of Tokyo, the portable telephone set is capable of communication almost all over the 23 wards of Tokyo when it is used in the cordless telephone mode. Since a large number of subscribers use their portable telephone sets at the same time, however, it must be considered in terms of traffic whether satisfactory communications can be achieved. From the technical point of view, there is no problem in this respect as described below.

In the existing NTT cordless telephone, the same portable telephone set has 46 channels; namely, the multichannel access technology is employed by which when a certain channel is busy, an idle channel is searched and used.

Next, the number of portable telephone subscribers that can be accommodated will be calculated on the assumptions that the portable telephone set of the present invention also utilizes the multichannel access technology and that the number of usable channels are the same as in the case of the cordless telephone system.

The following various values are used as conditions for use of the portable telephone.

i) The number of repetitive zones is 25. This is intended to ensure that channels in adjacent zones are not used at the same time so as to avoid interference of radio waves.

ii) Traffic is 0.03 Erlang (the frequency of use per day: 6 times, 3 minutes per call, busy hour call rate: 1/10). Traffic for registration of position and for new services is 0.02 Erlang. The former is three times larger than the traffic of the existing land mobile radio telephone system.

iii) Blocking probability B=0.03 This is the same design condition as that of the existing land mobile radio telephone system.

iv) It is assumed that the total area of the 23 wards of Tokyo is 581 km$^2$ and one-million key service units are installed therein. This value will be reasonable on the assumption of a system which covers all the telephone systems (1) to (7) mentioned in the aforementioned material "Long-Term Prospects for Utilization of Radio Frequency Spectrum".

Based on the above preconditions, the traffic which can be processed in this portable telephone system can be given as follows:

$$\frac{a(46, 0.03)}{0.05} = \frac{38.1081}{0.05} = 762.2 \text{ (subscribers/25} \times 25 \text{ m}^2\text{)}$$

where a(46, 0.03) is traffic which can be carried as mentioned previously, in terms of Erlang. That is, 762 subscribers can use their portable telephone sets in a 25 square meter area under the above-said conditions. Since the number of repetitive zones is 25, the number of subscribers accommodated per zone is as follows:

$$\frac{762.2}{25} = 30.5 \text{ (subscribers/25} \times 25 \text{ m}^2\text{)}.$$

That is, 30 subscribers can use their portable telephone sets in a 25 square meter area under the above-said conditions. Accordingly, in a 1 square kilometer area:

$$30.5 \times \frac{1000}{25} \times \frac{1000}{25} = 48800 \text{ (subscribers/km}^2\text{)}$$

Over the entire area of the 23 wards of Tokyo:

$$58800 \text{ (subscribers/km}^2\text{)} \times 581 \text{ (km}^2\text{)} = 28352800$$
(subscribers/23 wards)

Namely, about twenty-eight million subscribers can access the system. The above calculations were made on the assumption that the traffic density inside the 23 wards of Tokyo is constant. In practice, however, many portable telephones will be used in the wholesale market, areas for special events, etc. Assuming that the traffic density in such a place is 4 times higher than an average density, the number of portable telephone sets which can be accommodated is about 7.1 millions as follows:

$$28352800 \times \tfrac{1}{4} = 7088210$$

Since the population inside the 23 wards of Tokyo is about 8.6 millions at present, it is presumed that the above-said value is greater than the number of peoples who require portable telephone sets, indicating a sufficient capacity. From the above it is seen that the numbers of subscribers who can be accommodated in the portable telephone systems of the residential district mode and the business district mode, in this example, are as follows:

(1) Residental district mode 8 subscribers per portable telephone key service unit (Eight portable telephone sets must be accommodated.)

(2) Business district mode 30 subscribers per portable telephone key service units (Thirty portable telephone set must be accommodated.)

In practice, however, traffic from portable telephone sets increases in a crowded place such as an amusement district, area for special event, or ballpark, it is necessary to install many portable telephone key service unit in the same place. Technically this is easy, and in this case the key service unit will be arranged so that many radios are provided in the same frame as in the case of a land mobile radio telephone base station. In future the amount of traffic will increase and the portable telephone will be used for business as well; therefore, only 46 channels assigned at present will be insufficient to accommodate an increasing number of portable telephone sets. In practice, a maximum of 200 channels will be needed after 5 to 10 years. However, the present invention sufficiently applicable and the present frequency assignment.

Incidentally, the existing land mobile radio telephone system is assigned 600 channels, whereas the number of channels needed in the present invention is only $\tfrac{1}{3}$ of the above.

In addition, future progress of the diversity technology will reduce the number of repetitive zones (The numbers of zones used at present, 25, can be reduced about by half, 12.) or reduce the spacing of carrier frequencies per channel (The efficiency of frequency utilization is raised by decreasing the present 12.5 KHz spacing to a 10 KHz one or improved drastically by the introduction of the digital technology.) Accordingly, there is the likelihood of the existing working frequency band width remaining virtually unchanged.

(9) Embodiment of a System Coexistent with Existing Various Mobile Communication Systems The portable telephone system of the present invention is a system which will, in its ultimate form, enable the same portable radio terminal to perform the originating and incoming call operation at any desired places all over the country. Since it will be many years before the system can be used in its entity, it will be introduced step by step. In those areas where the system has not been introduced, it is linked with various other mobile communication systems. Also in this case, it is possible to obtain substantially the same results as those obtainable with the present invention, as described below. This embodiment is to provide a system which enables the portable telephone to be used in the following modes in the following cases:

i) In office and residence:
Cordless telephone mode
ii) While walking outdoors:
Cordless telephone or pocket pager mode
iii) On automobile:
Land mobile radio telephone mode
iv) On train:
Train telephone mode
v) On ship:
Maritime mobile radio telephone mode
vi) On ship which performs maritime satellite communication:
Maritime satellite communication mode
vii) On airplane: Airplane radio telephone mode FIG. 5A shows the constitution of the national telephone network according to the present invention Briefly stated, the portable telephone set (a terminal) for use in the system of the present invention is arranged so that in each of the above-said modes it can be linked with the existing terminal. In an office or residence the portable telephone is used in coexistence with the existing cordless telephone. (Since the two telephone systems can be used as if they constitute a single system, this state will hereinafter be referred to as superposing.)

The portable telephone terminal is designed so that When brought into an automobile, it can be connected to an interface of a land mobile radio telephone terminal. The portable telephone system is used in a manner to superpose with the land mobile radio telephone system.

The system configuration of the present invention can easily be modified for use in superposing relation with any of the pocket pager, train telephone, maritime mobile radio telephone, and other systems. Therefore, the portable telephone terminal of the present invention can be used in the mode of each system.

The following will describe in detail that the system of the present invention is possible technically and is reasonable from the economical point of view.

(9-1) Functions to be Added to Cordless Telephone System for Use in Cordless Telephone Mode At present the NTT cordless telephone is used in our country. The system of this kind is composed of a portable telephone set and a key service unit which is connected to the portable telephone set via a radio channel communication circuit and an exchange via a wire communication circuit. The portable telephone set and the key service unit usually bear a specific relation such that the former is subordinate to the latter. The telephone set cannot communicate with a key service unit other than the specified one even if they happen to lie at a short distance over which radio channel communication could be established between them. Similarly, the key service unit is not permitted to communicate with other telephone sets than the specified one.

However, in order that the portable telephone set of the present invention may be used in the cordless telephone mode, the portable telephone needs to be equipped with means by which it is capable of connecting to key service units other than that which is connected to the portable telephone set through a radio channel communication circuit. With the provision of such means, even if the portable telephone set is carried to any place, communication can be maintained so long as there is, at that place, a key service unit which satisfies required speech quality. The system configuration in this case is the same as shown in FIG. 3A, to which is added functions described below. The portable telephone set is depicted in FIG. 4A.

In order to permit the use of the portable telephone set of the present invention in the cordless telephone mode, the existing cordless telephone key service unit must be equipped with the following functions.

i) The cordless telephone key service unit accepts and stores the position register signal from any portable telephone set and transmits its subscriber information to a first class exchange such as radio channel control equipment, PBX, or exchange of a central office.

ii) When receiving an incoming call to the portable telephone set, the cordless telephone key service unit sends out its PID signal, using a control channel.

iii) In the case of communication between the portable telephone set in a roam area and the portable telephone key service unit, the cordless telephone key service unit the PID information of the calling portable telephone set and the duration of the communication to the subscriber information memory (a charging section) of the first class exchange.

(9-2) Functions to be added to Radio Channel Control Equipment for Cordless Telephone, PBX (see FIG. 5D), or End Office Exchange (The exchange equipped with the additional functions will hereinafter be referred to as a first class exchange.)

(i) The first class exchange stores PID signals and other subscriber information of portable telephone sets sent from the cordless telephone key service unit.

(ii) When having accepted the PID signal of only that one of the portable telephone sets which is in a roam area, the first class exchange checks its contents. Having found that the portable telephone set is being used in an n-th class roam area, the first class exchange notifies the subscriber information memory of an n-th class exchange of the current position of the portable telephone set. In practice, the first class exchange needs only to transmit the signal to the subscriber information memory of the second class exchange. The reason for this is that the second class exchange also checks the contents of the PID signal and judges whether to send it to a higher-ranking exchange.

(iii) When the first class exchange receives an incoming signal to the portable telephone set from a portable telephone subordinate to the second class exchange or the first class exchange or an ordinary telephone set, the first class exchange sends out the incoming call to the key service unit concerned.

(iv) The first class exchange is equipped with the above-mentioned functions in order to operate the cordless telephone set in the portable telephone systems of the residential district mode and the business district mode or as a portable telephone set of the continuous position registration request mode.

With such additional functions as mentioned above, the cordless telephone can be used as the portable telephone system of the present invention.

FIG. 5B shows the internal arrangements of the key service unit and the portable telephone set and the channel structure therebetween. FIG. 7A shows flows of originating and incoming call operations between the both devices.

The above has described that the addition of functions to the existing cordless telephone could obtain the function of the terminal equipment in the cordless telephone mode of the portable telephone system of the present invention. In practice, when the portable telephone system of the present invention will have come into wide use, the demand for the cordless telephone will decrease substantially and the portable telephone system will be used in the field which has been considered as the field of application of the cordless telephone. However, the afore-noted literature "Long-Term Prospects for Utilization of Radio Frequency Spectrum" does not forecast the appearance of a system which includes the existing systems (1) to (7), such as the system of the present invention, but the literature estimates that, for example, the number of cordless telephone sets will be as large as seven millions all over the country. Therefore, on the assumption of how portable telephone key service units would be distributed in the service area of each cordless telephone set when seven million cordless telephone sets have already been spread throughout Japan, the manner how to use the portable telephone set of the present invention while walking, in a house and at a crowded place has been described previously, while at the same time pointing out differences in hardware and software between the cordless telephone and the portable telephone of the present invention.

When the portable telephone system of the present invention will have come into full use, the cordless telephone will be dealt with by omitting some of its functions.

(9-3) Functions to be added to the land mobile radio telephone system so as to permit the use of the portable telephone set in the land mobile radio telephone mode For using the portable telephone set of the present invention in an automobile, it is a precondition that the existing car telephone be installed in the car. The reason for this is that apart from far-off future, at the present technological level, the portable telephone set brought in the car cannot always be used without the aid of the land mobile radio telephone system.

A description will be given first of the configuration of the existing NTT land mobile radio telephone system and the configuration of the network of the present invention.

Figure 9:
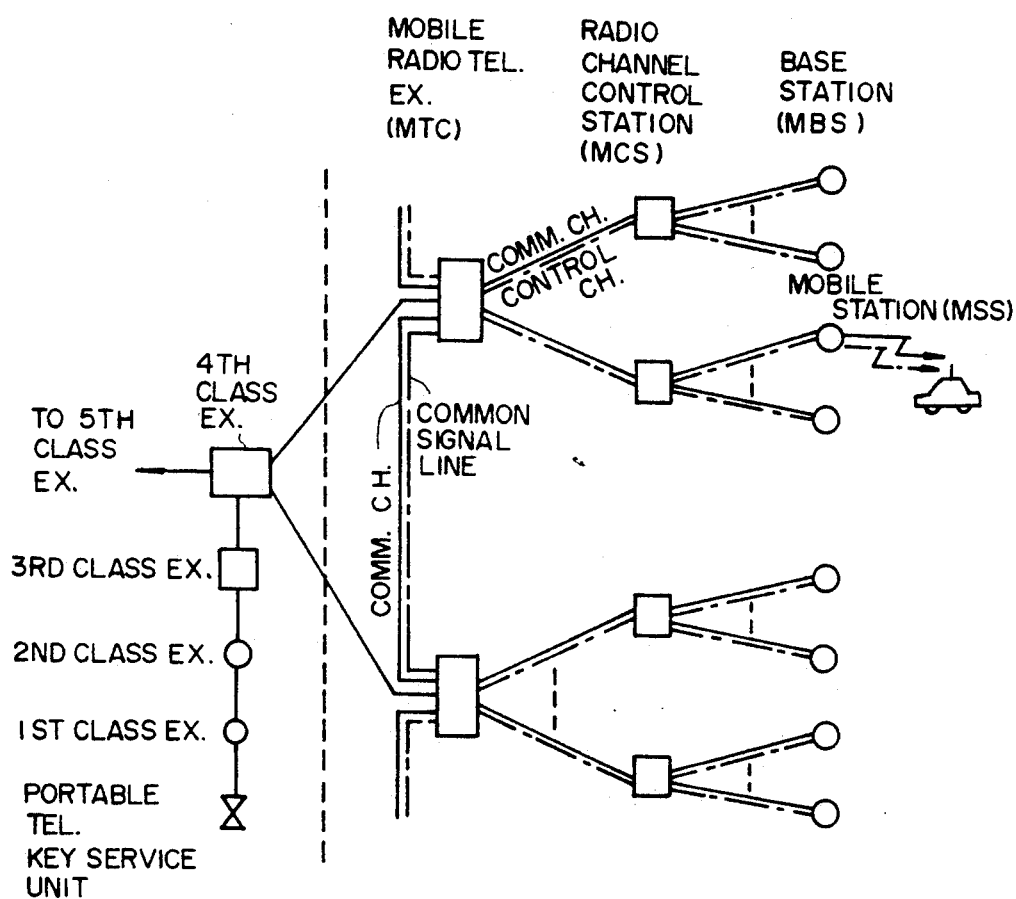
FIG. 9 is a block diagram illustrating an example of other system employed in the present invention.

FIG. 9 illustrates the land mobile radio telephone system at the right-hand side and the network of the present invention at the left-hand side, the broken line at the center indicating an interface.

For the land mobile radio telephone system shown in FIG. 9 is referred to a literature ("N. Yoshikawa et al, Radio Control System on UHF Land Mobile Radio Telephone", Electrical Communication Laboratories Technical Journal (NTT), Vol. 26. No. 7, P1871~1977.)

(9-4) Method of Superposing the Portable Telephone System and Land Mobile Radio Telephone System Now, a description will be made, with reference to FIG. 9, of a method for superposing the portable telephone system of the present invention on the land mobile radio telephone system.

In FIG. 9 the portable telephone network of the present invention shown on the left-hand side of the broken line is linked with the land mobile radio telephone network from an exchange KTC-IV to land mobile radio telephone exchange MTC. That is, the fourth class exchange is connected to the land mobile radio telephone exchanges (MTC). The land mobile radio telephone exchanges are interconnected via a straight line and each exchange is connected to radio communication circuit control stations and base stations via communication circuits and control communication circuits. Each base station and each car telephones are inconnected by radio. The functions of each station forming the land mobile radio telephone system will be described later.

There are several superposing methods.

A method which is the simplest and does not impose any burden on the land mobile radio telephone system is to bring the portable telephone set in the car and dial, from its car telephone to the land mobile radio telephone exchange (MTC in FIG. 9), a special number (for example, ##01-XXX-XX-XXX-XXXX, where numerals other than ##01 are the PID information of the portable telephone set and X is an arbitrary one of numerals 0 to 9. In practice, since abbreviated dialing is possible, this position registration is easy.), registering the position of the portable telephone set in the subscriber information memory of the exchange MTC. In this case, the exchange MTC must be additionally equipped with a function of accepting the registration of the position of the portable telephone set.

The subscriber information memory of the exchange MTC, which has thus accepted the position registration from the car telephone (whose number is YY-YYYYY, where Y is an arbitrary one of numerals 0 to 9.), accepts and stores the current position registration of the car telephone (which registration is unnecessary if already registered) as well as the position registration of the portable telephone set. The exchange MTC sends a signal to a fourth class exchange which controls the exchange MTC, notifying it of the fact that the portable telephone set is in the state of being superposed on the land mobile radio telephone system and its position has already been registered in the subscriber information memory of the exchange MTC. Then the fourth class exchange decodes the PID information of the portable telephone set and transmits subscriber information of the portable telephone set, such as the registered current position information, to third to first class exchanges which administer the portable telephone set. The third to first class exchange store the transmitted information.

Thus, processing on the side of the fixed station is completed, and it waits for an outgoing call from the portable telephone set. In this method, however, the portable telephone does not originate the outgoing call but instead the car telephone performs all operations therefor.

Incidentally, the reception of an incoming call can be made easy by holding the portable telephone set in the ON state.

Since the telephone rate must be charged to the account of the portable telephone subscriber, not the car telephone subscriber, the following dial operation is performed.

Upon off hooking the car telephone, the following operations i) to iv) for an outgoing call from a mobile station take place: Outgoing call from mobile station i) Upon lifting the handset for originating an outgoing call from the mobile station, a call request signal (the calling subscriber's number and a call indication) is transmitted [(1)]. A radio base station receives and sends it to a radio channel control station [(2)]. (See FIG. 10A.)

ii) The radio channel control station indicates an idle communication channel of the radio service zone concerned, using a transmission control channel.

iii) The radio channel control station sends out the calling subscriber number signal to the land mobile radio telephone exchange via a control channel.

iv) Then the land mobile radio telephone exchange reads out of its memory subscriber data of the calling subscriber and analyzes the data [(3), (4)].

Next, the calling party dials ##02 and then the called party's number. This initiates the following operation (v).

(v) If it is found, as a result of the analysis, that the calling party is capable of calling [(4)], the land mobile radio telephone exchange makes the radio channel control station request the mobile station to send out dial numerals [(5)]. The land mobile radio telephone exchange decodes ##02 and judges that it is an outgoing call from the portable telephone set, and then makes its positional information memory retrieve whether the position of the portable telephone set has been registered. When it is found that the portable telephone is superposed on the car telephone (whose number is YY-YYYYY), the land mobile radio telephone exchange makes a charging information memory ready for the start of charging upon commencement of communication. Further, the land mobile radio telephone exchange notifies a exchange KTC-IV of the outgoing call from the portable telephone set [(6), (7)].

vi) After receiving the dial signal, the called party is called via exchanges KTC-IV, KTC-III, KTC-II and KTC-I in the same manner as in the case of ordinary telephone. In this case, the number of calls is counted for the portable telephone set and the telephone set chargeable thereon is charged, for example, once a month. The charging information on the portable telephone set is transferred to a charging section of the first class exchange which administers the home area of the portable telephone set. In the charging section the transferred telephone rate and the telephone rate in other roam areas are added up and charged to the portable telephone subscriber [(8)].

Figure 10B:
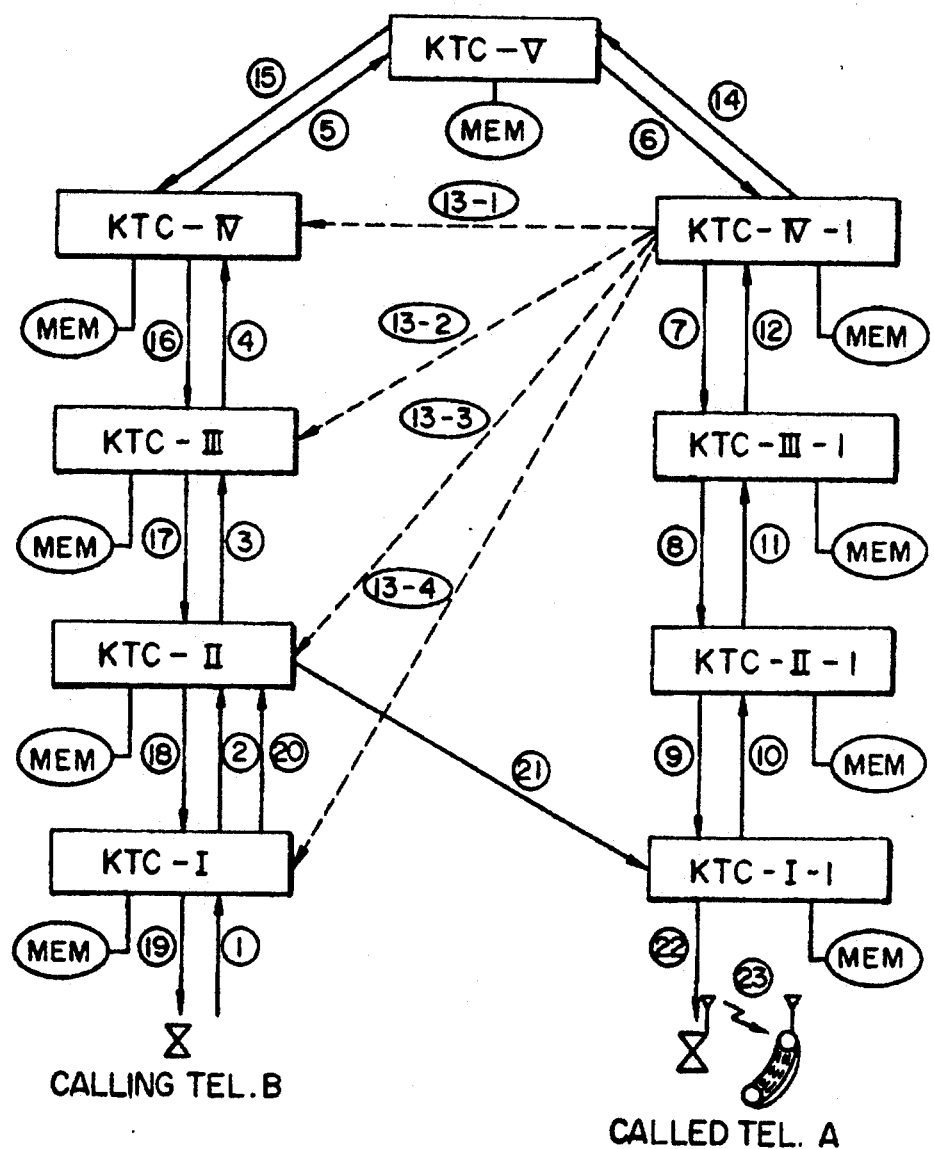
FIG. 10 is a flow chart illustrating signal flows at the outgoing call of another state in the system of the present invention.
Figure 10C:
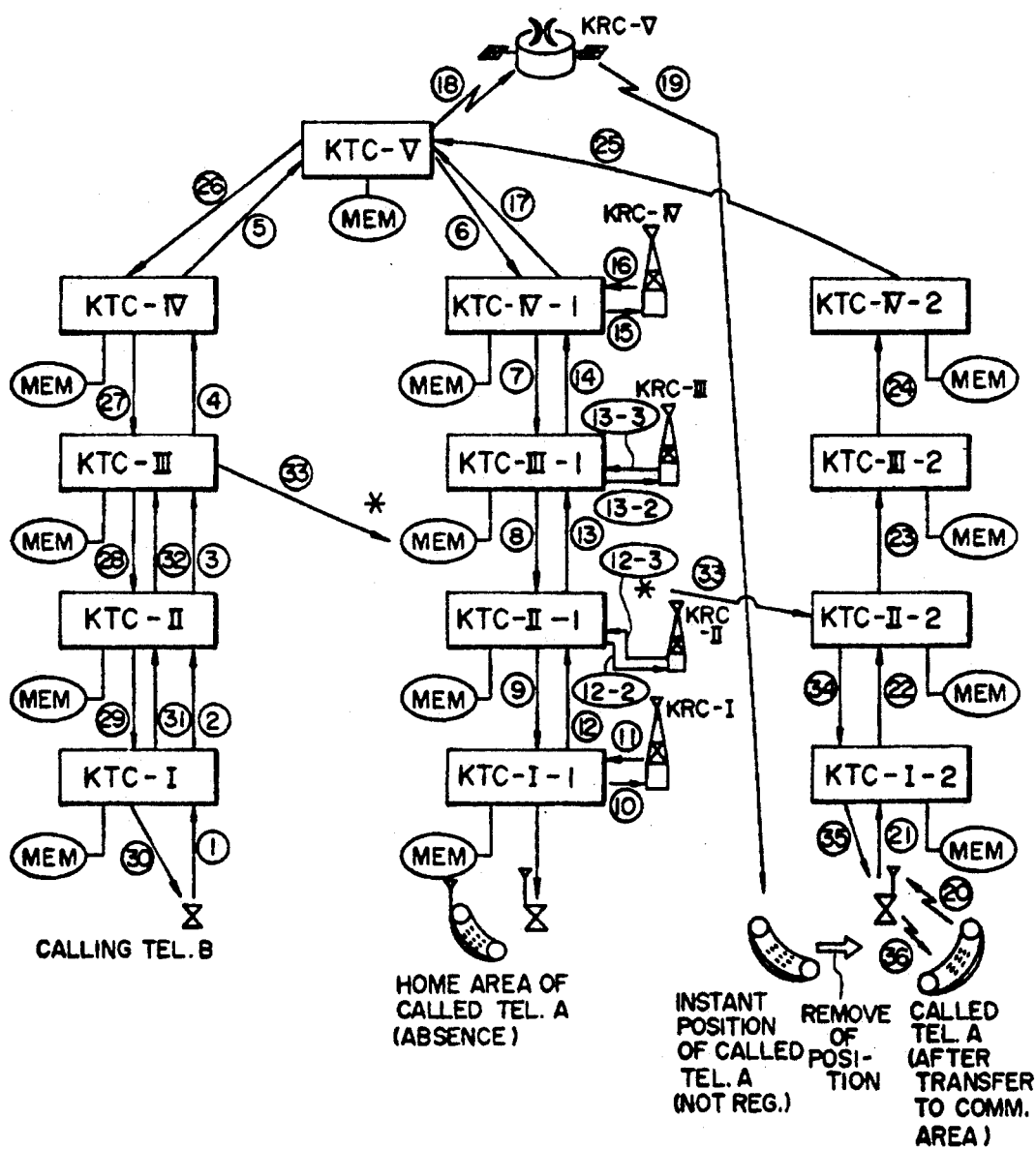
Figure 10D:
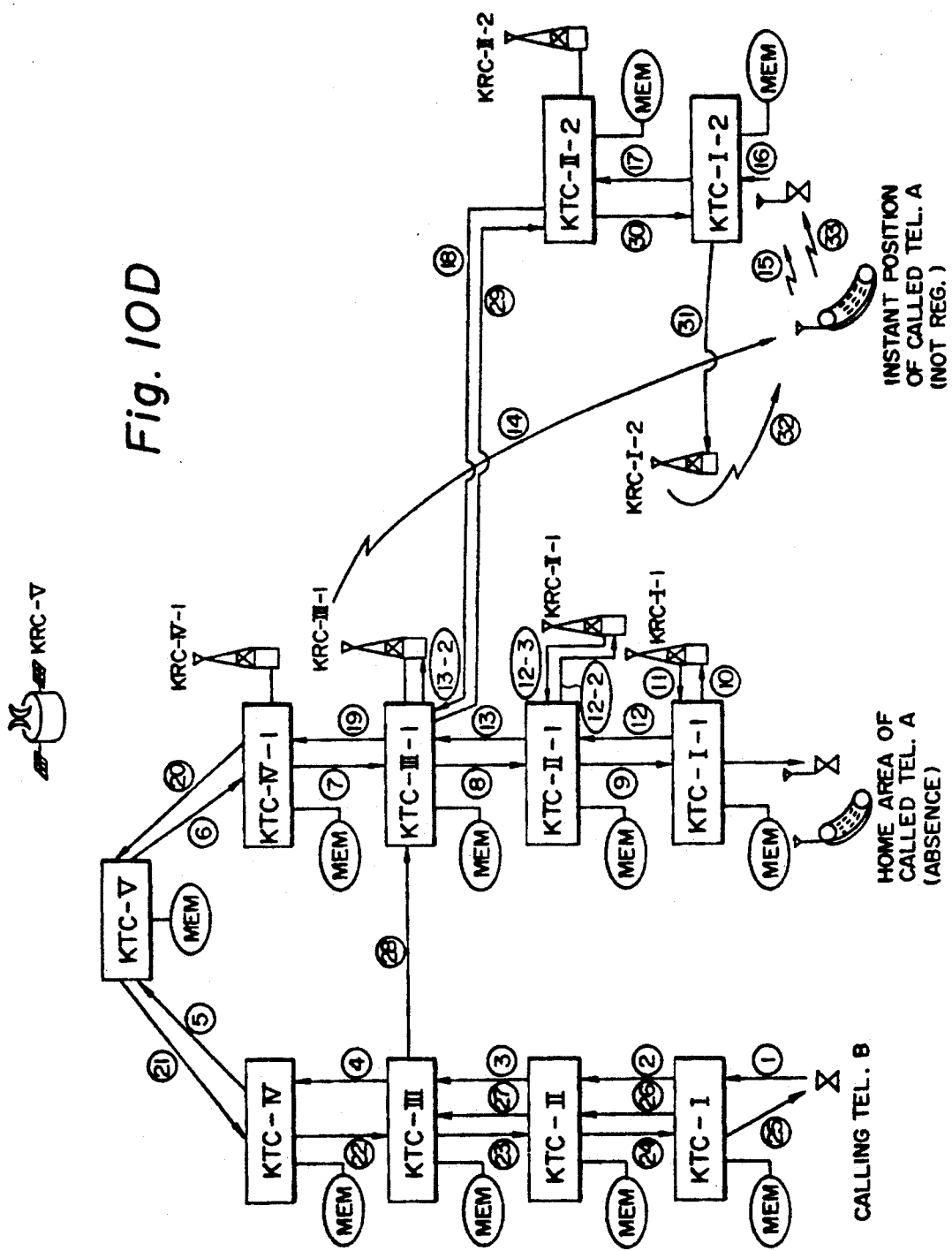

The above operations are such as shown in FIG. 10. Incoming call to the portable telephone set.

Next, an incoming call will be described.

In this case, it is a precondition that the portable telephone set has already registered its position in the subscriber information memory of the land mobile radio telephone exchange (MTC).

Assume that the portable telephone set is called from an ordinary telephone set at a given place and that the calling telephone set is in a place where the portable telephone set (including the fourth class exchange) is not accommodated (administered). In this instance, from the PID of the portable telephone set dialed by the ordinary telephone set, first to third class exchanges which administer the ordinary telephone set learns that the portable telephone set is subordinate to a fourth class exchange, and they transfer the PID of the called portable telephone set to a fourth class exchange which administers them. Then the fourth class exchange transfers these signals through a fifth class exchange, or a straight circuit, if any, to the fourth class exchange which administers the called portable telephone set. Then the fourth class exchange makes its subscriber information memory retrieve the PID information. As a result of this, the fifth class exchange finds that the portable telephone set is superposed on the car telephone (whose number is YY-YYYYY), and instructs the land mobile radio telephone to proceed to a calling operation. This operation is similar to the above-described car telephone calling operation. In this case, however, the called party's number is the car telephone number (YY-YYYYY), not the protable telephone set PID. Then, the following operations i) to ix) are carried out one after another.

i) The land mobile radio telephone exchange reads out the called subscriber's information from a home memory station to which the called subscriber belongs.

ii) If the called subscriber is found idle, the land mobile radio telephone exchange transmits a call signal via the control channel to each of the radio channel control stations in the area specified for calling.

iii) The radio channel control station calls the called portable telephone through each of its subcordinate radio base stations, using a terminating control channel.

iv) The called mobile station automatically transmits an answer signal through the terminating control channel. The radio base station sends the received answer signal to the radio channel control station, which in turn the answer signal to the land mobile radio telephone exchange through the control channel.

v) The land mobile radio telephone exchange sends out an audible ringing signal to the called party and a ring-back tone to the calling party.

vi) After the car telephone subscriber has answered, the exchange performs substantially the same operations as those in the case of an ordinary telephone. In an event that the car telephone has already received a preceding incoming call (or originated an outgoing call) and cannot received the current incoming call, it is possible that the land mobile radio telephone exchange recognizes it and directly calls the portable telephone set $PID_1$, using radio waves of a wide area portable telephone set calling 4th class radio base station.

While in the above the calling telephone set and the called portable telephone sets are accommodated in different fourth class exchanges, communication is enabled also in the case where the calling and called parties are accommodated in the same fourth class exchange. In this instance, the call request signal from the calling telephone set is transmitted to any one of the first to fourth class exchanges by which the portable telephone set is administered. The exchange searches its subscriber information memory and finds that the portable telephone set is superposed on the land mobile radio telephone system through the exchange MTC. Then the fourth class exchange sends the call request signal to the exchange MTC. The subsequent incoming call operations are exactly the same as described above.

As is the case with the ordinary telephone, the charging of the telephone rate to the calling telephone set is carried out in a charging information memory of the subscriber information memory of the exchange which accommodates the telephone set.

The clearing operation is exactly identical with that in the land mobile radio telephone system described previously.

The portable telephone set can be released from the state of being superposed on the land mobile radio telephone system, by dialing a special number (**11-XXX-XX-XXX-XXXX, for example) from the car telephone to the exchange MTC, removing the registered positional information of the portable telephone set from the subscriber information memory of the exchange MTC.

Next, a description will be given of a method which permits the use of the portable telephone set in a car, although this method requires some modification of the land mobile radio telephone system.

Figure 12A:
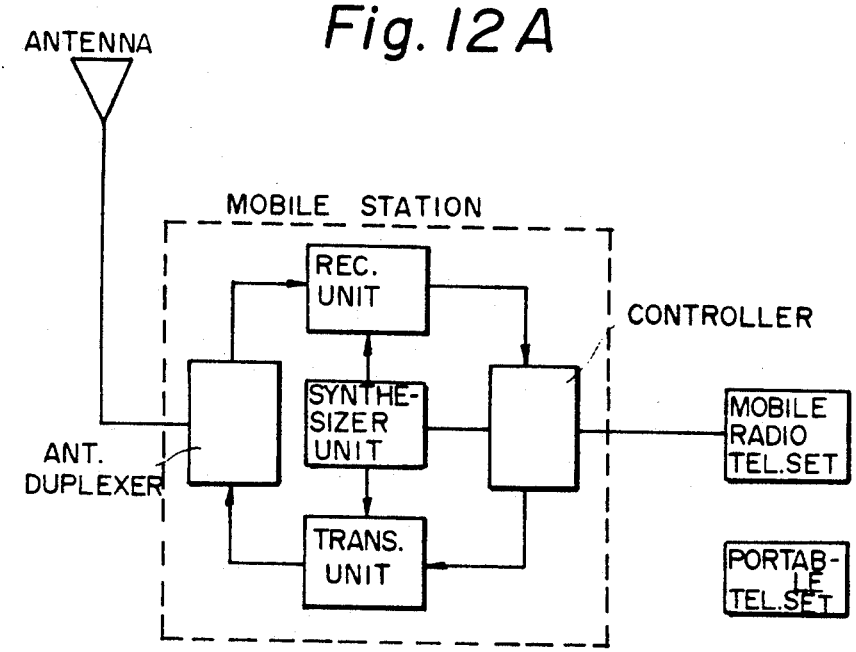
FIGS. 12A and 12B are block diagrams illustrating examples of mobile telephone system according to the present invention.
Figure 12B:
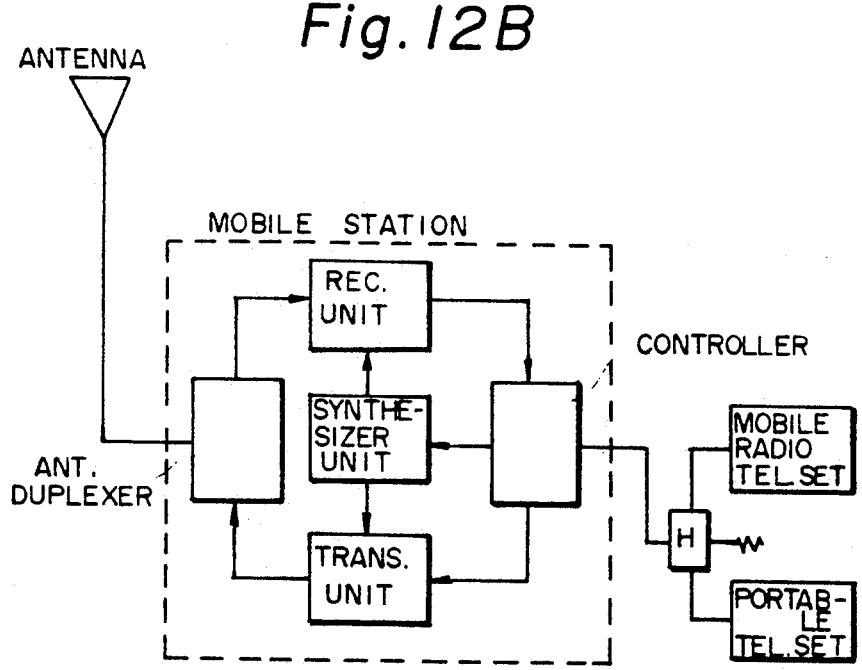

In this case, the car telephone set and the portable telephone set are hybrid-coupled and connected in parallel as viewed from the car telephone station (FIG. 12B). Accordingly, the land mobile radio telephone must be modified so that the car telephone station has an interface for signal transmission to and reception from the car telephone set and an interface for signal transmission to and reception from the portable telephone set.

In concrete terms, the above interfaces can be implemented by the following method (1) or (2).

(1) The car telephone station is equipped with a signal converter, a memory, and a discriminator for an outgoing call from or incoming call to the portable telephone set.

(2) The outgoing and incoming call signal interface of the portable telephone set is attached to the car telephone set.

As a matter of fact, the method (2) is not advantageous, taking into consideration the fact that the portable telephone set is superposed on the maritime mobile radio telephone system and the airplane radio telephone system. The reason for this is that it is desirable from the viewpoint of portability that the portable telephone set be as light and small as possible. Accordingly, there is no choice but to adopt the method (2). However, since the land mobile radio telephone system has already come into wide use, it is not economical to provide all of the existing car telephone station with such parts as mentioned above; therefore, the use of the method (2) will be limited. It is practical to employ an portable telephone adapter. The modification may also be effected taking the advantage of the occasion of changing hardware of each car telephone. FIG. 4A shows an example of the actual connection of the portable telephone set. The switches $SW_1$ and $SW_2$ are operatively associated with each other and are each normally connected to the contact (1). Where the portable telephone set is superposed on another system, the switches $SW_1$ and $SW_2$ are each connected to the contact (2). As a result of this, the transmitting and receiving radio sections of the portable telephone set are disconnected from its telephone section (The power supply is also turned OFF.) and perform the same function as does the telephone section of the car telephone.

The provision of the above-mentioned interfaces by the method (1) may also be taken into consideration in the development of an advance system of the land mobile radio telephone system. Furthermore, the method (2) is also applicable if the interface between the radio and telephone sections is adapted for use in common to the portable telephone set and the car telephone set in the modification of the land mobile telephone system.

Where the car telephone set is equipped with the aforesaid interfaces by the method (1) or (2), it is possible to originate an outgoing call from and receive an incoming call to the portable telephone set brought in a car, as described below.

A description will be given of a method of registering the position of the portable telephone set in the exchange MTC in FIG. 9.

Assume that the portable telephone set is in the ON state, and hence is capable of originating an outgoing call. In this case, afore-mentioned operations i) to v) for calling from a mobile station are carried out. The user dials a special number, for example, **01 alone as described previously. The car telephone set automatically transmits a signal [YY-YYYYY+PID] to the radio base station. Upon receiving this signal, the exchange MTC accepts and stores in its subscriber information memory the current position registration of the portable telephone set as well the current position registration of the car telephone set (The position registration of the car telephone is not needed if already registered).

As referred to previously, the exchange MTC sends, to the fourth class exchange having an interface with the exchange MTC, a signal indicating that the portable telephone set is in the state of being superposed on the land mobile radio telephone system and has registered its position in the positional information memory of the exchange. Then the fourth exchange decodes the PID information of the portable telephone set and transmits its subscriber information to the third to first class exchanges which administer the portable telephone set.

The outgoing call from the portable telephone set after registration of its position can be achieved by exactly the same operation as that for an outgoing call from the car telephone set. The charging of the telephone rate to the portable telephone is also performed by the same method as described previously.

An incoming call is also processed in the same manner as described previously, but ringing is provided to the portable telephone set, not to the car telephone set, and the user can communicate with the calling party, using the portable telephone set brought in the car.

In this case, the portable telephone set can be dissociated from the land mobile radio telephone system simply by dialing a special number (**11, for example) from the portable telephone set.

Next, a description will be given of a method for superposing the portable telephone set on the land mobile radio telephone system. This method calls for a heavier burden on the land mobile radio telephone system and appreciable modifications thereof but does not involve any changes in handling software and hardware of the portable telephone set.

According to this method, the car telephone station installed in the car is operated as if it were a portable telephone key service unit. The car telephone must be modified as follows:

(1) To equip the car telephone station with the function of the portable telephone key service unit.

(2) To strengthen the function of a car telephone station controller for making the function (1) and that of the car telephone compatible.

It is not advisable to modify all car telephone stations; therefore, it is practical to modify only the car telephone station on which the portable telephone set is desired to be superposed, or employ adapters for the functions (1) and (2).

By applying the same method as described above, the portable telephone set of the present invention can be superposed on the maritime mobile radio telephone system and the airplane radio telephone system as well. FIGS. 5B or 5C shows the connection of these systems and the network structure of the present invention. The both systems have an interface with the exchange KTC-IV.

(9-5) Method of Superposing Portable Telephone System and Pocket Pager System

As already described, it is possible for the portable telephone subscriber to originate an outgoing call from and receive an incoming call to the portable telephone set in the cordless telephone mode while walking on a street. Now, a method of superposing the portable telephone set on the existing pocket pager system will be described below.

The superposition of the portable telephone system on the pocket pager system has the following significance.

In a city area the portable telephone set can be used in the cordless telephone mode, but the transmitting power of the portable telephone set of the present invention and the cordless telephone set is as weak as 6 mW or so. Accordingly, where a source of jamming exists in the space near the portable or cordless telephone set, the radio wave propagation characteristic is deteriorated, resulting in speech quality being degraded or communication becoming impossible in some cases. It must be taken into account that this often occurs in large building, underground shopping centers, underground parking lots and similar places.

On the other hand, the transmitting power of radio frequency spectrum emitted from the base station of the pocket pager system is as large as 250 W or so and the existing system maintains an appreciably excellent calling rate even in a closed space of the first basement. Accordingly, assume that where the portable telephone set in its stand-by state (in the state of acquiring the down control channel) in the business district mode at one place becomes incapable of acquiring the control channel of the cordless or portable telephone key service unit because the portable telephone subscriber has moved from there to another place the radio frequency of the control channel of the key service unit acquired by the portable telephone set is changed to a pocket pager calling frequency. This is possible in terms of hardware. In the case of the portable telephone set shown in FIG. 4A, when the noise level of the noise level detector exceeds a fixed value, the frequency of the receiving frequency synthesizer is switched to the calling frequency of the pocket pager system under control of the controller. Thereafter, the portable telephone set performs exactly the same operations as does the pocket pager of the pocket pager system. FIG. 7B shows a flow of the incoming call receiving operation. Suppose that a call base station of the pocket pager system is additionally equipped with a function of sending out a calling wave when it receives from the exchange KTC-I (in FIG. 5C) a control signal for calling PID information of the pocket pager.

When the pocket pager is called from the base station in such a state, a call switch is turned ON (with the handset hung off). At this time, if the display of the portable telephone set indicates that an outgoing call is possible, it means that the portable telephone set is acquiring the down control channel of the nearest cordless (or portable) telephone key service unit (SID). Then the portable telephone set sends out an outgoing call signal together with its PID information, using the up control channel. The exchange KTC-I receives the PID+SID signal, finds that the portable telephone set PID is in the service area of the key service unit SID, and then sends out the incoming call signal to the key service unit SID.

The key service unit SID accepts the incoming call signal from the exchange KTC-I and sends out it to the portable telephone set after confirming its $PID_1$ information. The subsequent operations are the same as in the case of the incoming call in the cordless telephone mode (see FIG. 7A). In this while, a local exchange (the first class exchange in the present invention) for the pocket pager offers a verbal service, for example, "We are calling by pocket pager. Please hold the line." (see FIG. 7B)

If the display of the portable telephone set indicates that an outgoing call is impossible, the subscriber has to move, for instance, from the basement to the first floor or from an underground shopping center to a stairway leading to the ground. Then when the display indicates that an outgoing call is possible, it means that the portable telephone has just acquired the down control channel of the nearest cordless (or portable) telephone key service unit, enabling communication with the calling party as in the above case, FIG. 7B shows the above-described operations for each part of the network structure of the present invention.

Next, a description will be made of the function of a wide area portable telephone calling fifth class base station (a satellite KTC-V).

It is expected that in the year of 2000 or so the portable telephone system of the present invention will have been so widespread that any one will be able to make phone calls to the far corners of the country at any time. In 2000's, however, there will still remain areas the portable telephone set of the present invention cannot fully be utilized. For example, in steep mountains like the Japan Alps, the portable telephone set cannot obtain a sufficient input power with radio waves from the nearest portable telephone key service unit or pocket pager base station, and hence cannot receive any incoming call signals. The same is true of a portable telephone subscriber on a ship out at sea or an airplane.

In such a case, it is possible to use a private communication method or some other public communication system as well, but the portable telephone system of the present invention is also applicable, utilizing the wide area portable telephone calling fifth class radio base station which uses a satellite. In the following cases this radio base station performs calling after receiving a control signal from the fifth class exchange.

(1) In the case where the subscriber predetermines the period of receiving incoming calls and the area of utilization and the radio base station calls the subscriber in response to specified ones of incoming calls (or all incoming calls).

(2) In the case where no answer is given to an ordinary incoming call, where the portable telephone set is superposed on an wide area calling n-th class radio base station (where n=1, 2, 3 and 4) or on the land mobile radio telephone system, where no answer is given to calling from the wide area fourth class radio base station, or where calling is made on a contact with the subscriber.

(3) In the case where the called subscriber is an important person (a VIP) or where an emergency communication is needed.

If the ship is provided with equipment for other communication system, functions similar to those in the case of superposing the portable telephone system on the land mobile radio telephone system are added to the communication equipment of the ship, enabling it to perform outgoing and incoming operations. That is, calling for an incoming call is performed by the satellite and communication by the portable telephone set after receiving the call is called out using the communication equipment of the ship. This applies as well to the portable telephone set on an airplane.

In steep mountains like the Japan Alps, even if wide area calling is performed by the satellite, the portable telephone set cannot answer unless radio equipment is provided in its vicinity, so that it is desirable that communication information be contained in the call signal. In this instance, the called subscriber becomes capable of reception by displaying the transmitted communication information on the display of his portable telephone base station is relatively large; and in decreasing order of traffic are the second, third, fourth, and fifth class radio base stations. That is, the fifth class radio base station, i.e. the satellite has the smallest traffic. Since the satellite is used widely for other communications, it is considered that the system of the present invention will share the satellite with other communication systems. Therefore, the running costs of the system will not become extremely high and the system of the present invention will be used harmoniously as a whole.

(9) Other Functions of the Portable Telephone Set

Since the portable telephone set of the present invention is capable of performing outgoing and incoming call operations all over the country, it has various functions other than the communication one, as mentioned below.

The most striking function is a credit function which results from marked improvement of the identification capability of the portable telephone set as compared with the existing magnetic card or IC card. Table 4 shows the comparison of their functions for identification use.

TABLE 4

| | Comparison of functions of IC card and portable telephone set as ID | |
|---|---|---|
| | IC (magnetic card) | Portable telephone set |
| Size, shape standarization etc. | A little larger than a name card, easy to carry, and negligibly lightweight. Standardized and reader also standardized (magnetic card). Not so standardized as in the case of magnetic card, but there are signs of standardization (IC card). | Larger and heavier than IC card because of the inclusion of the communication functions, but not inconvenient to carry. Concretely, a size of 100 to 200 $cm^3$ and a weight of 100 to 200 grams will be realized in 2000's. For standardization, respective parts of different function, for example, radio section, handset, display, memory, etc. must be standardized individually. |
| Storage Capacity for ID | Magnetic card: 128 bytes (128 letters) IC card: several hundred times larger than magnetic card | Equal to or several hundred times larger than IC card through different with size |
| Communication function | No | Yes |
| Reliability of ID function | Magnetic card: Inevitably limited to a simple checking function such as a code number for identifying the owner IC card: Far larger storage capacity than that of magnetic card provides complex checking functions and improves reliability. But limited specifically to predetermined checking functions and incapable of checking as the occasion demands. | Because of large storage capacity like IC card, complex checking method can be adopted for identification of the owner. In addition, change of stored contents such as code number can be easily done by the owner, accessing the center through use of the communciation function. As identification methods of various purposes, such as membership card of golf club, certificate of registration of owner's official seal, ID certificate for identification of the owner for voting, ID certificate of identification of the owner for credit, etc., voiceprint is collated with registered one, signature is compared with registered one by referring to the center, and answers are given to inquires for ID check from the center. By using these communication fuctions, various checking methods can be set. Reliability as ID function is improved drastically. |
| Measures against loss and theft | Necessary to inform the center for invalidating the magnetic card (IC card) | Possible to inform the center for invalidating portable telephone, but also possible to suspend functions of portable telephone by transmitting special signal from the owner | set or hearing it as verbal information.

Now, a description will be given of the traffic of the transmitted signal from the wide area calling n-th class (where n=1, 2, 3, 4 and 5) radio base station. Almost all the traffic in the portable telephone system of the present invention is the traffic in the cordless telephone mode. Accordingly, the wide area calling is not so often effected as a whole, but the traffic of the first class radio (i) Credit card function The portable telephone sets of the present invention each have PID information different from the others, and hence can be used as a credit card. This will be described below in concrete terms.

Now let it be assumed that Mr. A, owner of the portable telephone set ($PID_1$), does his shopping at a store B and the amount payable for his shopping is ¥ 85,000. When Mr. A turns ON the power source of the portable telephone set near the check-out counter in the store B, it acquires the down control channel of a portable telephone key service unit ($SID_x$) installed in the store and set in the portable telephone system of the business district mode, and the position of the portable telephone set is registered as described previously. That is, its position is stored in the subscriber information memory of the first class exchange of the roam area.

Next, Mr. A presses a function button and numeral buttons of the portable telephone set to display "###85000" on the of the portable telephone display thereof. After having the displayed amount of money confirmed by a cashier of the store, A enters his code number and presses a call button of the portable telephone set. Then a signal is transmitted via the portable telephone key service unit $AID_x$ to the subscriber information memory of the first class exchange and is stored in the form of $PID_1 + SID_x + 85000$ in a credit memory of the special information memory. In this case, however, if Mr. A has a record to his discredit such as insolvency, there will be an answer back refusing credit to him. After completion of this processing, the exchange KTC-I answers back to the portable telephone set $PID_1$ (or a fixed telephone set of the key service unit $SID_1$) by a voice signal "The amount of money on credit to the owner of the portable telephone set $PID_1$ has now been entered in the memory from the telephone set. The amount of money stored in ¥ 85,000." The signal to the fixed telephone set may also be provided by displaying the amount of money ¥ 85,000 and the $PID_1$ information of the portable telephone set $PID_1$.

Thus, processing for the payment on credit to Mr. A at the store B is completed. Then a signal (the amount of money) stored in the credit memory of the special information memory of the exchange KTC-I is transferred to a credit sales company C under contract to the store B on every fixed day (or every day). The company C totals the transferred amounts of money, charges the bill to Mr. A's appointed bank account monthly, and transfers the predetermined amount of money to the account of the store B. Thus, payment of money for Mr. A's purchase price on credit at the store B is completed.

(ii) Portable telephone set usable with a telephone card

The PID information of the portable telephone set of the present invention is appended with a code number so as to prevent the portable telephone set from being abused even if it is stolen. In view of recent rapid distribution of telephone cards, it will greatly serve the convenience of telephone card owners if the portable telephone set can be used with the telephone card.

There are two methods of practical use as follows:

(1) The portable telephone set is designed to receive a telephone card can be inserted thereinto and operate in the same manner as does an ordinary card type public telephone set now in use.

(2) A telephone card adapter is attached to the portable telephone set so that it can be used in the same manner as in the case (1).

It is considered it possible to employ the both methods in the future since a telephone card reader will have been miniaturized; but, it is preferable to apply the method (2) at the present stage of popularization of the portable telephone and introduce the method (1) in the more advanced stage.

It is also possible to adapt the portable telephone set for use with magnetic and IC cards, filling diversified needs of users.

(iii) Message service

A message to the portable telephone subscriber is stored in the subscriber information memory of a first class exchange which administers the area of the portable telephone set PID. When the subscriber presses a message receiving function button of the portable telephone set, the message stored in the first class exchange is transmitted to the subscriber.

(iv) Guide function

Where the portable telephone set is held ON in the cordless telephone mode, it always acquires the down control channel of the portable telephone key service unit (of the portable telephone system in the cordless telephone mode and in the business district mode) installed in a residence, park, or like place. This enables the portable telephone subscriber to know the name of the place where he is, by displaying the SID information of the key service unit on the display of his portable telephone set. That is, the SID information of the key service unit with which the portable telephone set is in contact through the down control channel is available on the portable telephone set simply by depressing its function button for transmitting an SID information request signal to the key service unit. Moreover, since the SID information of the key service unit contains the address of the place where it is located, it is even more convenient to the portable telephone subscriber if he notifies the first class exchange of the key serive unit at the destination of his visit in advance (a guide service mode). In this case, when the portable telephone subscriber approaches the destination of his visit, the first class exchange rings the bell of the portable telephone set, and when the portable telephone set acquires the down control channel of the key service unit at the destination of the visit, a ringing tone of a higher level is produced, indicating the current position of the subscriber. In this way, the subscriber can easily arrive at his destination.

(v) (Function as a substitute for an identification card)

(1) Substitute for driver's license

The portable telephone set can be used as a driver's license by adding its information (MPID) to the PID information of the portable telephone set. The MPID information includes the kind of licence, the driver's record, age and so forth. In this case, the MPID information stored in the subscriber information memory of the portable telephone set needs to be transferred to an organization administered by the Public Safety Commission.

(2) Substitute for membership card of a golf club or some other organization

The portable telephone set can be used as a substitute for a membership card of a golf club by adding its information (GPID) to the PID information of the portable telephone set.

The portable telephone set can also be used as an attendance card in a company, office, or the like. Further, the portable telephone subscriber is capable of opening or closing his electronic locker by radio.

Besides, the portable telephone set can be used as a passport (PID + passport PID (PPID)) in future under un agreement made with foreign countries. This will greatly improve the efficiency of the issue of passports.

(3) Substitute for a railway ticket, admission ticket of a theater, or the like

By inserting the portable telephone set into a device for confirming its ID information at a wicket of each of railway stations where the portable telephone subscriber gets on and off a train, the railway fare can be paid in the same manner as in the case of shopping on credit as described previously.

(4) Means for the realization of a paperless society

The portable telephone set can be used as a ballot in a general or local election. If the portable telephone subscriber obtains permission from the election administration committee by notifying it that his PID information is in agreement with the contents of his resident's card, the subscriber can vote, for example, at home, without taking the trouble to go to a polling station. In this case, when the subscriber dials a vote number, for example, ###11 after confirming the name and number of a candidate displayed on his portable telephone set, the signal is transmitted via the subscriber information memory of the exchange KTC-I to an elector information memory administered by the election administration committee of the district concerned. In this memory the PID information of the portable telephone set and the voted candidate are confirmed and, if the vote is found valid, it is transferred to a vote collecting center. Of course, qualified voters who have no portable telephone sets can vote in the conventional manner, and even if the portable telephone subscriber can also vote in the conventional manner when he wishes so. The polling station and the elector information memory are interconnected by a straight line so that it is immediately found out whether the portable telephone subscriber has voted or not, on the basis of his PID information. For voting through the portable telephone set, the subscriber's voiceprint; password (election PID), or signature must be notified in advance in order to prove the subscriber's identity when voting. Similarly, this function of the portable telephone set can be utilized for the inhabitant's voting, a national census, and so forth.

(vi) Function as an input terminal for depositing in and withdrawal from a bank and for buying and selling securities such as bonds and stocks The portable telephone set can be used as a substitute for the above-said input terminal by utilizing the PID information and code number of the telephone set or the subscriber's voiceprint or the like.

(10) Use and System Operation of Portable Telephone Set

Next, a description will be given of the actual use of the portable telephone set of the present invention as communication means indoors, outdoors, or in car and as a credit card, identification card, or the like, together with the system operation therefor. Let it be assumed that in the case of the cordless telephone mode, the portable telephone key service unit is, in principle, in the business district mode in which it transmits its control signal at all times. When the portable telephone set is in its home area in the portable telephone system of the residential district mode, it operates in exactly the same manner as does an ordinary telephone set of the existing NTT cordless telephone and processing in the telephone network is the same; therefore, no description will be made in this respect.

i) Outgoing and incoming calls in first class roam area

Now, consider that Mr. A, a portable telephone subscriber whose PID information will hereinafter be referred to as $PID_1$, goes for a walk to a park apart from his home area. Mr. A will usually retain the portable telephone set in the OFF state for power saving purpose. Of course, the portable telephone set may be held in the ON state. In the case of the business district mode, the portable telephone set in the control signal receiving state receives signals of the down control channels from portable telephone key service units installed in the neighboring residences one after another as Mr. A walks down the street, and the position registration of the portable telephone set is changed for each key service unit. That is, an SID signal which is the ID information of each key service unit always flows in its down control channel, and when receiving the SID signal, the portable telephone set collates it with the SID signal stored in its memory to find that the former is different from the later (i.e. that the portable telephone set is in the first class roam area), and then sends out its $PID_1$ signal for the registration of its position to the new key service unit through the up control channel thereof.

The new key service unit $SID_2$ having received the $PID_1$ signal searches its memory to find that Mr. A's portable telephone set is different from that which is subordinate to the key service unit. Then the key service unit stores the $PID_1$ information of Mr. A's portable telephone set and request the first class exchange to register, in its subscriber information memory, the position of the portable telephone set.

The signal which is transmitted from the key service unit to the first class exchange in this case is composed of the $SID_2$ information of the key service unit and $PID_1$ information of Mr. A's portable telephone set. Accordingly, the first class exchange rewrites the position of the portable telephone set registered until then in its subscriber information memory and stores that the portable telephone set is now in the service area of the key service unit $SID_2$. At this stage Mr. A can communicate with a third party through the key service unit $SID_2$. That is, Mr. A's portable telephone set is accessible to the key service unit $SID_2$ for an outgoing call. When Mr. A dials the third party's telephone number in the same manner as in the case of an outgoing call from the home area, the first class exchange receives the outgoing signal from the portable telephone set $PID_1$ via the key service unit $SID_2$ and confirms, as a result of retrieving the subscriber information memory, that the current position of the portable telephone set $PID_1$ has been registered in the key service unit $SID_2$ in the first class roam area. Then the first class exchange instructs its charging section to charge the telephone rate to the account of the portable telephone set $PID_1$ at the point of commencement of the communication.

The first class exchange checks the telephone number of the called party and sends a call signal to him via a predetermined route in the same manner as in the case of an ordinary telephone.

An incoming signal to the portable telephone set $PID_1$ is also transmitted to the first class exchange as is the case with an incoming call in the ordinary telephone. When the first class exchange recognizes that the called party is the portable telephone set $PID_1$ (This recognition is easy because the PID signal differs in structure from an ordinary telephone number.), it retrieves its subscriber information memory to check whether the called portable telephone set is in the home area or not. Having recognized that the portable telephone set $PID_1$ has been registered in the key service unit $SID_2$, the first class exchange transmits the incoming signal destined for the portable telephone set $PID_2$ to the key service unit $SID_2$. Upon receiving the signal, the key service unit $SID_2$ retrieves its PID signal memory to confirm that the portable telephone set $SID_2$ has been registered in its service area. Then the key service unit $SID_2$ sends out the $PID_1$ signal to the portable telephone set $PID_1$, using the down control channel. The portable telephone set $PID_1$ receives the signal and rings its bell, and upon having it off, Mr. A can communicate with the calling party. In this instance, the first class exchange sends out a ring-back tone to the calling party in the same manner as in the case of an ordinary telephone.

As described above, when the portable telephone set stays in the vicinity of its home area, its position is registered in the subscriber information memory of the first class exchange alone; namely, the registration does not take place in the second class and higher class exchanges. The reason for this is that since Mr. A stays in the service area of the first class exchange, there is no need of intervention by the higher class exchanges. In other words, an incoming call signal from any telephone set throughout the country is transmitted to the portable telephone set through the first class exchange, and accordingly it is sufficient only to retrieve the subscriber information memory of the first class exchange (which administers the first class roam area).

While in the above Mr. A's portable telephone has been described to be held in the ON state, it is considered that the portable telephone set is normally in the OFF state and turned ON only when Mr. A wants to originate an outgoing call. In this case, however, when an incoming call occurs, the first class exchange calls the portable telephone set, regarding that it stays in its home area, because its current position has not been registered in the subscriber information (the position registration memory) of the first class exchange. Where a fixed telephone set is provided in the home area in association with the portable telephone set, its bell is rung; if not, the first class exchange judges, after a certain elapsed time, that the called portable telephone set is not in the home area, and automatically gives the calling party an answer "The portable telephone set you are calling is not in the home area." Therefore, a user who needs to call and to be called with extraordinary frequency, such as a salesman or doctor will keep his postable telephone set in the ON state.

Now, assume that Mr. A wants to originate an outgoing call after having arrived at the park and that portable telephone key service units are installed on poles in some places in the park so that the portable telephone set can communicate with any one of the key service units anywhere in the park. When Mr. A turns ON his portable telephone set, its radio section acquires the down control channel from the nearest key service unit $SID_3$. Then the portable telephone set stores an $SID_3$ signal of the key service unit $SID_3$ in its memory and transmits thereto the $PID_1$ signal through the up control channel. The key service unit $SID_3$ stores the $PID_1$ information in its memory and, at the same time, sends out a position registration request signal ($PID_1 + SID_3$) to the first class exchange. Then the first class exchange transfers the signal to the position registration memory of its subscriber information memory, in which the position of the portable telephone set $PID_1$ registered until then is cancelled and instead its current position in the service area of the key service unit $SID_3$ is stored.

Thus the registration of the current position of the portable telephone set $PID_1$ is completed. After this, outgoing and incoming calls can be handled in the same manner as in the case where the portable telephone set $PID_1$ is always held in the ON state.

Now, consider that when Mr. A was going under the railroad tracks on his way home, the portable telephone set held in the ON state rang. Since the timbre of this ringing was different from the timbre in the case of an incoming call from the key service unit, Mr. A could easily understood that the call was sent from a wide area portable telephone set calling first class radio base station. Since a red lamp was lighted on the display of the portable telephone set, Mr. A did not press the call button (which acts as an incoming call receiving button in this case). After he passed through the underpass, the blue lamp was lighted in place of the red lamp, so Mr. A pressed the call button and could communicate with the calling party.

ii) Outgoing and incoming call in second class roam area

Next, let it be assumed that after having reached home Mr. A decided to go to his office in his own car. His office was situated in the same city as his home (Hoya-shi, Tokyo, for example) but in a telephone exchange service area (the second class roam area) different from the home area of his portable telephone $PID_1$. Mr. A's car was equipped with a car telephone, he can freely contact anyone by phone. But when he happens to have a ride in someone's car also provided with a car telephone, he will scarcely use it because he does not feel like using it without permission. In such a case, since the portable telephone system of the present invention can be superposed on the land mobile radio telephone system as described previously, Mr. A can use his portable telephone in another person's car and the telephone rate is charged to the account of his portable telephone set without being mischarged to the account of the another person's car telephone.

Assume that Mr. A has arrived at his office without using the car telephone on his way to the office.

Before entering the office he went to a nearly tailor's shop to buy a business suit and paid for the suit on credit, using his portable telephone set $PID_1$. This can be done as described previously. On his way to the office Mr. A turned ON the portable telephone set for an outgoing call. In this instance, the portable telephone set $PID_1$ acquires the down control channel of a portable telephone key service unit ($SID_3$) mounted on the nearest pole and transmits a current position registration request signal to the subscriber information memory (the position registration memory) of a first class exchange KTC-I-2 which administers the key service unit $SID_3$, as described previously. The exchange KTC-I-2 judges, from the transmitted $PID_1$ signal, that the portable telephone set $PID_1$ has its home area in another first class exchange (KTC-I-1). Then the exchange KTC-I-2 stores in its position registration memory the position registration ($PID_1 + SID_3$) of the portable telephone set $PID_1$ and sends a position registration signal to a second class exchange (KTC-II-1) which administers the key service unit $SID_3$ and the portable telephone set $PID_1$ (that is, administers the second class roam area; namely, the exchange KTC-I-2 notifies the exchange KTC-II-1 that the key service unit has been requested to register the position of the portable telephone set $PID_1$ which is subordinate to the exchange KTC-I-1.

The second class exchange KTC-II-1 stores the transmitted information in the position registration memory of its subscriber information memory and transfers the position registration signal from the exchange KTC-I-2 to a first class exchange (KTC-I-1) which is subordinate to the exchange KTC-II-1 and administers the home area of the portable telephone set $PID_1$; namely, the exchange KTC-II-1 requests the exchange KTC-I-1 to register (or rewrite) the position of the portable telephone set $PID_1$ in the position registration memory of its subscriber information memory. Then the first class exchange KTC-I-1 rewrites the information in its subscriber information memory accordingly.

After this, the portable telephone set $PID_1$ is able to originate an outgoing call to any place in the country. The operation of the network for the outgoing call is exactly identical with the operation in the case of the aforementioned outgoing call in the park; so no description will be repeated in this connection. The telephone fare is charged to the account of the portable telephone set $PID_1$ in the charging information storage area of the subscriber information memory of the first class exchange and the charging information is regularly transferred once a month to the charging information storage area of the first class exchange which administers the home area of the portable telephone set $PID_1$ so that a whole month's bill of telephone charges is submitted to Mr. A.

Next, a description will be given of an incoming call to Mr. A's portable telephone set $PID_1$. After registration of its position the portable telephone set $PID_1$ is in the state in which it is capable of receiving an incoming call. Where the calling telephone set is subordinate to the first class exchange KTC-I-1 which administers the home area of the portable telephone set $PID_1$, the current position of the called portable telephone set $PID_1$ is found in the level of the exchange KTC-I-1 and the incoming call signal is transferred via the second class exchange KTC-II-1 to the exchange KTC-I-2, performing the incoming call operation for the portable telephone set $PID_1$.

In the case of a call from a telephone set subordinate to the first class exchange KTC-I-2 which administers the key service unit $SID_3$ in the first class roam area, the search for the current position of the portable telephone set $PID_1$ is accomplished by the exchange KTC-I-2 alone.

Where a call comes from a higher class roam area, for example, the second class one, the call signal is provided to the second class exchange KTC-II-2. The exchange KTC-II-2 analyzes the call signal and, when finding that the call signal is destined for the portable telephone set $PID_1$, it searches its subscriber information memory for the position registration of the called portable telephone set $PID_1$. As a result of this, the exchange KTC-II-2 confirms that the portable telephone set $PID_1$ is in the roam area of the first class exchange KTC-I-2 subordinate to the exchange KTC-II-1 and transfers the incoming call signal to the exchange KTC-I-2. The exchange KTC-I-2 searches its subscriber information memory for the registered current position of the portable telephone set $PID_1$ and then sends out the incoming call signal via the key service unit $SID_3$ to the portable telephone set $PID_1$, ringing its bell. Upon hanging off his portable telephone set $PID_1$, Mr. A can start communication with the calling party.

The above has described the cases where the communication is concluded within the second class roam area. The following will describe how the system of the present invention operates in the case where the portable telephone subscriber has moved from the first class roam area to the second class one, with the portable telephone set held in the ON state, in the stand-by state, or in the busy state.

Now, let it be assumed that Mr. A walks from his home (in Hoya-shi) to the office, with the portable telephone set $PID_1$ held in the ON state. As described previously, when Mr. A leaves the home area of his house, the portable telephone set $PID_1$ receives the down control channel signal from a portable telephone key service unit installed in the nearest third party's house or mounted on the nearest telephone or electric light pole and the portable telephone set $PID_1$ responds to the down control channel signal to send out the $PID_1$ signal through the up control channel, registering its current position. When Mr. A has got out of the service area of the first class exchange KTC-I-1, the portable telephone set $PID_1$ similarly sends out the $PID_1$ signal to a key service unit installed there (which key service unit is subordinate to a first class exchange KTC-I-2 different from the above-mentioned). The first class exchange KTC-I-2 (also installed in Hoya-shi), which has received the $PID_1$ signal from the portable telephone set $PID_1$ via the key service unit, checks the $PID_1$ signal and finds that the portable telephone set $PID_1$ is subordinate to another first class exchange KTC-I-1. Then the first class exchange KTC-I-2 sends the position registration signal (the $PID_1$ signal) of the portable telephone set $PID_1$ to the second class exchange KTC-II-1 which administers the exchange KTC-I-2. The second class exchange KTC-II-1 stores the $PID_1 + SID_n$ signal in its subscriber information memory and instructs the registration of the current position of the portable telephone set $PID_1$ to the first class exchange KTC-I-1 which is subordinate to the second class exchange KTC-II-1 and administers the home area of the portable telephone set $PID_1$.

Thus the position of the portable telephone set $PID_1$ in the second class roam area is registered, after which the portable telephone set $PID_1$ is capable of performing the outgoing and incoming call operations.

In the above the changing of the roam area has been described to take place when the portable telephone set $PID_1$ remains in the stand-by state; in this case, if the portable telephone set $PID_1$ is busy, the communication channel is changed corresponding to the change of the roam area and the position of the portable telephone set $PID_1$ is registered in a similar way.

iii) Incoming call in third roam area

Now, assume that Mr. A calls on his friend who live in Musashino-shi (a third roam area) and, on his way, he calls up his friend by the portable telephone set $PID_1$ to ask the direction to the friend's home.

Upon turning ON the power source the portable telephone set $PID_1$ sends the position registration request signal to the subscriber information memory (the position registration area) the first class exchange (KTC-I-3) which administers the area concerned. The subscriber information memory of the first class exchange KTC-I-3 checks the $PID_1$ signal of the portable telephone set $PID_1$ and finds that the portable telephone set $PID_1$ has the home area in another city. The exchange KTC-I-3 stores the $PID_1$ information in its subscriber information memory and notified a second class exchange (KTC-II-2), which administers the exchange (KTC-I-3), that the portable telephone set $PID_1$ has requested to register its position. The second class exchange KTC-II-2 stores the transmitted signal in its subscriber information memory and checks the signal. As a result of this, the exchange KTC-II-2 finds that the portable telephone set PID$_1$ has the home area in another city, and transfers the signal to a third class exchange (KTC-III-1) which administers the exchange KTC-II-2.

The third class exchange KTC-III-1 stores the signal in its subscriber information memory and requests the second and first class exchanges, which administer the portable telephone set PID$_1$, to store the position registration of the portable telephone set PID$_1$.

It will be seen from the foregoing description that upon completion of the above-described operations Mr. A's portable telephone set PID$_1$ is able to communicate with any telephone set all over the country. While in the above Mr. A is described to ask the way to his friend's home through use of the portable telephone set, he need not always use this method but may also request the exchange KTC-I of the guide service described previously.

iv) Outgoing and incoming calls in fourth class roam area

Now, let be assumed that one day Mr. A made a business trip to Takasaki (fourth roam area) by train and held the portable telephone set in the ON state on his way to Takasaki so as to receive an incoming call from his office and that the portable telephone set rang to indicate an incoming call about 15 minutes before arriving at Takasaki. Each coach of the train is equipped with a portable telephone key service unit and the portable telephone set which has registered its position in the key service unit is superposed on the train radio telephone system. That is, when an incoming call to a passenger (Mr. A) of the train occurs, the incoming call signal is sent from a train radio base station to the train with Mr. A aboard, and a train radio controller confirms the position registration of Mr. A's portable telephone set, decides the key service unit which calls the portable telephone set, and sends the incoming call signal to the key service unit. The subsequent operations are the same as in the case of an incoming call to an ordinary telephone set. There is a case where only one or two train public telephone sets are provided in one train. In this case, the incoming call signal is transmitted directly to the portable telephone set from a wide area portable telephone set calling fourth class base station. The called subscriber connects the portable telephone set to a nearby train public telephone set through a connection unit to receive the incoming call.

When Mr. A was walking down the street a while after he had got off the train at Takasaki station he turned ON the power source of the portable telephone so as to call his office in Musashino-shi. Then the position of the portable telephone set was registered in the subscriber information memories of the following exchanges through the same processes as described previously.

(a) First to third class exchanges which administer the roam area where the portable telephone set stays (b) First to fourth class exchange which administer the home area of the portable telephone set After this the portable telephone set is capable of performing the outgoing and incoming call operations.

Mr. A finished his business at Takasaki and decided to enjoy golfing at a golf club in this district on the weekend. Mr. A was a member of the golf club and presented the portable telephone set to a receptionist of the golf club in answer to a request to show his membership card or telephone set. By calling the receptionist's key service unit from Mr. A's portable telephone set, the receptionist could check ID (GPID) information of the golf club and could immediately confirm that Mr. A was a member of the club.

Mr. A enjoyed golfing on the weekend and then went home.

One day Mr. and Mrs. A went to a spa in Minami-Kishu for a week. They carried portable telephone sets with them separately and made full use of them while they went sight-seeing. The sunday of the week fell on a voting day of the general election. Conventionally, absentee voting had involved troublesome procedures. In 2000's, however, the electorate will be able to vote at any polling station all over the country, without the necessity of taking such troublesome procedures. The portable telephone set of the present invention which is capable of performing the outgoing and incoming call operation throughout the country will greatly contribute to the above absentee voting. The reason for this is that the portable telephone set possesses the function of identifying its owner and the function of a ballot, as described previously. Each voter registers, before the voting day, the voting station, the time of voting, the PID information of the portable telephone set to be used for voting, ID (election ID) information, his voiceprint, and information about the voter (his birthplace, birthday, permanent address, family, etc.). On the voting day the voter originate an outgoing call from his portable telephone set at the registered voting station (an administration center) at the registered time. The administration center confirms the PID and election ID information of the voter, checks his voiceprint, and makes inquiries about his birthplace and birthday, etc. (by automatic questioning and checking of replies by voice). After the checking the voter is allowed to proceed to the voting operation. Mr. and Mrs. A effected the absentee voting in this way. Incidentally, upon completion of voting the election ID information used by Mr. and Mrs. A is automatically erased, preventing that a third party votes using the portable telephone sets.

v) Outgoing and incoming call in fifth roam area

Now, assume that Mr. A went to Hokkaido carrying the portable telephone set a little after the sight-seeing tour to Minami-Kishu. Upon turning ON the power source of the portable telephone set, its position was registered in the subscriber information memories of the following exchanges, enabling the portable telephone set to perform the outgoing and incoming call operations.

(1) First to fourth class exchanges which administer the roam area of the portable telephone set.

(2) First to fifth class exchanges which administer the home area of the portable telephone set vi) Use of the portable telephone set in the wide area calling mode and utilization of the position sensing function Mr. A's son, B who was a university student, planned to climb the Japan Alps in the summer vacation, and decided to take his portable telephone set at the advice of his father, and he had requested, in advance, an exchange KTC-V to call him by a satellite. When he was traversing the ridge of the Japan Alps, his portable telephone set held in the stand-by state rang. Since the timbre of this ringing was different from the timbre of calling from the portable telephone key service unit or the wide area portable telephone calling first, second, third or fourth class base station, Mr. B could easily understand that the call was made from the wide area portable telephone set calling fifth class base station. He found a message "Good luck. Ichiro Ando" displayed on the display of the portable telephone set, and from which he learned that it was an encouraging telegram from his friend.

One day Mr. and Mrs. A went to an amusement park together with their son, his wife and grandchildren. Since it was considered that it would be difficult for them to get contact with one another if they should strayed from one another, they each carried a portable telephone set. Further, Mr. A let his grandchildren have portable telephone sets (held in the ON state) as substitutes for their identification tags. Mr. and Mrs. A, their son and his wife, and their grandchildren scattered over the amusement part, but when one of the grandchildren got lost, they could immediately found the lost grandchild. Moreover, they could easily get contact with one another to determine the meeting time and place, etc.

vii) Omission of the position registration of the portable telephone set in the exchange which administers the roam area With a view to technically clarifying that the portable telephone set of the present invention can be used in a roam area, the present invention has been described on the precondition that the position of the portable telephone set is registered not only in the exchange which administers its home area but also in the exchange which administers its roam area. However, the registration in the latter exchange need not always be effected; but in this case, there would be the following defects:

(1) Upon each occurrence of the outgoing call from the portable telephone set, outgoing call information (the charging information) must be provided to an exchange (any one of first to fifth class exchanges) which administers the home area of the portable telephone.

(2) Even if an incoming call to the portable telephone set is an incoming call from an area near the roam area of the portable telephone set, it is necessary, for inquiring about the current position of the portable telephone set, to transmit the incoming call signal to the fifth to first class exchanges which administer the home area of the portable telephone. (see FIGS. 11A to 11G)

As is the case with the above, in the case where the memory of the exchange which administers the home area of the portable telephone set has stored the positional information of the portable telephone set in the roam area administered by a plurality of exchanges, the above-mentioned omission of the position registration will not cause the system to be inoperable, but the above-said operations (1) and (2) will be needed.

viii) Function of the fixed telephone set provided in the home area of the portable telephone set in association therewith Where the fixed telephone set is provided in association with the portable telephone set, it is possible to obtain the following functions by deriving the current positional information of the portable telephone set from the positional information memory of the first class exchange.

(1) Where an incoming call occurs to the portable telephone set which has registered its position in the roam area, if the portable telephone does not answer for a predetermined period of time by some cause, the incoming call is transferred to the fixed telephone set in the home area of the portable telephone set. It is possible, in this case, to display on the fixed telephone set the telephone number of the calling party and the registered current position of the portable telephone set.

(2) When the portable telephone subscriber returns to his desk, it is possible to read out outgoing and incoming calls produced or messages recorded in his absence.

(11) Effect of the Invention

The portable telephone system of the present invention permits efficient establishment of a communication channel at any time and at any place, whether indoors or outdoors; this has been considered impossible from the technical and economical points of view. Accordingly, the present invention is of great utility in offering convenience in various phases of social life. Furthermore, the portable telephone set of the present invention provide great advantage in social life by using its functions other than the comminication one, in particular, by utilizing the portable telephone set for identifying its owner as the credit function and as enhanced functions of IC or similar cards.

What I claim is:

1. A portable telephone system in which a plurality of i-th class exchanges, which accommodate directly or through at least one (i−1)th class exchange, at least one key service unit of a plurality of portable telephone sets present in each service area, and at least one (i+1)th class exchange, which accommodates the plurality of i-th class exchanges through junction lines, are stratified to form an exchange system so that i=2, 3, 4, 5 and so that the (i+1)th class exchange covers all of the service areas through the i-th class exchange, said number i being equal to a number of stratified steps minus one, said exchange system having a function whereby information which specifies a home area predetermined from the service areas for each of the portable telephone sets and the portable telephone sets in distinction from each other is registered in a memory in each of the (i−1)th class and i-th class exchanges and in a memory in the (i+1)th class exchange which administer the home area.

2. A channel setting system in a portable telephone system, in which a plurality of i-th class exchanges, which accommodate directly or through at least one (i−1)th class exchange, at least one key service unit of a plurality of portable telephone sets present in each service area, and at least one (i+1)th class exchange, which accommodates the plurality of i-th class exchanges through junction lines, are stratified to form an exchange so that i=2, 3, 4, 5 and so that the (i+1)th class exchange covers all of the service areas through the i-th class exchanges, said number i being equal to a number of stratified steps minus one, said exchange system having a function whereby information which specifies a home area predetermined from the service areas for each of the portable telephone sets and the portable telephone sets in distinction from each other is registered in a memory in each of the (i−1)th class and i-th class exchanges and in a memory in the (i+1)th class exchange which administer the home area and the (i+1)th class exchange; and in which a wide area communication i-th radio base station is provided for a plurality of portable telephone sets which are connected to one of the i-th class exchanges and are capable of being called and transmitting a communication signal in the same area as the service area of said one of the i-th class exchanges; self-identification information of each of the plurality of portable telephone sets contains self-identification information corresponding to the i-th and (i+1)th class exchanges; in a case where any one of the portable telephone sets is called from a calling party of an incoming call in the service area of said one of the (i−1)th class or i-th class exchanges and does not answer to an incoming call signal from the key service unit in which a staying location of the called one of the portable telephone sets has been registered, the i-th radio base station performs wide area calling; and when the called one of the portable telephone sets has sent back an answer signal to said one of the i-th class exchanges through the key service unit in the service area or through some other transmitting means during a fixed period of time, communication channels are set up between said one of the i-th class exchanges or any one of the (i−1), (i−2), . . . exchanges and first class radio base stations and the called one of the portable telephone sets and between the key service unit and the called one of the portable telephone sets.

3. A channel setting system in a portable telephone system, in which a plurality of i-th class exchanges, which accommodate directly or through at least one (i−1)th class exchange, at least one key service unit of a plurality of portable telephone sets present in each service area, and at least one (i+1)th class exchange, which accommodates the plurality of i-th class exchanges through junction lines, are stratified to form an exchange system so that i=2, 3, 4, 5 and so that the (i+1)th class exchange covers all of the service areas through the i-th class exchanges, said number i being equal to the number of stratified steps minus one, said exchange system having a function whereby information which specifies a home area predetermined as a usual staying service area for each of the portable telephone sets and the portable telephone sets in distinction from each other is registered in a memory in each of the (i−1)th class and i-th class exchanges and in a memory in the (i+1)th class exchanges which administer the home area and in a memory in each of the (i−1)th class and i-th class exchanges which administer the service area where any one of the portable telephone sets is present;

and in which a wide area communication i-th radio base station is provided for a plurality of portable telephone sets which are connected to one of the i-th class exchanges and are capable of being called and transmitting a communication signal in the same area as the service area of said one of the (i−1)th class or i-th class exchanges; self-identification information of each of the plurality of portable telephone sets contains self-identification information corresponding to the i-th and (i+1)th class exchanges; in a case where any one of the portable telephone sets is called from a calling party of an incoming call in the service area of said one of the i-th class exchanges and does not answer to an incoming call signal from the key service unit in which a staying location of the called one of the portable telephone sets has been registered, the (i−1)th class or i-th radio base station performs wide area calling; and when the called one of the portable telephone sets has sent back an answer signal to said one of the i-th class exchanges through the key service unit in the service area or through some other transmitting means during a fixed period of time, communication channels are set up between said one of the i-th class exchanges or any one of the (i−1), (i−2), . . . exchanges and first class radio base stations and the called one of the portable telephone sets and between the key service unit and the called one of the portable telephone sets.

4. A channel setting system in a portable telephone system, in which a plurality of i-th class exchanges, which accommodate directly or through at least one (i−1) class exchange, at least one key service unit of a plurality of portable telephone sets present in each service area, and at least one (i+1)th class exchange, which accommodates the plurality of i-th class exchanges through junction lines, are stratified to form an exchange system so that i=2, 3, 4, 5 and so that the (i+1)th class exchange covers all of the service areas through the i-th class exchanges, said number i being equal to the number of stratified steps minus one, said exchange system having a function whereby information which specifies a home area predetermined as a usual staying service area for each of the portable telephone sets and the portable telephone sets in distinction from each other is registered in a memory in each of the (i−1)th class and i-th class exchanges and in a memory in the (i+1)th class exchanges which administer the home area and in a memory in each of the (i−1)th class and i-th class exchanges which administers the service area where any one of the portable telephone sets is present;

and in which a wide area communication i-th radio base station is provided for a plurality of portable telephone sets which are connected to one of the i-th class exchanges and are capable of being called and transmitting a communication signal in the same area as the service area of said one of the i-th class or i-th class exchanges; self-identification information of each of the plurality of portable telephone sets contains self-identification information corresponding to the i-th and (i+1)th class exchanges; in a case where any one of the portable telephone sets is called from a calling party of an incoming call in the service area of said one of the i-th class exchanges and does not answer to an incoming call signal from the key service unit in which a staying location of the called one of the portable telephone sets has been registered, the (i−1)th class or i-th radio base station performs wide area calling; and when the called one of the portable telephone sets has sent back an answer signal to said one of the i-th class exchanges through the key service unit in the service area or through some other transmitting means during a fixed period of time, communication channels are set up between said one of the i-th class exchanges or any one of the (i−1), (i−2), . . . exchanges and first class radio base stations and the called one of the portable telephone sets and between the key service unit and the called one of the portable telephone sets, and said self-identification information includes sufficient data correlating the self-identification number to specific individual subscribers so that the self-identification is usable in an identification mode of the individual portable telephone sets and the subscribers so that the information is usable as credit card information, ID card information and cash card information.

5. A channel setting system in a portable telephone system according to claim 4, including means for indicating via a portable telephone headset as the physical location of another portable telephone head set is located as a function of the self-identification information of said another portable telephone headset.

6. A channel setting system in a portable telephone system according to claim 4, in which said self-identification information comprises means including a digit code of thirteen digits for identification of an individual phone subscriber.

* * * * *